United States Patent [19]

Taft

[11] Patent Number: 4,843,287

[45] Date of Patent: Jun. 27, 1989

[54] PATH CONTRIVING SYSTEM FOR LOOK-AHEAD SENSOR IN A ROBOTIC CONTROL SYSTEM

[75] Inventor: Jeffrey D. Taft, Plum Boro, Pa.

[73] Assignee: Westinghouse Electric Corp., Pittsburgh, Pa.

[21] Appl. No.: 140,262

[22] Filed: Dec. 31, 1987

[51] Int. Cl.$^4$ ............................................. G05B 19/42
[52] U.S. Cl. .............................. 318/568.16; 318/573; 901/47; 356/376; 364/167.01
[58] Field of Search ................................ 318/568–573, 318/574–577, 586, 567; 219/124.1, 124.22, 124.32, 124.34; 901/9–10, 42, 47; 358/107; 356/1–2, 376, 303–304; 364/167–169, 513

[56] References Cited

U.S. PATENT DOCUMENTS

| 4,652,133 | 3/1982 | Artoszcwski et al. | 356/326 |
| 4,683,493 | 7/1982 | Taft et al. | 358/101 |
| 4,695,156 | 9/1987 | Taft | 358/107 |

Primary Examiner—William M. Shoop, Jr.
Assistant Examiner—David Martin
Attorney, Agent, or Firm—C. M. Lorin

[57] ABSTRACT

A look-ahead sensor attached to the its effector end deviates upon each control action upon the robot toward a new position along the seam path. The chord across the seam path from the present effector end to the contemporaneously sensed seam path location is determined and used with the present orientation of the effector end to determine an additional yaw angle compensating for the deviation. As a result, the look-ahead sensor is constantly brought back on track.

2 Claims, 30 Drawing Sheets

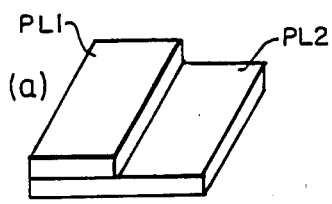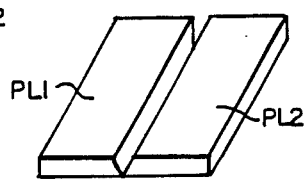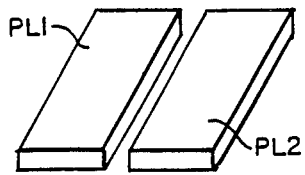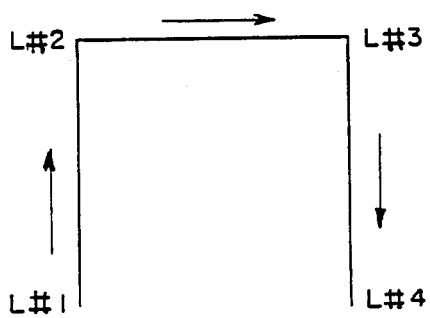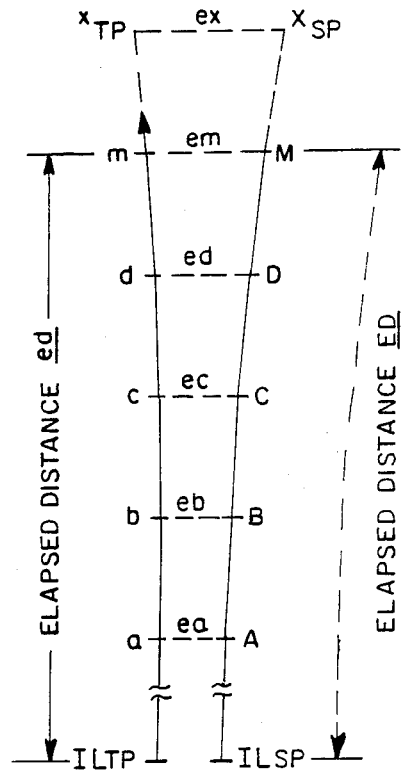
FIG. 2A. FIG. 2B. FIG. 2C.
FIG. 3.
FIG. 4.

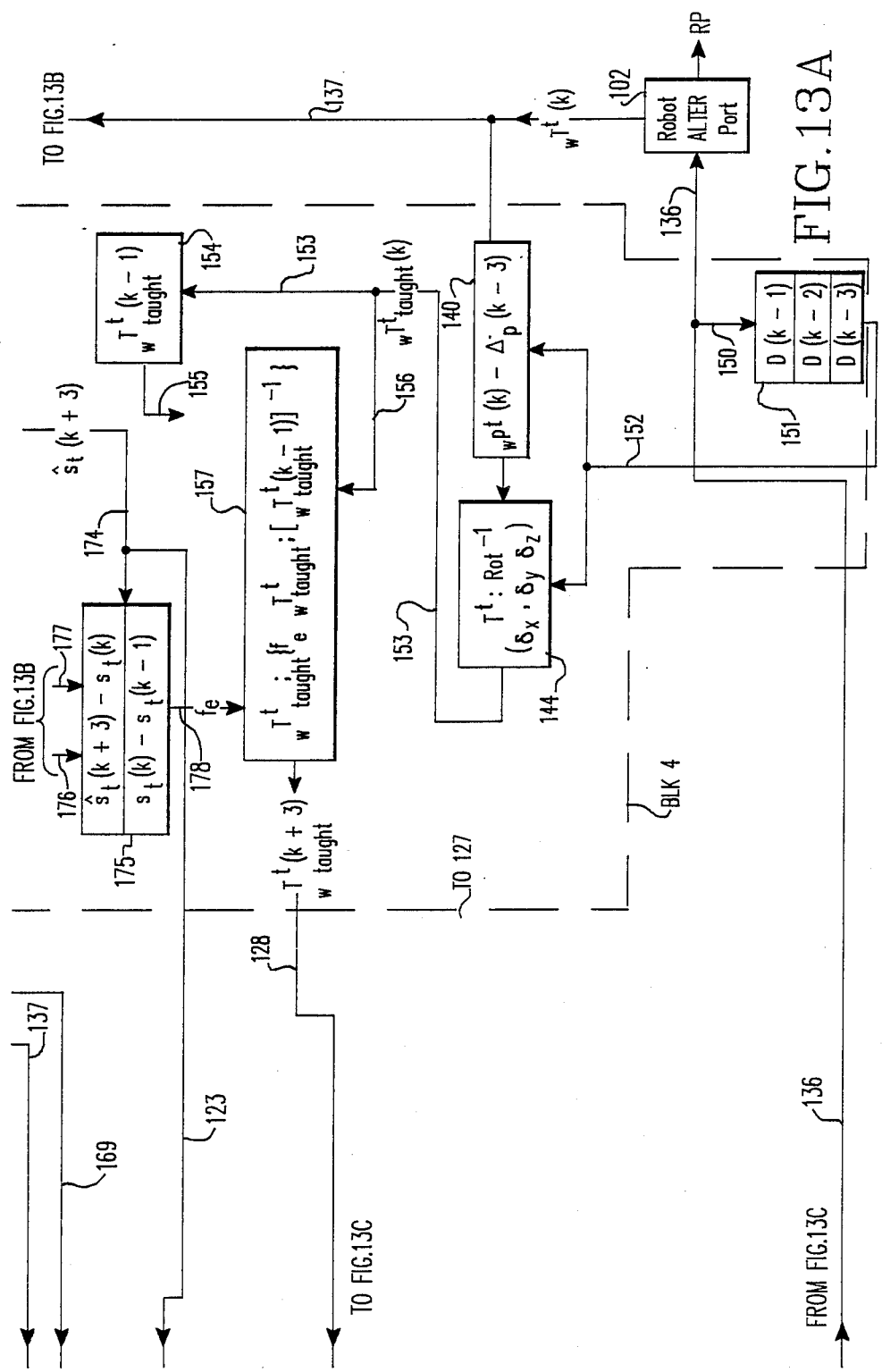

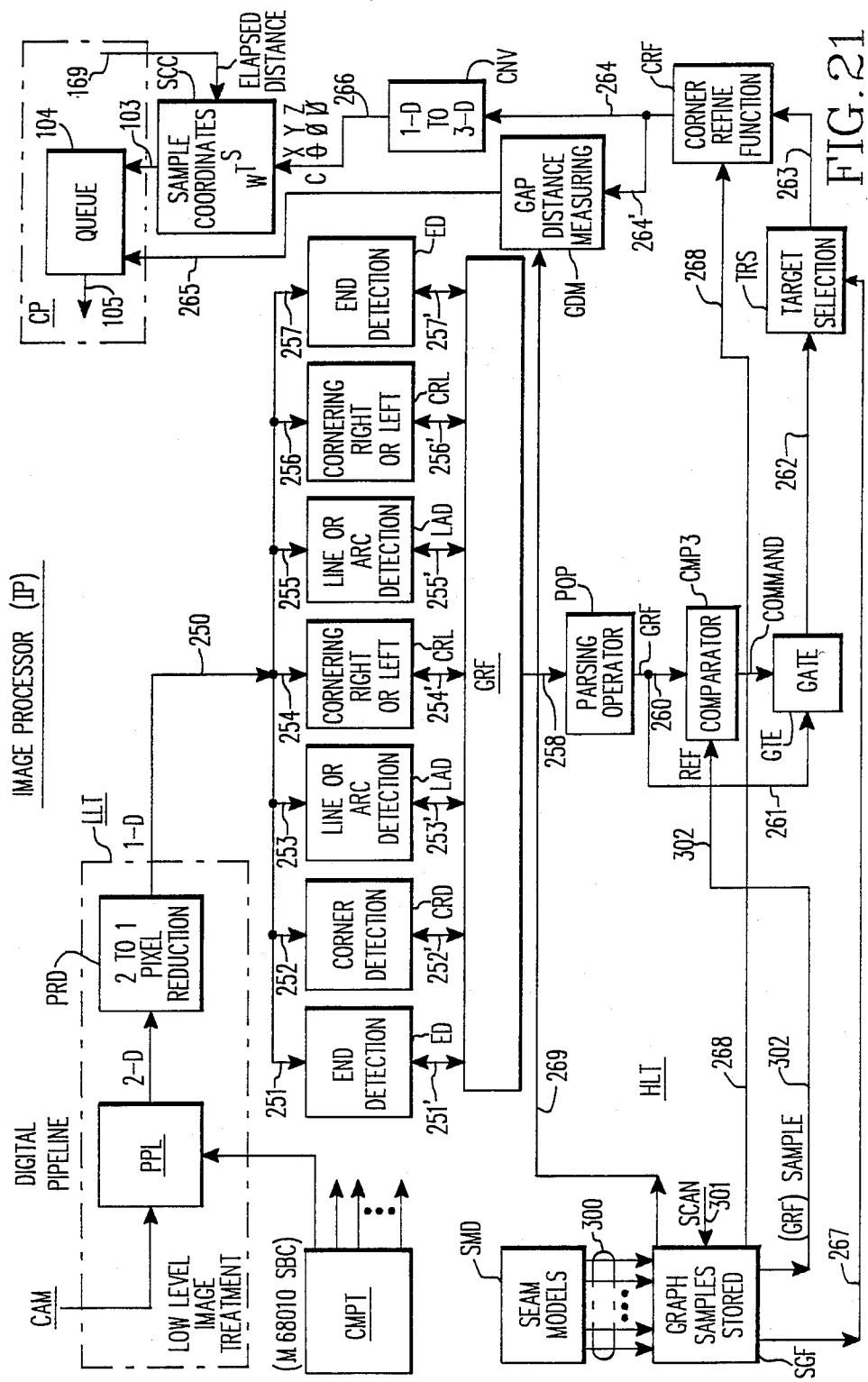

| MASK # | SE=$2^9$ | S=$2^8$ | SW=$2^7$ | E=$2^6$ | C=$2^5$ | C=$2^4$ | W=$2^3$ | NE=$2^2$ | N=$2^1$ | NW=$2^0$ | DECIMAL EQUIVALENT | OUTPUT CODE |
|---|---|---|---|---|---|---|---|---|---|---|---|---|
| 1 | 0 | 0 | 0 | 1 | 1 | 1 | 1 | 1 | 1 | 1 | 127 | 255 |
| 2 | 1 | 0 | 1 | 1 | 1 | 1 | 1 | 1 | 1 | 1 | 767 | 255 |
| 3 | 0 | 0 | 0 | 0 | 1 | 1 | 1 | 1 | 1 | 1 | 63 | 255 |
| 4 | 0 | 0 | 0 | 1 | 1 | 1 | 0 | 1 | 1 | 1 | 119 | 255 |
| 5 | 0 | 1 | 1 | 1 | 1 | 1 | 0 | 1 | 1 | 1 | 383 | 255 |
| 6 | 0 | 0 | 0 | 1 | 1 | 1 | 1 | 1 | 1 | 1 | 247 | 255 |
| 7 | 1 | 0 | 1 | 0 | 0 | 0 | 1 | 1 | 1 | 1 | 575 | 255 |
| 8 | 1 | 0 | 1 | 0 | 1 | 1 | 0 | 1 | 1 | 1 | 703 | 255 |
| 9 | 1 | 0 | 0 | 1 | 0 | 0 | 1 | 1 | 1 | 1 | 759 | 255 |
| 10 | 0 | 1 | 0 | 1 | 1 | 1 | 1 | 0 | 1 | 1 | 335 | 255 |
| 11 | 0 | 0 | 0 | 0 | 0 | 1 | 0 | 0 | 0 | 0 | 48 | 0 |
| 12 | 0 | 0 | 0 | 0 | 0 | 0 | 0 | 0 | 0 | 0 | 0 | 0 |
| 13 | 0 | 0 | 0 | 1 | 1 | 1 | 1 | 0 | 0 | 0 | 120 | 0 |

MASK BINARY CODE

| NW$^0$ | N$^1$ | NE$^2$ |
|---|---|---|
| W$^3$ | C$^4$/C$^5$ | E$^6$ |
| SW$^7$ | S$^8$ | SE$^9$ |

FIG. 23

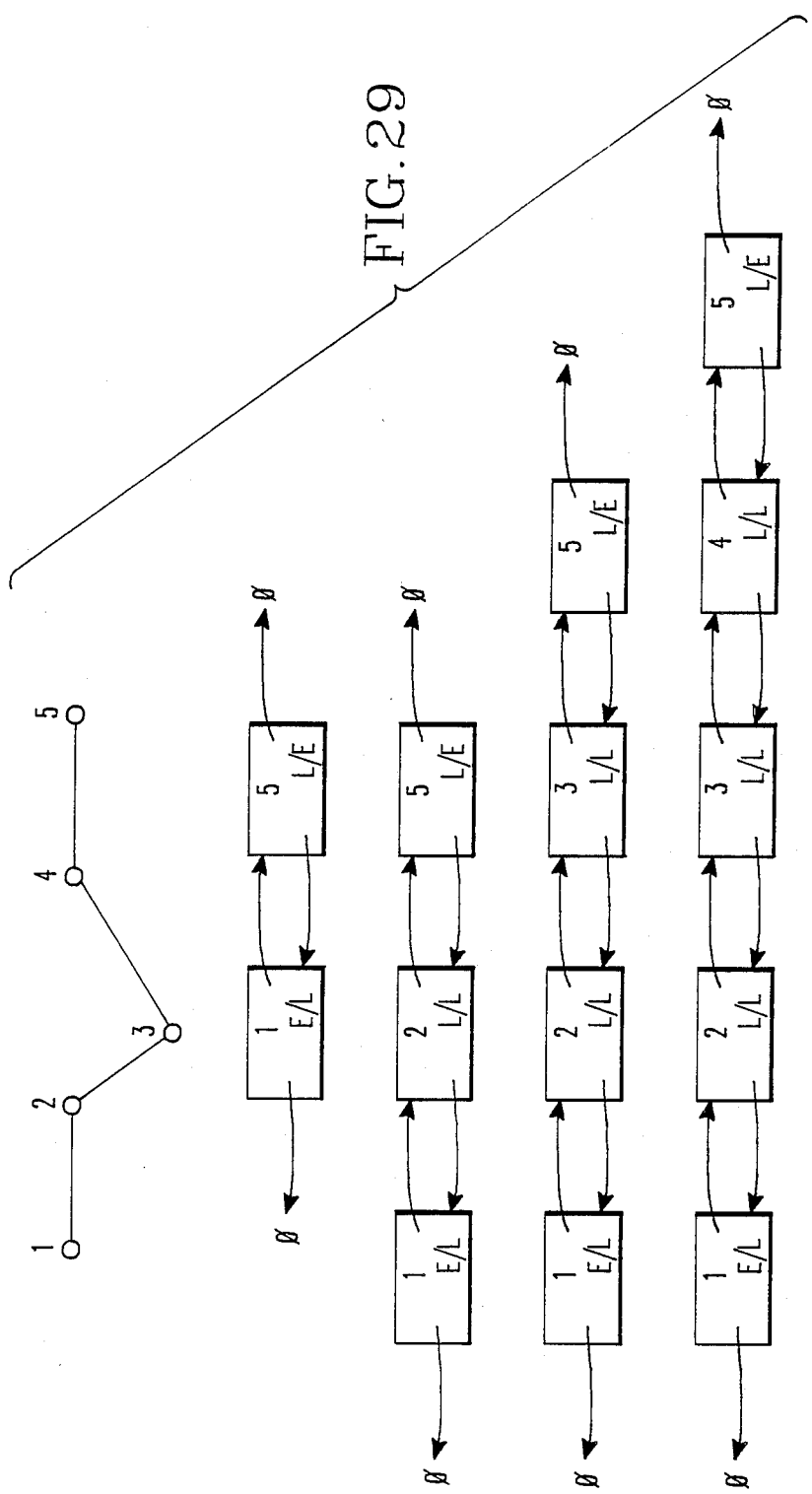

PATH CONTRIVING SYSTEM FOR LOOK-AHEAD SENSOR IN A ROBOTIC CONTROL SYSTEM

CROSS-REFERENCED PATENT APPLICATIONS

The present invention is related to:

(1) copending patent application Ser. No. 139,890 filed Dec. 31, 1987 for "Optical Automatic Seam Tracker and Real Time Control System for an Industrial Robot" which is directed to the hereinafter referred to control processor invention;

(2) copending patent application Ser. No. 140,858 filed Dec. 13, 1987 for "Image Processing System for an Optical Seam Tracker" which is directed to the hereinafter referred to image processor invention.

TECHNICAL FIELD

The invention relates to robot control for tracking with an effector end a time-based trajectory, in general, and more particularly to a control system for an industrial robot operative with a look-ahead optical sensor. The invention is applicable to welding, cutting and sealant/adhesive deposition on a seam or joint.

BACKGROUND OF THE INVENTION

The invention will be descried, for illustration, in the context of a robotic arc-welding seam tracking system. It involves two aspects: first, the automatic guidance of the robot, or other manipulator of an effector end, to follow the seam path as sensed ahead of the tool, and secondly, image processing conceived and implemented for the detection of the seam path and for the generation of parametric information to be used in controlling the industrial robot.

It is known from "Progress In Visual Feedback For Robot Arc-Welding Of Thin Sheet Steel" by W. F. Clocksin, P. G. Davey, C. G. Morgan and A. R. Vidler, in Proceedings of the 2nd Int. Conf. on Robot Vision and Sensory Control, 1982, pp. 189-200:

(1) to generate with a laser beam a light stripe on the seam to be tracked, and to derive with a camera a stripe image in a two-coordinate plane, then, to use triangulation to represent in a three-coordinate system a recognizable representation of the joint to be welded;

(2) to compute and store digitally in a data base the information associated with each point identified by a stripe along the seam;

(3) to use optically derived data to make a model defining robot positioning and to derive between triangulated optically and digitally derived information errors regarding the actual position of the gap of the joint, the root corner of the joint, and any standoff as well as lateral errors; and (4) to use such errors for correction in controlling a welding torch.

However, in the afore-stated reference, optical imaging and joint recognition are effected separately from torch control in the course of two successive seam paths, the second only being used for effective welding.

It is known from "Adaptive Robotic Welding Using A Rapid Image Pre-Processor" by M. Dufour and G. Begin, in Robot Vision and Sensory Controls, 3rd Conf. Cambridge, Mass., Nov. 6-10, 1983, pp. 641-648 to effectuate visual sensing and welding simultaneously, while accomplishing adaptive robotic welding. Real time control of the robot is the object. However, the article contemplates feedback control of the robot in response to the information obtained by optical sensing.

It is known, from "Tracking Control System For Arc Welding Using Image Sensor" by M. Kawahara and H. Matsui in Proceedings of the Eighth Triennial World Congress of the Intern. Fed. of Automatic Control, Kyoto, Japan, Aug. 24-28, 1981 (Oxford, England; Pergamon Press 1982—pp. 2117-2122 vol. 4), to use data derived from a seam stripe image for joint recognition and to compute the groove center position from which to establish groove pattern recognition and torch positioning control. Optical detection is made ahead of the torch, and the target value obtained from such optical data is delayed at each particular point, to be applied for control at a time the torch reaches the optically sensed point.

This prior art, however, assumes a simple correlation between the two displaced locations, for sensing and welding, respectively, not encountered in practice with an industrial robot, where six degrees of freedom and a relatively complex seam are to be operated on.

It is known, from "A Visual Sensor For Arc-Welding Robots" by Takao Bamba, Hisachi Maruyama, Eiichi Ohuo and Yashunori Shiga in Proceedings, 11th Intern. Symposium on Industrial Robots, Tokyo, Japan, 1981, pp. 151-158:

(1) to pass a slit beam of light upon the track to be followed so as to derive a series of stripes;

(2) to derive from a stripe by triangulation two-dimensional image of the joint;

(3) to detect an horizontal deviation of the robot position from the center in the sensing plane;

(4) to feed to a robot control system the deviation signal for correction of the torch path.

In this prior art, control of the robot is not analyzed and no other solution is proposed than under conventional feedback operation.

It is known from: "A Visual Seam Tracking System for Arc-Welding Robots" by T. Bamba, H. Muruyama, N. Kodaira and E. Tsuda presented at the 14th Intern. Symposium on Industrial Robots, Gothenburg, Sweden, Oct. 2-4, 1984, pp. 365-373, to provide visual guidance in controlling an arc-welding robot having five degrees of freedom. Sensing, however, is effected by scanning the joint area cyclically while rotating the sensing unit about the welding torch, and control of the robot is implemented directly without consideration of feedforward.

It is known from, "Model Driven Vision To Control A Surface Finishing Robot" by D. Graham, S. A. Jenkins and J. R. Woodwark presented at Robot Vision and Sensory Controls, 3rd Conf. Cambridge, Mass., Nov. 6-10, 1983, pp. 433-439, to control a robot under six degrees of freedom in response to a camera image treated and interpreted by a computer. There, however, the problem of real time control has been solved by the use of off-line analysis and the determination of pre-planned paths, as well as of computer models, for the determination of the robot kinetics.

It is known from "Data Processing Problems For Gas Metal Arc (GMA) Welder" by G. Nachev. B. Petkov, and L. Blagoev presented at Robot Vision and Sensory Controls, 3rd Conf. Cambridge, Mass., Nov. 6-10, 1983, pp. 675-680, to detect five characteristic points of the weld joint to be used in an optical sensor coordinate system and to provide therefrom information using coordinate transformations for control of an industrial robot. This approach, however, assumes an adaptation of the robot to such implementation, rather than providing control commands externally from the robot inherent characteristics.

It is generally known, from "A Real-Time Optical Profile Sensor For Robot Arc Welding" by G. L. Oomen and W. J. P. A. Verbeek, presented at Robot Vision and Sensory Controls, 3rd Conf. Cambridge, Mass., Nov. 6–10, pp. 659–668, to derive from an optical sensing system coordinates of the path to be followed by the torch, using transformation from camera coordinates to workpiece coordinates to place with a robot controller the torch in correct position. How this is done has not be shown, and the problems there involved were not considered, nor solutions were given.

It is generally known from "Joint Tracking and Adaptive Robotic Welding Using Vision Sensing of the Weld Joint Geometry" by J. E. Agapakis, J. M. Katz, M. Koifman, G. N. Epstein, J. M. Friedman, D. O. Eyring and H. J. Rutishauser in Welding Journal, November 1986, pp. 33–41 to use vision processing with stripe extraction to recognize the significant features of a weld joint for visual guidanceof a welding robot moving under a taught path, and by interpolation to locate the joint root and its distance from the taught path for robot control and correction. This technique, however, makes use of the taught path of the robot, and it fails to implement a feedforward approach.

Different look-ahead techniques have been used, in order to project the next move of an effector end while computing and controlling in anticipation of where the effector end shall be. See for instance: U.S. Pat. Nos. 4,501,950; 4,542,279; 4,590,356; 4,663,726; and 4,675,502. However, none of these is teaching how to correlate in real time and under feedforward control the sensed locations and the extrapolated taught path location in order to determine the required compensation in the inherent robot manipulations along the sensed seam, or joint. For instance, U.S. Pat. Nos. 4,590,356; 4,542,279 and 4,501,950 essentially involve terminal homing, thus no static taught path is controlling. U.S. Pat. No. 4,663,726 is concerned with the robot system itself, i.e. the robot is not an a priori for the automatic seam tracker.

U.S. Pat. No. 4,675,502 involves a real time controller for a robot utilizing the robot taught path with a look-ahead vision system. The converted sensed locations data are stored in a queue, and a slightly ahead of the tool location is retrieved as a target, which is compared with the taught path for correction and control of the tool movement from present. No taught path recovery is taking place, and the elapsed distance, rather than the velocity, is taken into consideration for establishing under feed-forward control the anticipated tool position to be aimed at with the robot.

The invention from one aspect thereof uses an interpolation mehod. In this regard, the prior art shows with U.S. Pat. No. 4,683,543 time-based interpolation control of a robot. However, in contrast with the present invention, it is not there to interpolate on the basis of elapsed distances. Another such time-based interpolation technique is shown in U.S. Pat. No. 4,663,726.

U.S. Pat. No. 3,757,125 shows an optical tracking system in which deviation of the scanning center of the seamed light is detected and correction effected to reduce the deviation to zero.

SUMMARY OF THE INVENTION

A robotic system controls about position coordinates and orientation axes an effector end connected to a look-ahead seam sensor tracking a seam path by sensing locations thereon a predetermined distance away and storing such sensed locations successively. A control processor derives from the present effector end position and from the stored sensed locations information to determine an error relative to the reset effector end position in terms of position coordinates and orientation. The compensating control signal applied by the control processor, thus, involves a yaw angle correction for the effector end.

Since as a result of control to the present effector end position the look-ahead sensor is not necessarily oriented so as to be situated above the seam path as required for sensing, the invention provides, upon each control operation by the control processor toward a new effector end position, for an additional yaw angle contriving the sensor to follow the seam path. To this effect, the control processor takes into account the stored sensed location corresponding to the present effector end position and the location being contemporaneously sensed by the sensor for determining the chord on the seam path between these two locations. Then, the yaw angle between the orientation of the effector end at the present position and the so determined chord is obtained. This is the yaw angle used when controlling the effector end toward a new position and added to the control processor derived controlling yaw angle.

BRIEF DESCRIPTION OF THE DRAWINGS

FIGS. 2A, 2B and 2C show typical joints or seams with their characteristic profiles;

FIG. 3 is a schematic illustration of a taught path for a robot system;

FIG. 4 shows graphically the relation existing between the taught path and the seam to be tracked by the tool of the robot in operation;

FIGS. 13A–13D form a block diagram explaining the operation of the control processor of FIGS. 11 and 12;

FIG. 18 is a vectorial representation of the projection of the optical distance of the sensor to the tool on the seam plane defining with the chord of FIG. 17 the yaw angle to be compensated for;

FIG. 21 is a block diagram of the overall image processor (IP) shown interconnected with the control processor (CP) of FIGS. 13A to 13D;

FIG. 23 shows the pixel mask encoding for each of the thirteen situations of FIGS. 22A and 22B;

FIG. 29 shows in relation to FIG. 27A, 27B and 28A, 28B the evolution of a corner graph translating the shape of the pixel line in a particular case;

DESCRIPTION OF THE PREFERRED EMBODIMENT

Figure 1:
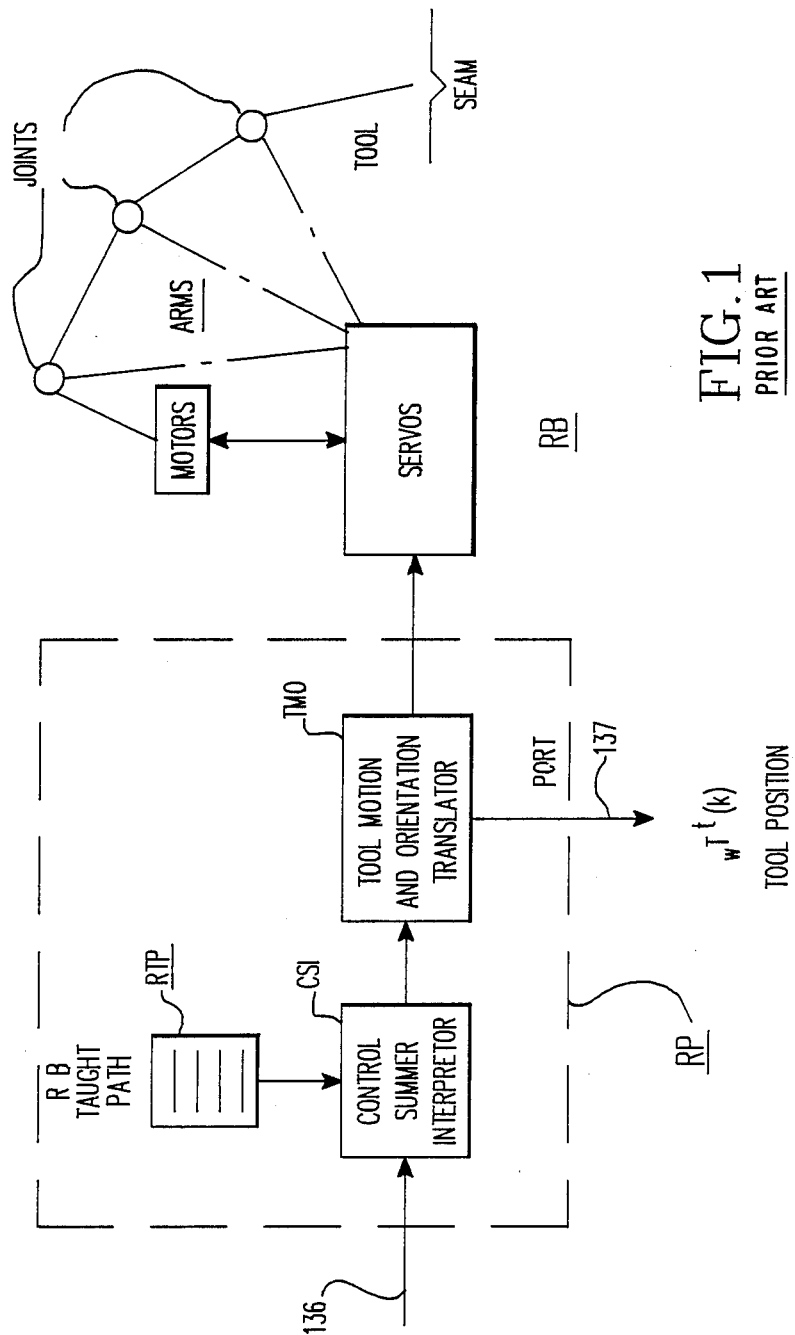
FIG. 1 represents in block diagram a robot system of the prior art.

The preferred embodiment involves three interacting microcomputers: a robot processor RB, a control processor CP and an image processor IP. The robot processor is part of the industrial robot, and will not be described since generally known. It operates with a taught path to position and orientate the effector end of the robot. The preferred embodiment will be described in two parts, namely the control processor invention and the image processor invention. The control processor uses data derived from the image processor and applies control to the robot processor. The image processor is part of an optical seam tracker sensing seam path locations ahead of the effector end. The optical sensor used for tracking and control of the industrial robot is done without the availability of the taught path embodied within the robot system. The control processor is associated with the robot system which, on the one hand, receives information regarding the effector end position and orientation, with which an estimation of the taught path is made while, based on previous control steps, the elapsed distance from the start of the tool on the path is constantly being determined, whereas, on the other hand, an image processor system is providing the elapsed distances from location to location as sensed, as well as the corresponding spatial coordinates for such locations. With such data from both sides, the control processor iteratively extrapolates where the effector end will be after at least one control step and establishes by interpolation the exact corresponding sensed location on the sensed path. The latter reveals the spatial coordinates which are attached to it, and the control processor is able in the same step to determine the error from a comparison between the coordinates as sensed and the coordinates on the recovered taught path for the extrapolated, or anticiptated effector end position. Control of the robot is effected in a feedforward fashion, control being performed with respect of the anticipated position while the effector end is moving from the present position.

Image processing is conducted from a 2-D camera image after digitialization of the video signals so as to provide a sharp contoured translation of the joint and its center, which is used as a basis for a 3-D coordinates and three-axis orientation definition of the sensed seam locations spatially and in terms of elapsed distances, for the control processor to handle.

The image processor and the control processor cooperate as a unit in integrating seam tracking and robot control. To this end the system combines three computers:

The first computer (involved with image processing) is associated with an optical sensing system providing a representation of the joint or seam ahead of the robotic controlled tool to be positioned by reference to the optically sensed image of the seam or joint; the first computer determines the center, or corner point which is the center of coordinates for movement of the tool along such seam, or joint;

the second computer (involved with the robot processor) is integrated with the industrial robot. It computes for six degrees of freedom the position of the tool along the seam or joint, besides providing the instructions required to follow the taught path and to be given the servo loops of the robot;

the third computer (involved with control processing), in response to the first computer, provides data for the second computer and corrections to correlate optical information with actual tool positioning. In so doing, the third computer takes into account the fact that the tool is moving a distance behind the optical seam, or joint, sensor. In the computation of the tool controlled coordinates and spatial relation, tool operation is effected in real time and with anticipation from a present tool position.

Referring to FIG. 1, a robot system of the prior art is shown to include a robot processor RP combining with the taught path control signal derived on line 1 from a taught path pendant RTP the corrective input derived on line 2 from a feedback signal indicative of an error in the moving and positioning of the tool manipulated by the robot RB. The signals of lines 1 and 2 are combined within the robot processor RP by a control summer interpreter which provides on line 3 the required parameters for control of the robot, namely regarding the tool 3-D coordinates x, y, z and the tool axes: lead/lag agle (or pitch), roll, and yaw. The parameters of line 3 are to this effect combined mathematically in order to transform the world coodinates of the parameters of line 3 into tool coordinates on line 4. These are accordingly controlling the servos which actuate the motors for motion and the arms at the respective joints for positioning, so that the tool can assume the required spatial position and orientation with respect to the instantaneous seam path location of the robot.

As will be shown hereinafter, according to the present invention is provided on line 1 (line 136 in FIG. 13A) a control signal obtained under a feedforward control approach by using (1) information regarding the actual tool position and orientation as derived iteratively from the robot processor on line 5 (line 137 in FIG. 13A) and (2) information simultaneously and iteratively derived through an image processor from an optical sensor disposed ahead of the tool and optically tracking the seam, or joint, being worked upon by the tool.

Referring to FIGS. 2A, 2B and 2C, three types of joints, or seams, are illustratively shown under (a), as can be worked upon by the tool, a welding torch for instance, in order to join two pieces, or plates: P1, P2. Under (b) are shown graphically and viewed in cross-section, the overall configuration of such a joint, typically a step, a V-shape, and a U-shape, respectively.

The invention will be described, illustratively in the context of a welding operation, with a torch positioned and set in motion along a joint, or seam, to be filled-up with welding material into the groove thereof. Referring to FIG. 3, the robot is given a "taught path" to follow, which allows the tool, or torch, to be positioned therealong while the tool is being controlled for operation in accordance with a reference signal. Therefore, there is a basic correspondence between the taught path and the seam path. The latter, however, is the exact trajectory determining tool operation, welding operation. Accordingly, control of the tool into position for working upon the seam and of the carriage motion along the taught path are related in space and time. The functions of the signals of lines 1 and 2 in FIG. 2 are to insure such spatial and time correlation when controlling by line 3 the motion and positioning of the tool.

Referring to FIG. 4 which provides illustratively a representation of a taught path, the latter goes from an initial location L#1 to a second location L#2 along a straight line. At location L#2 a 90 o overall rotation is effected and motion is performed thereafter from location L#2 to location L#3, also along a straight line but at right angle to line L#1-L#2. At location L#3 another rotation is effected by the carriage of the robot under command of the taught pendant, and motion is pursued from location L#3 to location L#4, also along a straight line, in the example, but parallel to line L#1-L#2. The relation between the taught path and the seam proper can be explained by considering only a straight line trajectory for the taught path like along L#1-L#2, or L#2-L#3, or L#3-L#4, in FIG. 3. To this effect, referring to FIG. 4, it is assumed that initially the robot is operative from an initial location ILTP on the taught path, while the torch, or tool, is initially at location ILSP on the seam path. It is also assumed, as generally done with a robot system, that control is effected along the trajectory by elementary steps, or straight lines, or segments, not necessarily of equal size, their duration being a time interval t, that is each is obtained under a control cycle as part of a sequence of elementary control operations. As a result the robot will follow the taught path, from position ILTP successively past locations a, b, c, d, defining segments ab, bc, cd, and the tool is being concurrently placed successively at locations A, B, C, D, along the seam path, also with segments AB, BC, and CD. In the course of the trajectory there is an elapsed distance counted from the starting point ED at location m for the taught path, ED at location M for the seam path. These elapsed distances are being considered instead of elapsed times under the cycling process. Thus, the robot system will know at each time where the robot is on the taught path and, by a reverse process from tool control, it will also know where the tool is, hopefully, on the seam path.

The preceding, however, is an oversimplification. It is under the assumption of a perfect synchronism of the operations and of a true parallelism of the trajectories. This is not the case in practice. In fact, as shown in FIG. 4, the seam trajectory differs somewhat from the ideal. Moreover, the taught path is an oversimplified representation of the true seam, or joint, trajectory. Robot control requires precision in establishing the relationship between the tool, or torch, and the seam upon which working is to be performed from point to point, or continuously. In other words, the tool should track the seam, that is, the robot should track the seam with the tool. The assumption is, then, that the seam tracker follows exactly the seam, or joint, and commands the tool to follow the seam as read. This is what is expected in principle from a feedback system, i.e. a system that can cancel instantaneously any error detected and fed back from location to location. In the example of FIG. 4, a feedback system would insure that the deviations between seam path and taught path are instantaneously compensated for during the progression, thus, in accordance with the sensed values ea, eb, ec, ed, em from A to M on FIG. 4.

In reality, the interface between control of the tool under the taught path and control of the tool to keep track of the seam path is within the robot system very complex.

Figure 5:
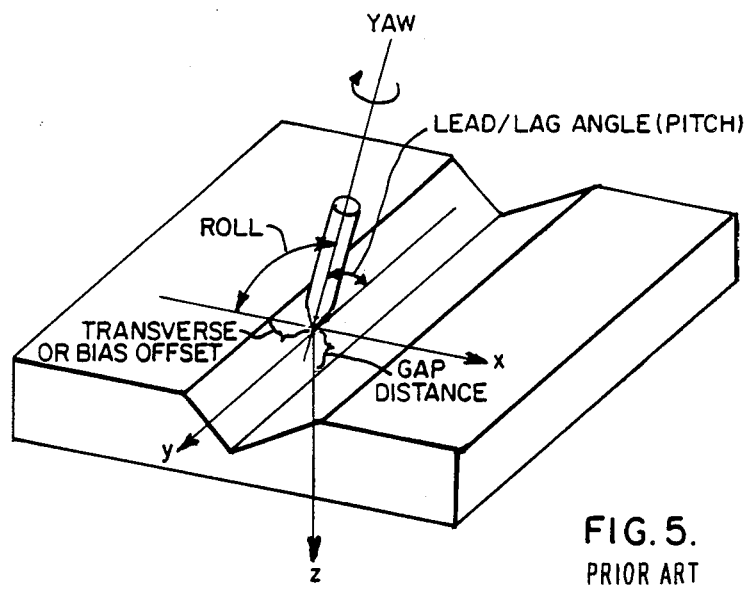
FIG. 5 is a representation of the parameters determining the positioning and orientation of the tool relative to the groove of a joint to be operated upon.

First, there is the nature of the weld joint, the nature of the tool, or torch, and the nature of the operation to be performed with the tool, which affect how the tool should be moved and positioned. For seam welding, for instance, a tool reference must be established taking into account the arc, or gap to be maintained between the tip of the tool and the bottom of the groove where welding material must be placed. There is also the required voltage and current applied to the arc and the pitch of the tool held while advancing the welding wire, or presenting the torch to the arc. Such requirements are illustrated in FIG. 5 where the tool is shown oriented in relation to the groove of the joint with a transverse, or bias offset d and a vertical offset, or gap h from the tip of the tool to the bottom of the groove.

Figure 6:
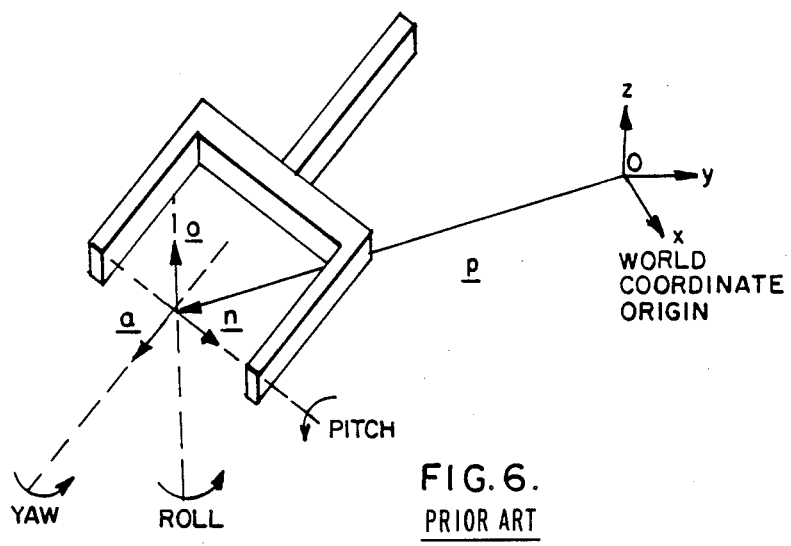
FIG. 6 shows the axes involved in the orientation of the tool in world coordinates.

There is another complexity, which is the ability of controlling a tool about its six axes, namely the 3-D coordinates of the tool, plus the pitch, roll and yaw axes. Referring to FIG. 6, the tool is shown oriented along the a axis for the yaw, the o axis for the roll and the n axis for the pitch, while being positioned.

There is also the complexity in controlling a tool with a robot along six axes, namely the 3-D coordinates of the tool, plus the pitch, roll, and yaw axes. Referring to FIG. 6, the tool is to be oriented along the a axis for the yaw, the O axis for the roll and the n axis for the pitch, while being positioned at the tip of a vector p oriented within coordinates x, y, z of a 3-D world coordinate system. Control will involve vector/matrix algebra, homogeneous coordinate transform theory, and the theory of discrete time linear dynamic systems in the process.

In position and orientation, the tool transform is given by $_wT^t$ in world coordinates. The matrix involved is:

$$_wT^t = \begin{bmatrix} n_x & o_x & a_x & p_x \\ n_y & o_y & a_y & p_y \\ n_z & o_z & a_z & p_z \\ 0 & 0 & 0 & 1 \end{bmatrix}$$

The vector p is a position vector giving the coordinates of the tip of the tool expressed as $_wT^t$ in 3-D robot base, or world coordinates. a is the "approach" vector (in the direction of applicator of the tool). n is the "normal" vector and o is the "orientation" vector.

From the $_wT^t$ transform, is derived the inverse transform $[_tT^w]^{-1}$ which is given by the relation:

$$_wT^{t-1} = \begin{bmatrix} n_x & n_y & n_z & -n \cdot \underline{p} \\ o_x & o_y & o_z & -n \cdot \underline{o} \\ a_x & a_y & a_z & -n \cdot \underline{a} \\ 0 & 0 & 0 & 1 \end{bmatrix}$$

Computation for control by the robot system also involves differential transformation. Thus, a vector of increments in position and orientation is a six-element vector given as follows:

$$\Delta = \begin{bmatrix} \Delta_x \\ \Delta_y \\ \Delta_z \\ \delta_x \\ \delta_y \\ \delta_z \end{bmatrix} = \begin{bmatrix} \underline{d} \\ \hline \underline{\delta} \end{bmatrix}$$

where for the x-axis: $\Delta_x$ denotes a position increment in the x-direction and $\delta_x$ is a rotational increment around the x-axis. Similarly, for the y-axis and the z-axis, a differential vector in one coordinate system may be transformed into a differential vector in another via the following equations:

$$\Delta x^w = \delta^t \cdot (\underline{p} \times \underline{n}) + \underline{d}^t \cdot \underline{n}$$

$$\Delta y^w = \delta^t \cdot (\underline{p} \times \underline{o}) + \underline{d}^t \cdot \underline{o}$$

$$\Delta z^w = \delta^t \cdot (\underline{p} \times \underline{a}) + \underline{d}^t \cdot \underline{a}$$

$$\delta_x^w = \delta_x^t \cdot n_x + \delta_y^t \cdot o_x + \delta_z^t \cdot a_x$$

$$\delta_y^w = \delta_x^t \cdot n_y + \delta_y^t \cdot o_y + \delta_z^t \cdot a_y$$

$$\delta_z^w = \delta_x^t \cdot n_z + \delta_y^t \cdot o_z + \delta_z^t \cdot a_z.$$

The n, o, a and p vectors are drawn from $[_wT^t]^{-1}$ in this case.

These elements of complexity are not encountered where robot displacement and seam trajectory involve a reduced number of degrees of freedom for the robot carriage and for the tool.

The present invention involves six degrees of freedom in tool positioning and orientation. In addition, what has not been considered in FIG. 3 is the complexity resulting from the fact that recognizing where the seam is actually located as sensed has to be coupled with where the tool has to be operatively disposed, and in real time for both seam tracking and tool operation.

Figure 7:
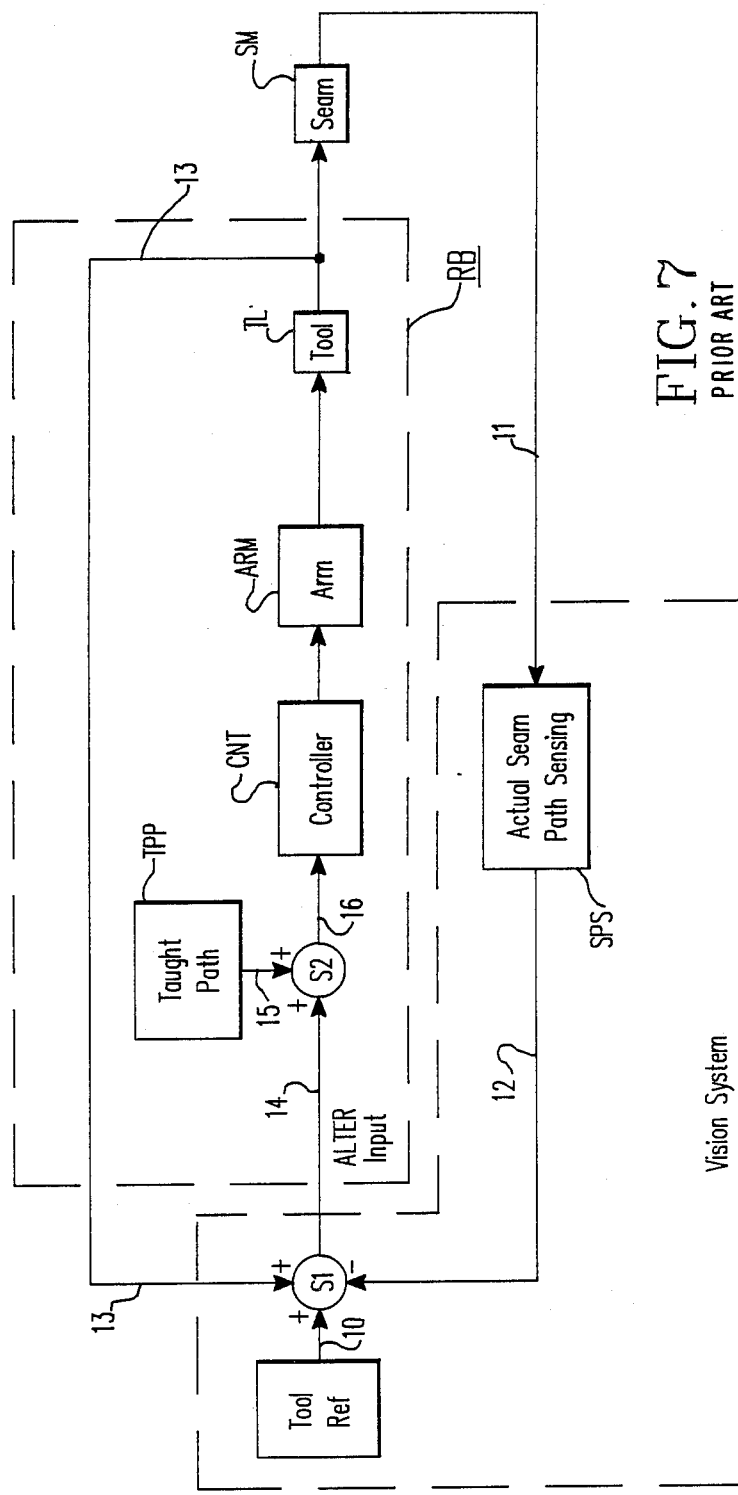
FIG. 7 is a block diagram illustrating control of a robot with a seam tracker using the feedback approach.

A straight forward approach to this problem has been the negative feedback approach. This approach is illustrated by FIG. 7.

In accordance with general feedback technique, the position of the tool is sensed by line 13, the seam is sensed by line 11. The detected signal of line 11 is amplified and scaled by an acutal seam path sensing unit SPS so as to provide on line 12 a signal which is compared with the tool position representative signal of line 13. Summer S1 provides an error signal on line 14 which is used by robot control to bring the error to zero. The tool reference signal is applied to summer S1 by line 10 so that, in the absence of an error, the robot RB can position and orientate the tool as it should for operation on the groove, like in FIG. 5. Control is effected by the robot through a controller CNT, an arm ARM as generally known and as schematized in FIG. 1. The controller is responding to the taught path from line 15 and to the control signal of line 14 which concurrently by summer S2 establish the control signal of line 16 into the controller.

Figure 8:
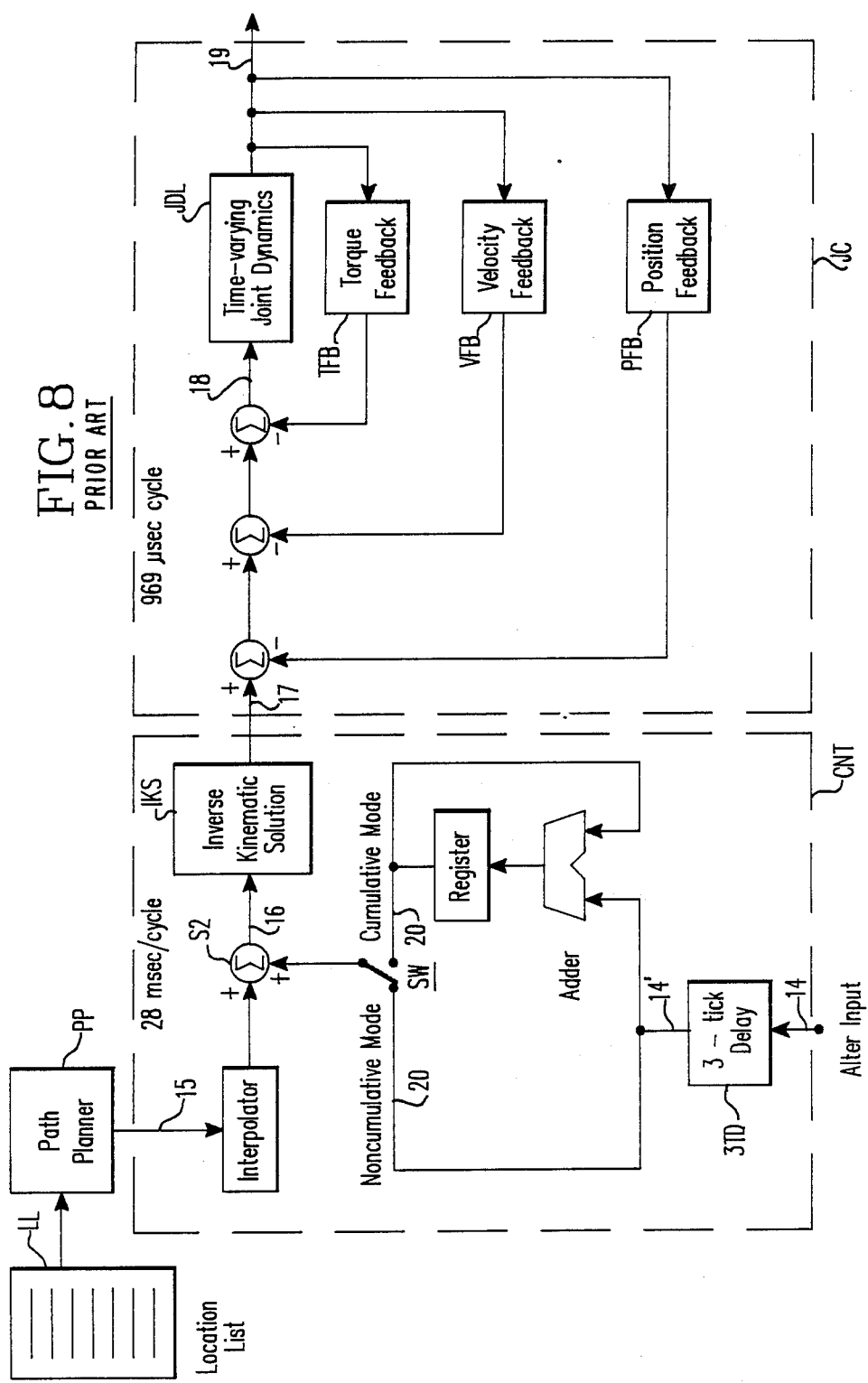
FIG. 8 illustrates in block diagram dynamic operation of a robot system under a stored taught path.

Referring to FIG. 8, this portion of the controller operation is shown with more details.

The taught path is derived from a list of locations LL defining the taught path. Data from the list is dynamically translated into a control signal by a path planner PP. The controller is operated cyclically, typically with a period of 28 msec, so as to complete and settle the preparatory steps for the next cycle. Tool positioning and seam location determination, also typically, are effected on the basis of three consecutive locations, for averaging. This means that the values are stored for the present and the last two locations. When data for the new location is added data for the said location in the past is taken away from storage. This is done for the control operation for each new tool location. This is referred, hereinafter, as a 3-tick delay (3TD). The error of line 14 is thus, translated into an average error on line 14', which may be used cumulatively, or in a non-cumulatively mode, depending on the position of a switch SW. In the cumulative mode, an adder receives the three-tick information and adds to it the feedback value from the output on line 18 which goes to summer S2. In the noncumulative mode, the error of line 14' via switch SW goes directly to summer S2.

The signal of line 16 within the controller CNT is transformed into its variable for the particular axis, or coordinate, for a total of six joints. FIG. 8 illustratively shows for one joint the individual error signal used by inverse transformation, at IKS, and the ensuing control signal of line 17 operating upon the joint angle under three feedback loops, one for the torque (TFB), one for the velocity (VFB) and one for the position (PFB), which are all concurring in bringing the error on control line 16 to zero through joint adjustment, through a time-varying joint dynamic control loop JDL, via a control signal on output line 19 to the joint motor.

Since the motion of the particular robot is controlled so that dynamic effects of joint motion settle out within less than 28 milliseconds, it is only necessary to consider setpoint and time delay effects when modeling the robot for control purposes. The motion in the noncumulative mode may be expressed by $$_w\underline{p}^t(k) = {_w\underline{p}^t_{taught}}(k) + \underline{p}_{shift}(k-3)$$

and $$_wo^t(k) = (k):Rot[x,\delta_x(k-3)]:Rot[y,\delta_y(k-3)]:Rct[z,\delta_z(k-3)] :_wo^t_{taught}$$

where $_wo^t(k)$ is the orientation submatrix of an hetm and Rot[x, $\delta_x$] denotes rotation around the x-axis by angle $\delta_x$. In the cumulative mode, the equations are:

$$_w\underline{p}^t(k) = {_w\underline{p}^t_{taught}}(k) + \sum_{m=0}^{k-3} \underline{p}_{shift}(m)$$

and $$_wo^t(k) = (k):Rot\left[x, \sum_{m=0}^{k-3} \delta_x(m)\right]:$$

$$Rot\left[y, \sum_{m=0}^{k-3} \delta_y(m)\right]:Rot\left[z, \sum_{m=0}^{k-3} \delta_z(m)\right] :_wo^t_{taught}$$

Figure 9:
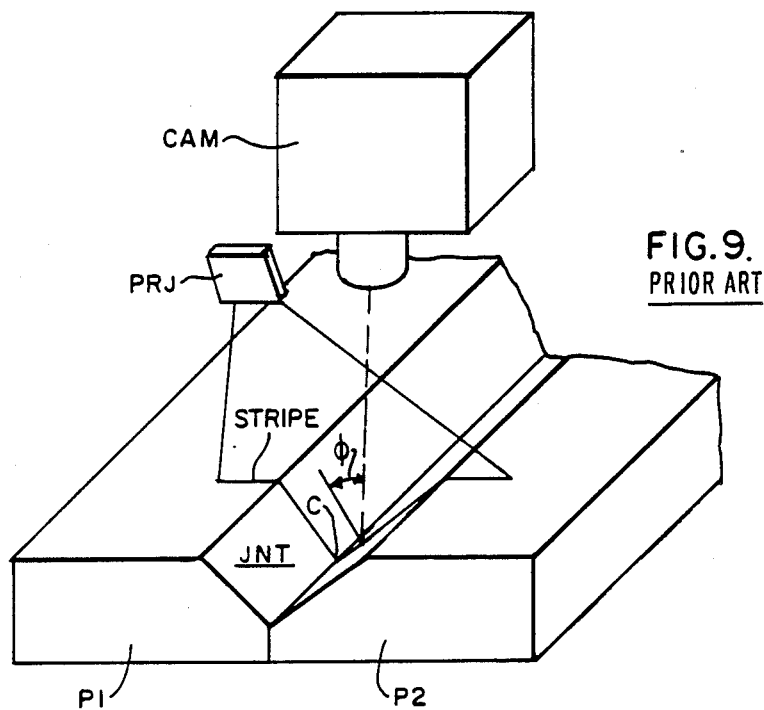
FIG. 9 shows an optical sensor using a light beam projection to form a stripe on a joint and viewed by a camera for further treatment in ascertaining the seam path in an auto-tracker.

Feedback control requires sensing. Sensors had to be developed to provide an informative system relative to the seam being tracked and generate data appropriate to the computational elements of a modern computerized robotic system. For this purpose, the most chosen technology is electro optics. In these systems, for automatic seam tracking, a vision system is used capable of measuring the position and the dimensions of the seam, or joint. This has been done, preferably, with a picture of a laser stripe reflected from the joint, as shown in FIG. 9. A light beam derived from a projector PRJ scans the joint JNT transversely and a camera CAM captures at an angle $\phi$ to the plane of the scanning beam, the image of the stripe formed on the surface of the groove and bordering planes or plates P1, P2. The image is like typically shown under (b) in FIGS. 2A, 2B, 2C. The process is cyclically done, the camera image is read-out upon every frame, so that a strip is detected in a discrete fashion at each of successive locations of a strobing sequence along the seam. A technique is used to determine the center C of the stripe which has to be followed along the seam from one location to the next.

Figure 10:
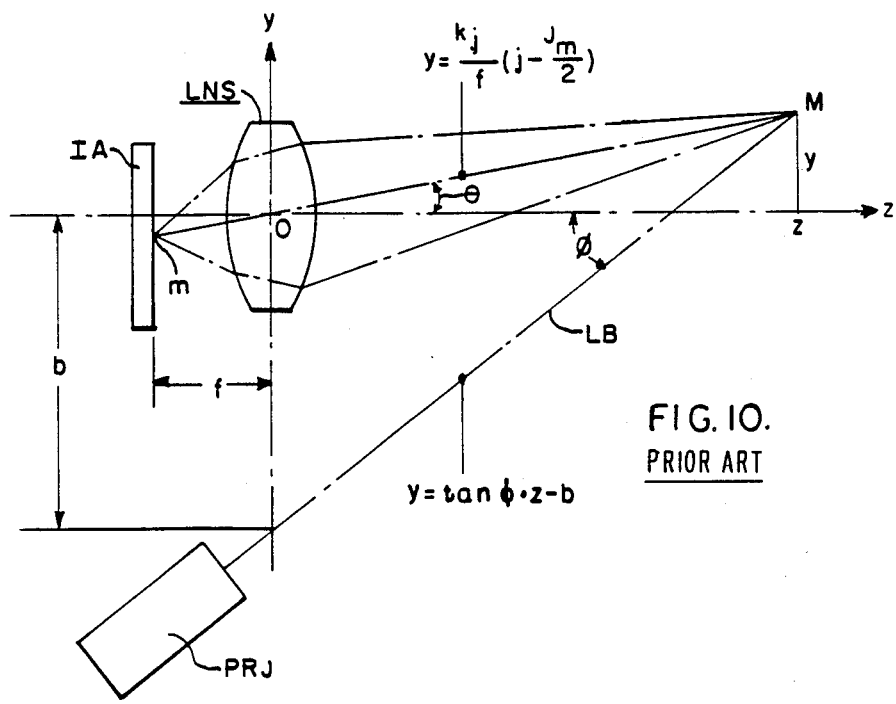
FIG. 10 represents the optical system and defines the geometric parameters for stripe triangulation analysis.

FIG. 10 shows the optical system used to sense the seam along its track and to derive a location-to-location tracing of the trajectory. A projector PRJ scans with a light beam LB the plate to be joined and hits at a given instant, a point M thereon. The ray of light is defined by its angular position $\phi$ relative to the axis z of the optical system, namely the axis of the lens system symbolized by a lens LNS having a center O and a plane orthogonal to axis z along an ordinate y. Behind the lens, at a distance f from the center is the focus plane which carries the image array IA upon which for each impact M of the projector's beam, corresponds an image point m. M has an ordinate y and an abscissza z, while m, has an ordinate j and an ordinate i, the latter normal to the plane of FIG. 10 and in the plane of array IA. The optical system has 3-D coordinates, x, y, z, the first x being normal to the plane of FIG. 10 at center O. The image of the strip containing point m is a 2-D image in the plane of array IA of coordinates (i, j). If in the plane of FIG. 10, axis y intersects the beam of light at a distance b, and the axis z of the optical system is at an angle $\phi$ to line mM passing through center O, basic stripe triangulation analysis leads to the following equation:

$$y = \tan[\phi] \cdot [z] - b \quad (1)$$

$$y = \tan[\phi] \cdot z \quad (2)$$

Using similar triangles, tang $\phi$ can be related to image coordinates. Thus, if $J_m$ in the maximum vertical resolution of the sensor and $k_j$ the vertical distance between pixels on the camera array IA, j being the ordinate of m on the array, the light stripe image on the sensor from the center point C of the image (i, j) is:

$$k_j \left( j - \frac{J_m}{2} \right)$$

$k_j$ is the vertical interpixel distance
$J_m$ is the maximum vertical resolution of the sensor
The value of $\tan \phi$ is then $$\tan\phi = \frac{k_j}{f} \left( j - \frac{J_m}{2} \right)$$

where f is the distance from the lens center O to the focal plane. (This distance is *not* the focal length of the lens, unless the lens is focused on infinity.) Substituting into equation 2:

$$y = \frac{k_j}{f} \left( j - \frac{J_m}{2} \right) z$$

Solving the last y equations simultaneously:

$$Z = \frac{b}{\tan\phi - \frac{k_j}{f} \left( j - \frac{J_m}{2} \right)} \quad (3)$$

and, by substituting z into equation (1):

$$Y = \frac{\frac{k_j}{f} \left( j - \frac{J_m}{2} \right) b}{\tan\phi - \frac{k_j}{f} \left( j - \frac{J_m}{2} \right)} \quad (4)$$

where $k_j$ is the vertical interpixel distance and $J_m$ the maximum vertical resolution of the sensor.

By similar analysis for the x-direction, $$X = \frac{\frac{k_i}{f} \left( i - \frac{I_m}{2} \right) b}{\tan\phi - \frac{k_j}{f} \left( j - \frac{J_m}{2} \right)} \quad (5)$$

where
$k_i$ is the horizontal interpixel distance, and
$I_m$ is the maximum horizontal resolution of the sensor.

Equations (3) and (4) are functions of constants which are known or calibrated and a single variable, j. The dynamic range of j is not excessive (only 1 to 512) so that those equations may be implemented as lookup tables. Equation (5) is a function of z constants and the image variable i. It may be implemented in a rapid fashion using a lookup table and one multiplication.

One of the three rotational degrees of freedom can be obtained from analysis of the slope in the image. The surface slope component $m_{zx}$, defined by $$m_{ZX} = \frac{dZ}{dX} \simeq \frac{\Delta Z}{\Delta X}$$

is related to the image slope $\Delta j / \Delta i$, when the stripe projector is aligned to put lines parallel to the i axis when a flat surface is normal to the lens principal axis. The relationship is not simple, nor linear, by may be derived through the use of total differentials. For instance, for dZ:

$$dZ = \frac{\partial Z}{\partial j} \Delta j = \frac{b k_j / f}{\left[ \tan\phi - \frac{k_j}{f} \left( j - \frac{J_m}{2} \right) \right]^2} \Delta j$$

Figure 11:
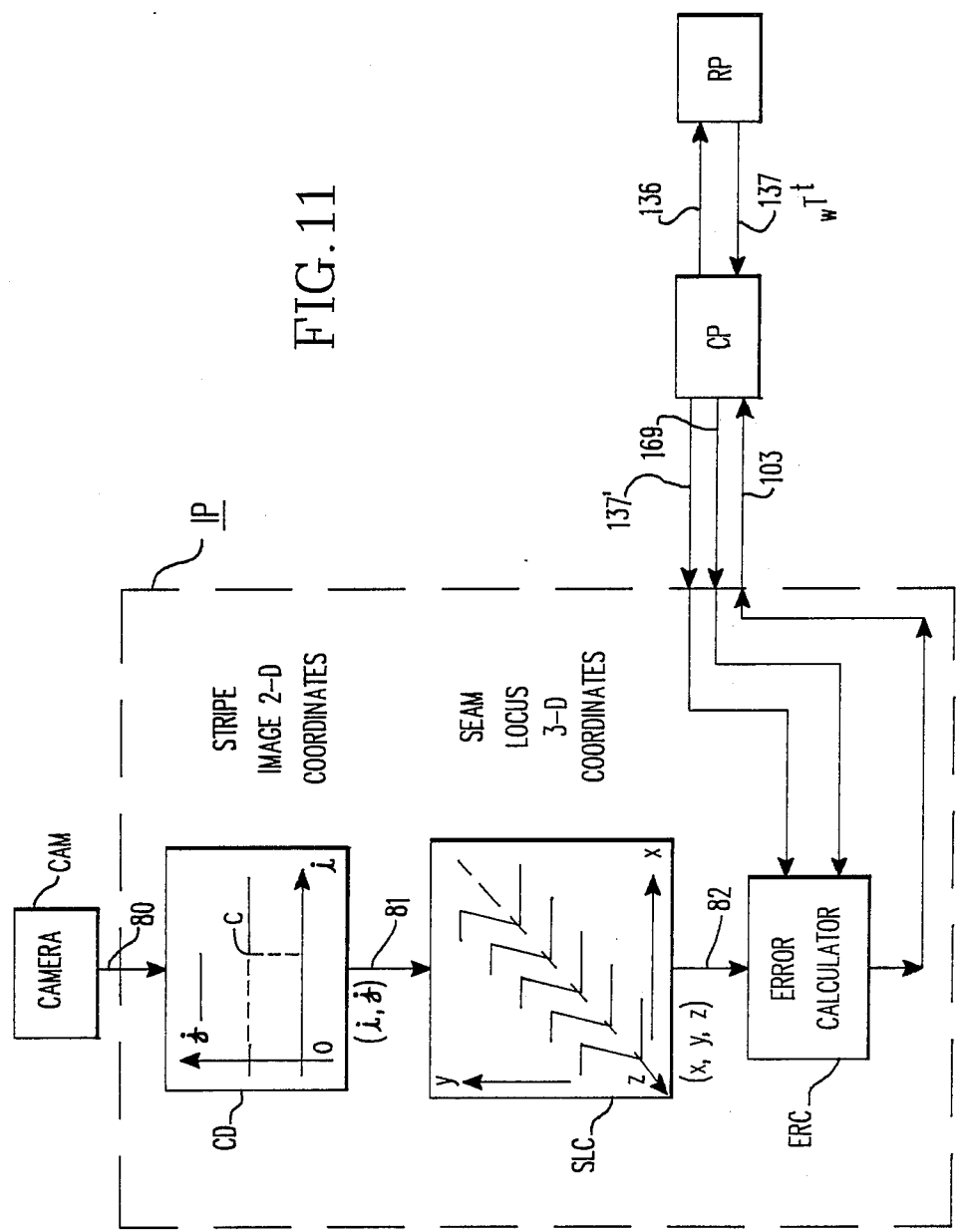
FIG. 11 shows in block diagram the interfacing between the optical system and the robot system, involving according to the invention an image processor and a control processor.

Referring to FIG. 11, the optical system provides on the camera an image in two dimensions (i, j) like shown under (b) in FIGS. 2A, 2B, 2C. By line 80, a digitized information as a video camera derived signal, is inputted into an image processor IP. Within the image processor IP at CD, the center C of the seam profile is determined by its coordinates i, j. By line 81 such information is passed to a processor sub-unit SLC which collects the successive images along the x axis, and provides the seam path in 3-D coordinates. Accordingly, on line 82 is derived, as the locus of the successive locations of the center C, the seam path in 3-D coordinates, thus, as sensed optically.

On the other hand, the robot processor RP knows where the tip of the tool in world coordinates has been positioned at a given instant. This is expressed as $_wT^t$ and derived on line 137 from the robot and inputted in the control processor CP. The control processor CP passes this information to the image processor IP on line 137'. On the other hand, the control processor sends to the robot processor a corrective signal on line 135 to compensate for an error in tracking the seam path. At this point, it is observed that the optical sensor being mounted ahead of the tool, the sensed location for the seam track, on line 82, is not where the tool is. The tool will reach the sensed location after a certain delay in processng cycles, typically 100 ticks, which with a 28 msec/tick amounts to 2.8 sec.

As explained hereinafter, according to the present invention, the sensed locations are by the image processor identified successively for each location while indicating how far from the start, i.e., the elapsed distance on the seam, and the corresponding 3-D coordinates and 3-axis orientation for the tool if it were there. These values are stored into the control processor by line 103. The elapsed distance is provided by the control processor CP to the image processor IP via line 169 in order to correlate it with the elapsed distance of the tool, the latter being based on information derived from the robot processor RB by line 137, which is the tool actual tip coordinates in position and orientation at the present cycle of control. At this time, the control processor extrapolates from the last two locations where the tool will be assuming a linear progression along the seam path. At the same time, the control processor recovers the taught path which is not directly available from the industrial robot and also extrapolates on the recovered taught path from the two last locations for which the two last controls have been exercised. Using the elapsed distance for the tool, the information received on line 103 from the image processor IP as to elapsed distance and correlated sensed locations in spatial position and orientation, the actual elapsed distance corresponding to such extrapolated position of the tool is determined by interpolation between two consecutive sensed locations and the corresponding actual anticipation for the tool is identified in terms of position and orientation.

From the latter interpolation results and from the earlier extrapolation position and orientation an error is established by the control processor which is used by line 136 to control the robot in relation to the taught path, thus, within the robot processor RB. It has been assumed earlier that a three-tick spread is performed in the control process. This means that the extrapolated location for the tool is looked upon at instant $k+3$ where k is the present instant of control and calculations. Similarly, recovery of the taught path is effected at instant k based on controlling error involved in control of the robot at instant $k-3$.

Figure 12:
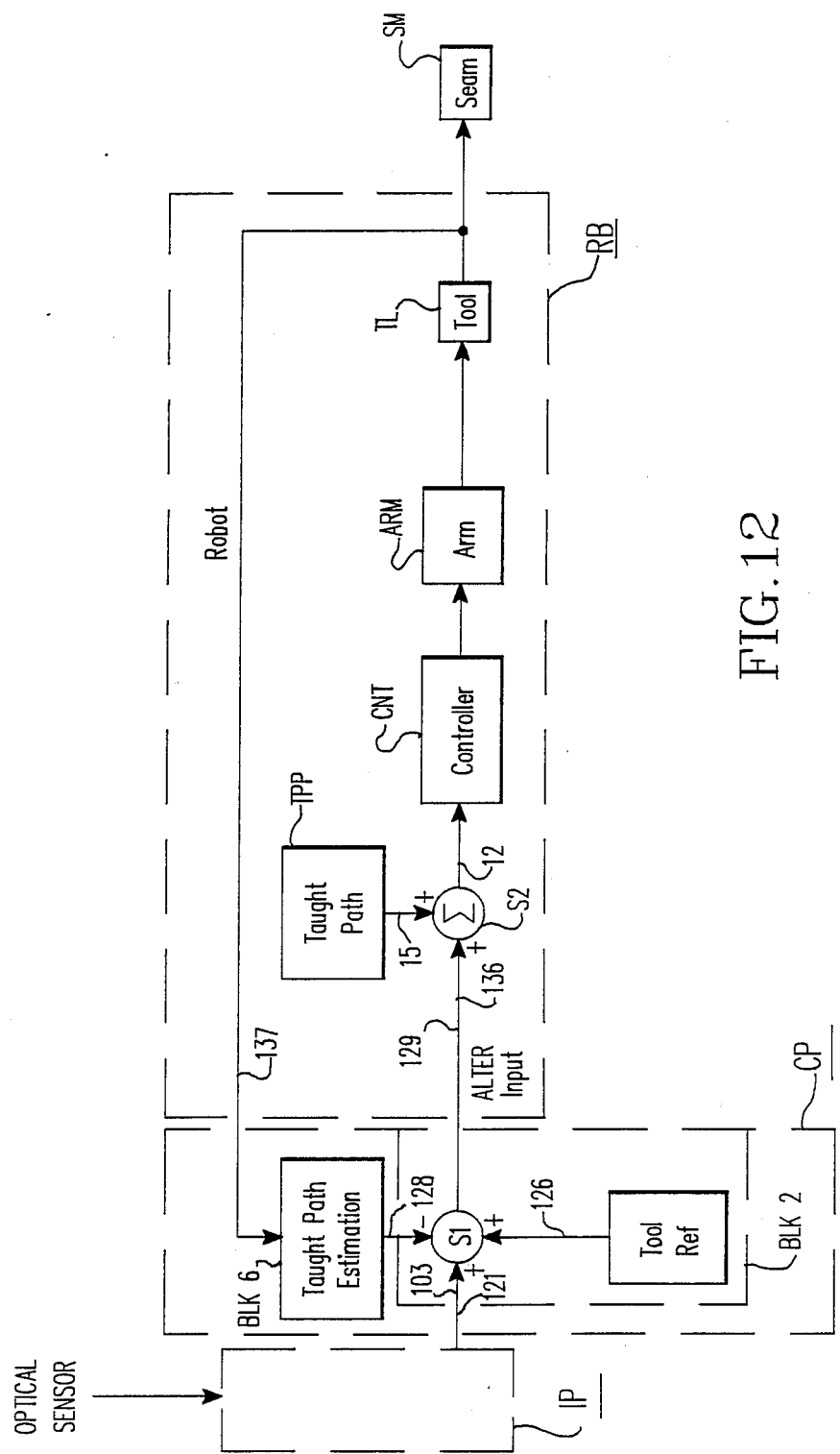
FIG. 12 is a block diagram showing how the control processor of FIG. 11 effectuates feedforward control of the robot system.

Referring to FIG. 12, feed-forward control according to the invention is illustrated in block diagram. The optical sensor provides for the image processor IP all the information necessary to determine where the center C of the strip is located, in real time for each location in the sequence of images with the camera CAM. Accordingly, at the output of the image processor IP is known the actual location of the seam, namely on line 103, or 121. By line 137 the robot RB knows where the tool tip is located in world coordinates. From such tool location, which is behind the series of seam locations detected by the sensor block BLK effectuates an extrapolation of the tool position. It is assumed hereinafter, that the time difference is of 3-ticks, which means that if the tool at instant K (present time) is as shown by line 137, it will take 3 cycles to effectuate the full correction at the extrapolated location when it is needed. Therefore, the tool tip position $_wT^t$ is extrapolated to instant $(k+3)$. Within block BLK2, summer S1 compares where the corresponding seam location is, as known from lines 103, 121, and an error is derived as required to adjust normal control, in response to line 126 under the tool reference, thereby to provide corrected input into the robot RB, by line 136. Otherwise, the robot function is like under the feedback approach of FIGS. 7 and 8, to position and orientate the tool so that the tool tip be properly positioned regarding the seam as sensed by the optical sensor.

First the internal organization of the control processor CP will be considered by reference to FIGS. 13A–13D, 14A, 14B and 15; then, consideration will be given to the structure and operation of the image processor IP.

Figures 14A, 14B:
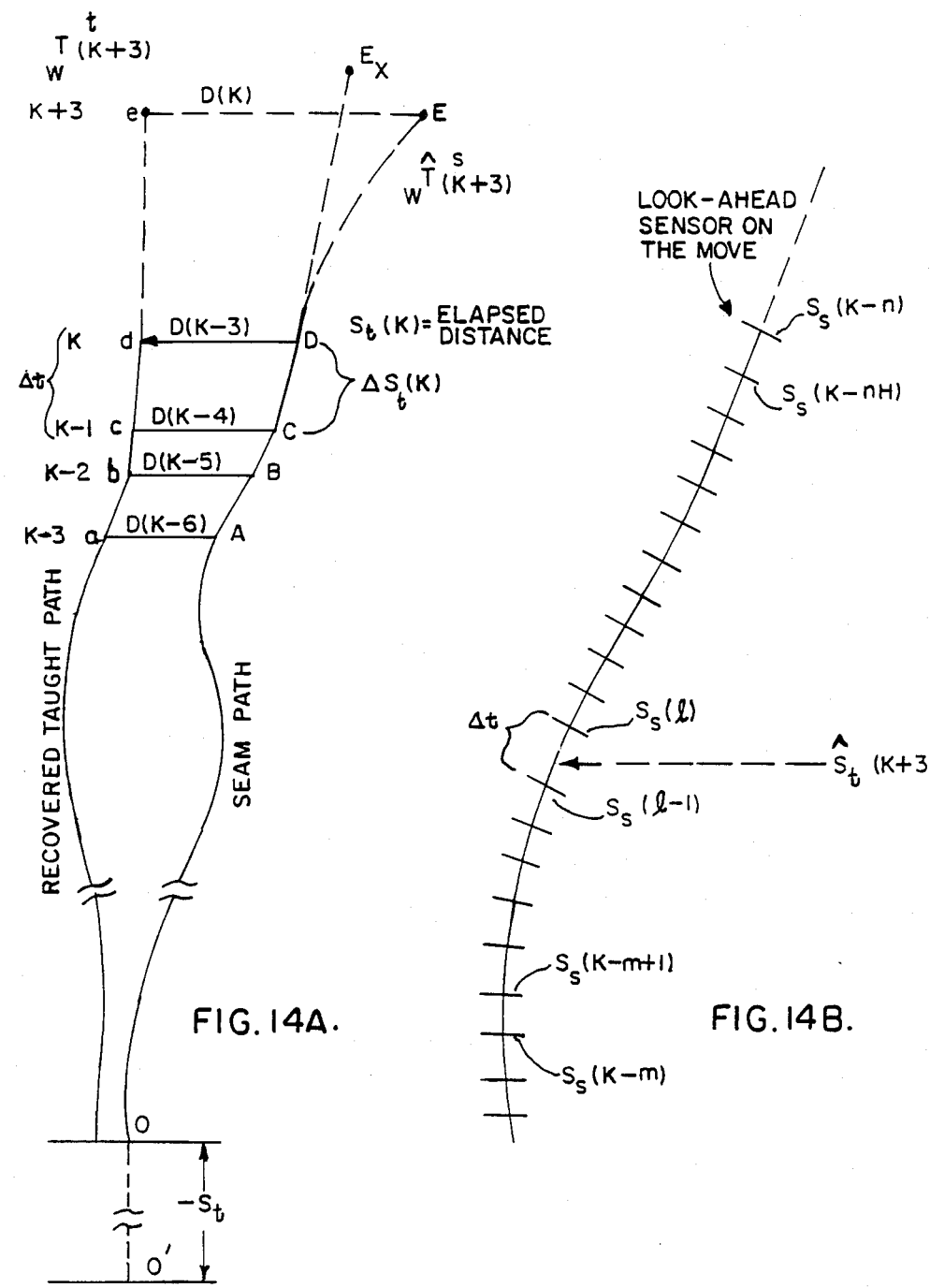
FIG. 14A is a graphic representation of the seam path and the recovered taught path, with the extrapolated tool location on the seam under a three-tick series of moves, as seen upon each cycle of the control sequence of the industrial robot performed under the control processor according to the present invention.
FIG. 14B is a graphic representation of the locations in terms of elapsed distance as sensed by the optical sensor along the seam or joint, the sampled elapsed distance bracketing the elapsed distance on the extrapolated location of FIG. 14A being identified, illustratively.

Referring to FIG. 13A, the control processor is interposed between the robot processor RB, with which it communicates through robot ALTER port 102, and the image processor through IP port 101. The industrial robot controls the effector end in position and orientation in relation to a taught path, as generally known. The taught path, however is not known outside the robot. According to the present invention the taught path is "recovered" by the control processor for use therein. To this effect, at the present instant k, information is derived on line 137 from robot ALTER port 102 as to where the tip of the tool actually is at such instant. This information is represented by transform $_wT^t(k)$ in world coordinates. As earlier stated the matrix involved is:

$$_wT^t = \begin{bmatrix} n_x & o_x & a_x & p_x \\ n_y & o_y & a_y & p_y \\ n_z & o_z & a_z & p_z \\ 0 & 0 & 0 & 1 \end{bmatrix}$$

where the vector p position vector gives the coordinates of the tip of the tool, and where the projections at right angle to one another of the a (approach), n (normal) and o (orientation) vectors are given as shown. This is tool position D on the seam path for instant k as shown in FIG. 14A. At instant $(k-1)$ the position was at C. Since control is effected (illustratively) on a three-tick step, the tool position D on the seam path at instant k, results from a correction for a required deviation $D(k-3)$ from the taught path location dd, determined and commanded from the robot three cycles $\Delta t$ earlier. The taught path not being known from the industrial robot, the information on line 137 is used to "recover" the taught path as follows:

Referring again to FIG. 13, by line 140 the position vector p is derived and by line 152 the deviation $D(k-3)$ is retrieved from a queue 151 where it had been stored. Lines 140 and 152 are feeding information into block 143 where is computed $$_wp^t(k) - \Delta p(k-3)$$

thereby providing point d of FIG. 14A in term of spatial position. Similarly, from lines 140 and 152, block 144 provides the orientation ($\delta x$, $\delta y$, $\delta z$) for the estimated taught path position d by using $_wT^t:Rot^{-1}$. This being done for all past instants $(k-1)$, $(k-2)$, $(k-3)$, ... the taught path is recovered as segments, illustratively shown for the last locations a,b,c,d. As a matter of fact the "recovered" path was initiated at the origin O of the jont. Thus, on line 153 is obtained the transform $_wT^t_{taught}(k)$ for instant k and, considering block delay 154, on line 155 is obtained the earlier position on the recovered taught path $_wT^t_{taught}(k-1)$.

At the same time (FIG. 13B) on line 138, like on line 139, is derived from line 137 the vector position $_wp^t(k)$ for instant k, and on line 139 with a delay of one cycle is now derived the vector position $_wp^t(k-1)$, which had been stored in block 142. Block 141 responds to line 138 and to block 142 to provide on line 161 $\Delta S_t(k)$ according to the equation:

$$\| \underline{p}(k) - \underline{p}(k-1) \| \; \Delta S_t(k)$$

This is the spacing between points C and D on the seam path graph of FIG. 14A. This being done successively from the start, (still in FIG. 13B) the segments are totalized by blocks 163 and 165 (where block 163 adds up the last segment to the previous total of line 168), thereby providing on line 170 the "elapsed distance" since the start on the seam path for the tool, namely: $s_t(k)$. At the last cycle was delayed the result of line 170, so as to make available at instant k the last elapsed distance, thus, the total until point C for instant $(k-1)$. Therefore, the two elapsed distances appear on respective lines 176 and 177 and are to be applied both to blocks 173 and 175, as explained hereinafter. Similarly, from line 161 and by blocks 162 and 164, is determined the elapsed distance $s_s(k)$ for the sensor on the seam path, as counted from the origin O, but with a phase difference relative to the tool as shown by the distance $-s_t$ to the virtual initial start O' of the tool behind the sensor origin O. The current elapsed distance for the sensor $s_s(k)$ is sent to the image processor by line 169 and through image processor port 101. As earlier stated, the sensor is phase shifted ahead of the tool by, typically, 100 msec. compared with control the cycle of $\Delta t = 28$ msec., also typically. As explained later, the image processor IP is associating each of the sensed locations with a determined tool spatial position and orientation. Thus, for each elapsed distance sampled for such location ($s_s(k)$) there is a corresponding world coordinate transform $_wT^S(k)$. Referring to FIG. 13C, these paired data, received through the IP port 101 are stored into a queue 104 from the start and classified by consecutive elapsed distances (used as an address in the RAM chosen for such purpose). By looking at instant k to a particular tool position anticipated by the control processor, it will be determined with the corresponding IP elapsed distance (or address of RAM 104) what the sensed coordinates and orientations are for the tool at such location (line 125). The recovered taught path corresponding location (line 128) will permit the determination of the deviation (D(k)) for instant k to be used in controlling the robot by line 126 in bringing back the tool on such sensed location.

As shown in FIG. 14A, the tool path anticipated tool position is obtained by extrapolation linearly from segment CD, which leads to extrapolated position Ex. C and D are given in terms of elapsed distance by blocks 171 and 165. To extrapolate tool elapsed distance in three ticks, the tool path extrapolated tool position is at instant (k+3) at an anticipated distance given by the formula:

$$S_t(k+3) = S_t(k) + 3\Delta t \cdot \frac{S_t(k) - S_t(k-1)}{t(k) - t(k-1)}$$

wherein $t(k) - t(k-1)$ is equal to $\Delta t$, equal to 28 msec. Therefore the formula reduces itself to:

$$S_t(k+3) = S_t(k) + 3[S_t(k) - S_t(k-1)]$$

This equation is a simple velocity based predictor. This function is performed within block 173 of FIG. 13B in response to line 172 and block 171. Therefore, on line 174 is outputted $s_t(k+3)$. This anticipated elapsed distance, known on the seam does not reveal though where the location actually spatially is. To find out, it is first determined by extrapolation on the recovered taught path where the extrapolated corresponding location e (FIG. 14A) is located. This is done by relating the transforms of points c, d, and e, on the recovered taught path to the elapsed distances for C, D and Ex on the seam path (FIG. 14A). This extrapolation on the taught path obtained from the samples of the recovered taught path is given by the equation:

$$_wT^t_{taught}: \{f_e \cdot _wT^t_{taught}: [_wT^t(k-1)]^{-1}\}$$

in which $f_e$ is the coefficient of extrapolation given by the formula:

$$f_e = \frac{S_t(k+3) - S_t(k)}{S_t(k) - S_t(k-1)}$$

The extrapolation coefficient supplied by block 175 (FIG. 13B) in response to lines 176 and 177, the output being on line 178. Block 157 yields, according to the above equation, the extrapolated position (on line 128) from a calculation involving lines 155, 156 and 178. Knowing where $e_x$ on the recovered taught path (FIG. 14A) is located, it remains to look among the samples sensed by the image processor for one matching the same elapsed distance as for the extrapolated tool position at Ex (FIG. 14A). The true sample will reveal from the queue 104 what the position and orientation coordinates are for that particular location and, therefore, where the true extrapolated position for the tool E should be, rather than at Ex (FIG. 14A). Such knowledge will also enable to determine the deviation D(k) with which the control processor can bring bout, through control of the robot, the right tool positioning and orientation, i.e. on the seam path.

Figure 15:
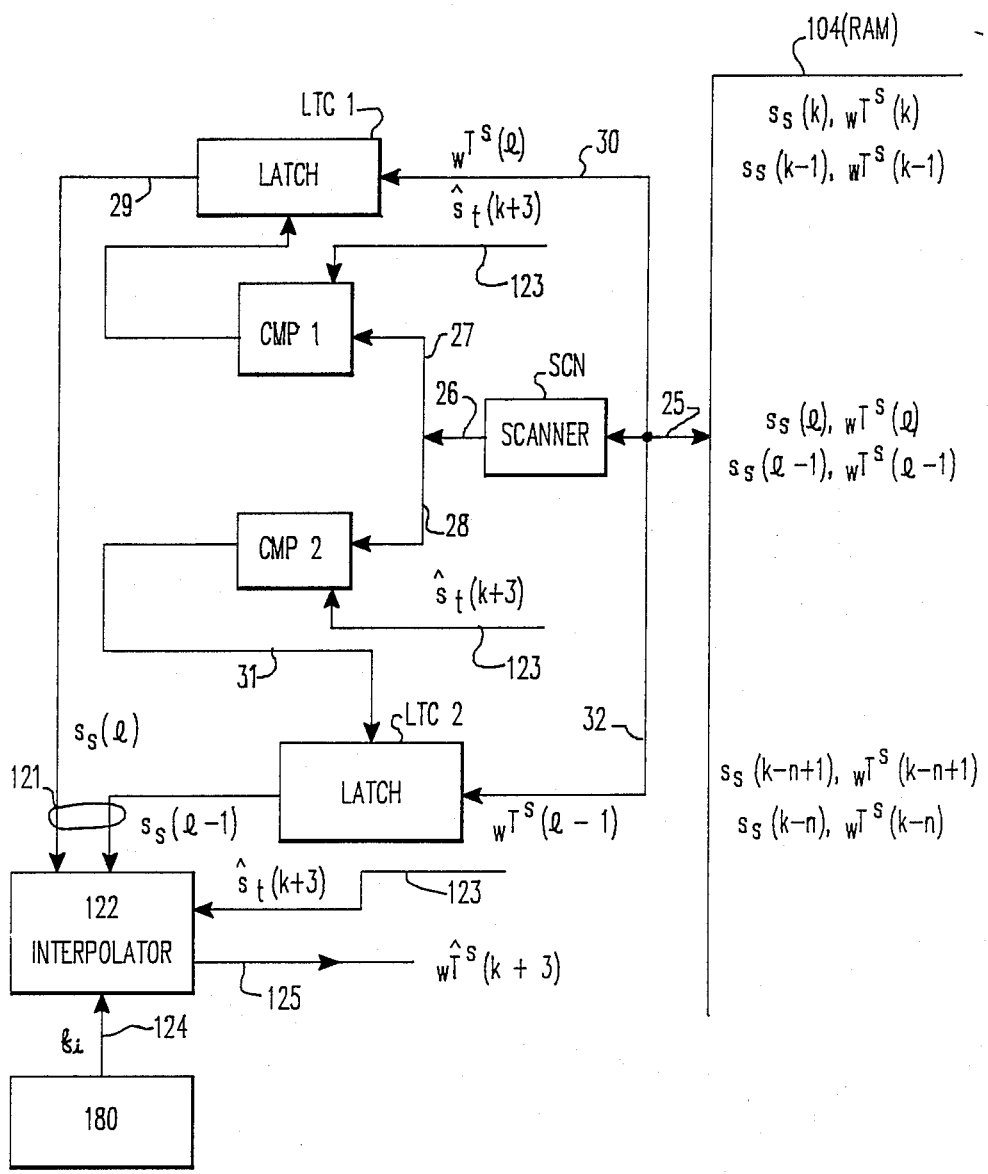
FIG. 15 is a block diagram representing in analog form the selection of the bracketing sensed samples of elapsed distance in response to the elapsed distance for the extrapolated position of the tool, and the consecutive interpolation to derive tool coordinates as required for such position, and as used in FIG. 13C for the derivation of the error and the generation of a control command for the industrial robot.

In order to find which sample matches the elapsed distance $s_t(k+3)$ derived on line 174 for point Ex of FIG. 14A, this value is used, as shown in FIG. 14B, to interpolate between two consecutive sample values among the listed values within queue 104. Those two consecutive retrieved values are indicated as s(l) and s(l-1) in block 180 of FIG. 13C. How these two values are found and retrieved is illustrated by the block diagram of FIG. 15, although, it is understood that the functions therein are implemented in software. A scanner SCN scans the addresses of the RAM within block 104 in the order of the data list. Each sample derived during scanning from line 25 is passed on lines 26 and 27 to a comparator CMP1 and on lines 26 and 28 to a comparator CMP2. Comparator CMP1 receives as a threshold a reference signal representative of the value $S_t(k+3)$ of line 123. When the value scanned and passed onto line 27 becomes smaller than the value of line 123, comparator CMP1 generates on line 29 a control signal for a latch LTC1 which retains at this instant both the value of the sample and its associated transform, thus, $s_s(l)$ and $_wT^S(l)$. Similarly, comparator CMP2 responds to the signal of line 123 becoming larger than the sample scanned through by scanner SCN and causes, by line 31, another latch LTC2 to latch the values from lines 25 and 32 at such instant. Accordingly, latches LTC1 and LTC2 provide on lines 121 into block 122 of FIG. 13C the two samples bracketing the value of line 123. Block 122 is in interpolator responding to an interpolator factor $f_i$ defined by block 180 in accordance with the signals of lines 121 and 123. It appears that the block diagram of FIG. 15 is part of block BLK2 within the control processor CP of FIG. 13C. The elapsed distance for the tool (at Ex in FIG. 14A and given by line 123) is used between s(l) and s(l-1) derived from lines 121 to establish within block 180 the interpolation factor $f_i$, which is outputted on line 124 for block 122, fi being given by:

$$f_i = \frac{S_t(k+3) - S_t(l-1)}{S_t(l) - S_t(l-1)}$$

With such interpolation factor, the transform values associated with the samples s(l) and s(l-1) are interpolated by the equation:

$$_wT^S(k+3) = _wT^S(l): \{f_i \cdot _wT^S(l): [_wT^S(l-1)]^{-1}\}$$

In practice it has been proven more time efficient to linearly interpolate each element of the n, o, a, p vectors from the transforms. Therefore, for the n component for instance, and the p vector, the equation becomes:

$$_w\underline{p}^S(k+3) = _w\underline{p}^S_x(l-1) + f_i[_w\underline{p}^S_x(l-1) - _w\underline{p}^S_x(l)]^{-1}$$

There is a total of twelve equations of the same form as above.

Accordingly, block 122 effectuates the calculation and the result is $_wT^S(k+3)$ appearing at the output, on line 125, which represents the true spatial position and orientation of the tool on the seam as extrapolated, namely as anticipated (E on FIG. 14A). Block 127 compares the coordinates on the recovered taught path (line 128) with the just found coordinates for the tool position and orientation on the sensed path in relation to the elapsed distance $S_t(k+3)$ anticipated at instant $(k+3)$. Block 127 also takes into account the reference signal generated by block 126 which defines what the tool operation should be with regard to the seam (in welding: the offset, the gap, the voltage and current, . . . ). The general equation applied by block 127 is expressed as follows:

$$^{err}_wT^w(k+3) = {}_wT^S(k+3) \cdot [{}_wT^t(k+3)^{Ref_t}T^S]^{-1}$$

This is the function performed by summer S1 in the feedforward control diagram of FIG. 12. The equation:

$$^{err}_wT^w(k) = {}^{act}_wT^S(k) \cdot [^{Ref}_wT^S]^{-1}$$

leads to the differential vector necessary for path modification by extracting therefrom:

$$D(k) = [^{err}_wP_x{}^w, \ ^{err}_wP_y{}^w, \ ^{err}_wP_z{}^w, \ ^{err}_w\delta_x{}^w, \ ^{err}_w\delta_y{}^w, \ ^{err}_w\delta_z{}^w]^T$$

It is observed that the basic feedforward error equation contains five non-zero elements which are: the three position errors, plus the roll error, which happens to be a rotation about the y-axis, and the pitch error, which happens to be a rotation about the x-axis, the latter being two of the three tool coordinates. As described hereinafter, the third tool coordinates, namely the yaw angle, is controlled according to a different criterion and control rule.

The "preferred" tool position on the seam with respect to the robot world coordinates is given by:

$$\text{pref} \ _wT^S(k+3) = {}_wT^t(k+3) \cdot {}^{Ref_t}T^S$$

It is the position the seam should normally be in order to maintain the tool under the offsets required by the reference signal of line 126 in FIG. 12, namely: $^{Ref_t}T^S$.

Actually, as known from the interpolator of FIG. 15, and as derived on line 125, the seam position is according to:

$$_wT^S(k-l+3) = {}_wT^S(k-l-1) \cdot \{f_i \ _wT^S(k-l-1) \cdot [_wT^S(k-l)]^{-1}\}$$

which, with the equation error:

$$^{err}_w T^w(k) = {}^{act}_wT^S(k) \cdot [^{Ref}_wT^S]^{-1}$$

leads to the error transform:

$$^{err}_wT^w(k+3) = {}_wT^S(k+3) \cdot [_wT^t(k+3) \cdot {}^{Ref_t}T^S]^{-1}$$

From the latter is extracted the positional error vector $^{err}p^w(k+3)$ directly as the p vector from $^{err}_wT^w(k+3)$. As to the rotational error vector, it is extracted by recognizing the form of the orientation submatrix for small angle deviations to be:

$$^{err}_{w\underline{\Omega}}{}^w(k+3) \cong \begin{bmatrix} 1 & \delta_z & \delta_y \\ -\delta_z & 1 & \delta_x \\ -\delta_y & -\delta_x & 1 \end{bmatrix}$$

Therefore, the differential motion vector (without the yaw orientation) is:

$$\Delta^w(k+3) = \begin{bmatrix} ^{err}\underline{p}_x{}^w(k+3) \\ ^{err}\underline{p}_y{}^w(k+3) \\ ^{err}\underline{p}_z{}^w(k+3) \\ ^{err}\delta_x{}^w(k+3) \\ ^{err}\delta_y{}^w(k+3) \\ ^{err}\delta_z{}^w(k+3) \end{bmatrix}$$

This amounts to establishing the deviation $D(k)$ which at instant k would exist between the recovered taught path position e and the anticipated tool position E, independently of the yaw error, as earlier stated and as explained hereinafter. This is an error to be compensated for by control via line 136 (FIG. 13A) through the ALTER port 102 of the robot. The deviation $D(k)$ represents $\Delta Px$, $\Delta Py$, $\Delta Pz$, for the 3-D coordinates and $\delta\theta 1$, $\delta\phi 1$, $\delta\psi 1$ for the three orientations of the effector end. They appear on line 129 at the output of block 127 (FIG. 13C). To such errors are added and distributed (again, as explained latter) the coordinate values $\delta_x = a_x\Delta\psi$, $\delta_y = a_y\Delta\psi$, and $\delta_z = a_z\Delta\psi$, representing the corrections from the yaw chord calculator of block BLK1 (FIG. 13D) derived on line 131. In block 130 the values of lines 129 and 131 are composed to provide on line 132 the values $\Delta x$, $\Delta y$, $\Delta z$, $\Delta\theta$, $\Delta\phi$, $\Delta\psi$, which are passed by line 133 through a filter shown within block BLK3 and yielding at the output the control signal of line 136 which, besides the ALTER port 102, is also passed by line 150 into the queue 151 maintaining the three last corrections stored.

Figure 16:
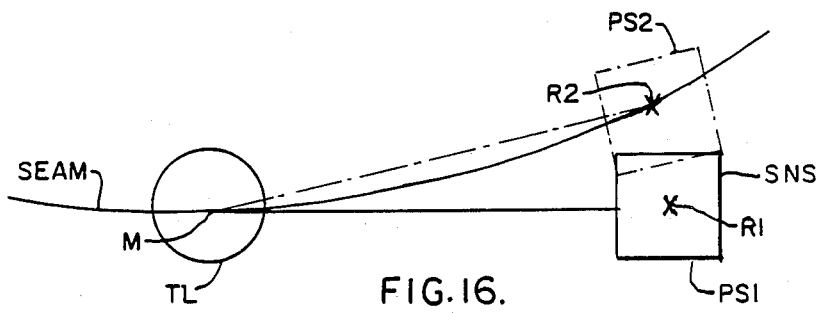
FIG. 16 shows how, with a look-ahead sensor attached to a tool, orientation of the tool at a present position requires orientation to place the sensor upon the seam.
Figure 17:
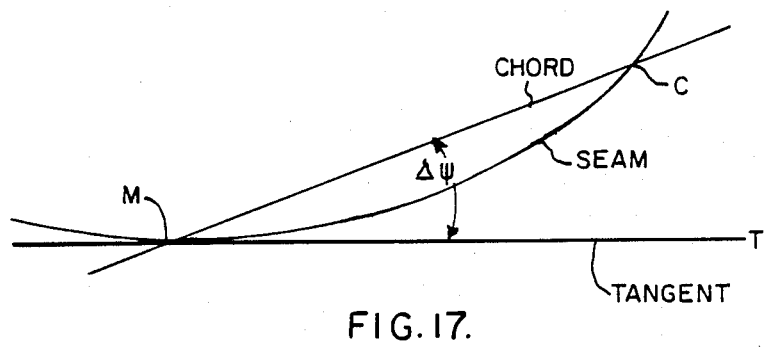
FIG. 17 shows that effective sensing by the sensor requires the distance of the sensor from the tool in the plane of the seam path to be a chord thereof.

As shown in FIG. 14A, the robot is moving the tool along straight lines upon each control step, like segments AB, BC, CD. From one segment to the next, it has been shown how the position and orientation of the effector end at instant k has been determined from the last move, and is used for the next move (see for instance block BLK2 within control processor CP of FIG. 13F). Since such iterative progression step by step of the tool is based on a plurality of known elapsed distances and position/orientation transforms for the seam path as sensed (see for instance block 104 in FIG. 13C), it is necessary that the look-ahead sensor be positioned above the seam at all time, so many ticks ahead of the tool, 100 ticks in the illustration given. This is not a problem with a strictly linear joint, since the sensor will move in the same plane with the tool. If, however, the seam follows a curve, there will be no longer any alignment and, as shown in FIG. 16, the sensor will remain along the tangent of the seam in position PS1, whereas for optical sensing it should be in position PS2 above the seam. As shown in FIG. 17 in the plane of the seam, when the seam has the right position PS2, the projection MC of the vector joining the tip of the tool to the center of the camera is a chord between the operative point M of the tool on the seam at instant k, and the location C where the seam is sampled optically. Therefore, a rotation by $\Delta\psi$ is required to bring the sensor from position PS1 to the desired position PS2 (FIG. 16).

Figure 18:
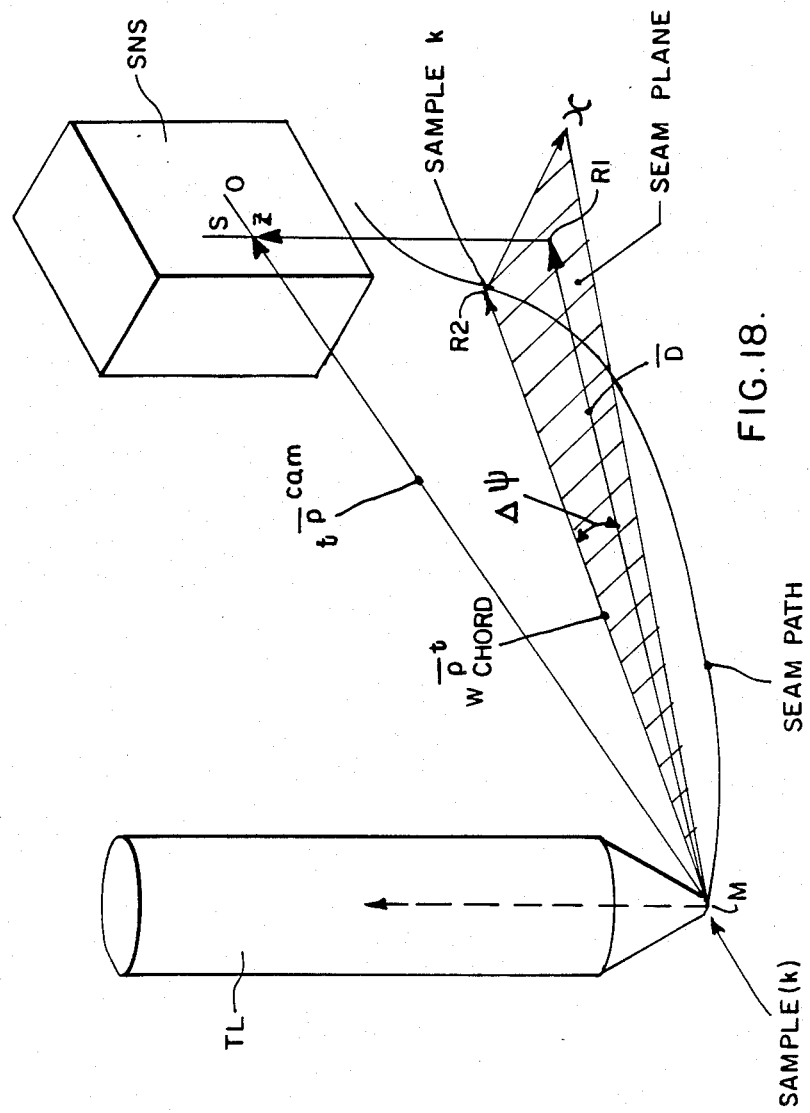

Referring to FIG. 18, the relation between the optical system and the plane of the seam is illustrated at the time at point M the tool has been positioned and oriented in accordance with the given of block 127 and line 129 of FIG. 13C. In other words, tool TL has been positioned and oriented according to $\Delta Px$, $\Delta Py$, $\Delta Pz$, $\Delta\theta1$, $\Delta\phi1$, $\Delta\psi1$. At this time, the sensor SNS (optical center O) which is in a fixed relation with respect to the tip of the tool (but does not have to be, depending upon the chosen installation) projects itself onto the seam path plane at R1, whereas the desired position would be at R2 on the seam path, at the end of the chord MR2. The angle to rotate MR1 into position MR2 is $\Delta\psi$. Block BLK1 of FIG. 13D illustrates how the angle $\Delta\psi$ is determined, and how the so derived angle is, by line 119, block 120 and line 131, combined within block 130 with the data of line 129, so as to rotate the tool and displace the sensor from R1 to R2 (FIG. 18).

Recourse must be had to vector/matrix algebra and homogeneous coordinate transform theory. Vectors are denoted with lower case underscore letters, like (n). Vector components are denoted with a subscripted lower case letter, like ($n_x$) for the x-axis. Homogeneous coordinate transform matrices will have a sub- and superscripted upper case letter T, like ($_wT^S$). Accordingly, at point M the position and orientation of the tip of the tool along MR1 is given by the matrix:

$$_wT^t = \begin{bmatrix} n_x & o_x & a_x & p_x \\ n_y & o_y & a_y & p_y \\ n_z & o_z & a_z & p_z \\ 0 & 0 & 0 & 1 \end{bmatrix}$$

Vector p is a position vector represented by $_wT^t$ in the world coordinates. There are three other vectors mutually orthogonal at location M: $\underline{n}$ (for normal), $\underline{o}$ (for orientation), and $\underline{a}$ (for approach), as earlier stated herein. Each vector is a unit vector. They are related by the vector cross product as: $\underline{n}=\underline{o}\mathrm{x}\underline{a}$. Referring again to FIG. 18, knowing MR1 and MR2 the angle inbetween can be determined. MR1 being the chord, is known from the last sample obtained with the sensor ahead of the tool. Assuming n is the number of ticks separating the tool from the sensor (as earlier stated 100 tick would be typical), at instant k (for position M of the tool) the sensor is at (k−n). At the bottom of the queue within block 104 is the transform for point R2 on the seam. At the head of the queue is the transform for point M. Accordingly, by lines 105 within block 106 is determined the vector chord MR2 as follows:

$$_t\underline{p}_{chord} = {_wp^s}(k) - {_wp^s}(k-n)$$

It appears that vector MR1 (denoted as D) is the projection of vector M0 in the plane of the seam path. If M0 and R10 are known, MR1, or D will be known. M0 is known from the optical sensor system. Center O is known, at 109 in FIG. 13 as $^m{_tp^{cam}}$. The relation between tool and sensor is known as $_tp^{cam}$. The tool tip position is also known as $_wT^t$. Therefore block 110 provides M0 by the calculation: $[_wT^t]^{-1}\,{^m{_tp^{cam}}}$.

In order to determine what the vertical vector R10 is, first is determined a unitary vector u normal to the two vectors MR2 and o (k) (the orientation unitary vector at point M known from 104 for instant k, by line 105). This is done within block 107 using the result from block 106 and the information retrieved by line 105 from queue 104 regarding the o vector. Such orthogonal vector is obtained by the cross product $$\underline{p}\text{ chord} \times \underline{o}(k)$$

In order to reduce it to unity (Un), this is divided by the scalar value p chord x o (k). The result is outputted by block 107. R10 is calculated with u and with M0 derived from block 108, by projecting the latter upon the former through the operation: $[_tp^{cam}\cdot U_n]U_n$.

Since M0 is the vectorial sum of MR1 and R10, D which is MR1 is obtained from the vectorial difference $_tp^{cam}-[_tp^{cam}\cdot U_n]U_n$ as calculated within block 108.

Using the vector chord MR2 (from block 106 and line 113) and the vector MR1 (from block 108 and line 112), block 114 and line 115 provide the angle cos $\Delta\psi$ therebetween according to the formula:

$$\frac{\underline{D} \times {^wP_{chord}}}{|\underline{D}| \cdot |{^wP_{chord}}|}$$

Since the angle $\Delta\psi$ is a good approximation of sin $\Delta\psi$, the value of line 115 is converted within block 181 into $\Delta\psi=\sin\Delta\psi=\sqrt{1-\cos^2\Delta\psi}$, with the result derived on line 118. However, it remains to find out which sign applies, since the curvature with respect to vector o may be out to the right, or to the left. This is done within block 116 relating the orientation of vector o to the orientation of vector D by: sgn [D.o(k)]. Summer S1 in fact relates the angle $\Delta\psi$ of line 118 to the sign + or −.

Figure 13B:
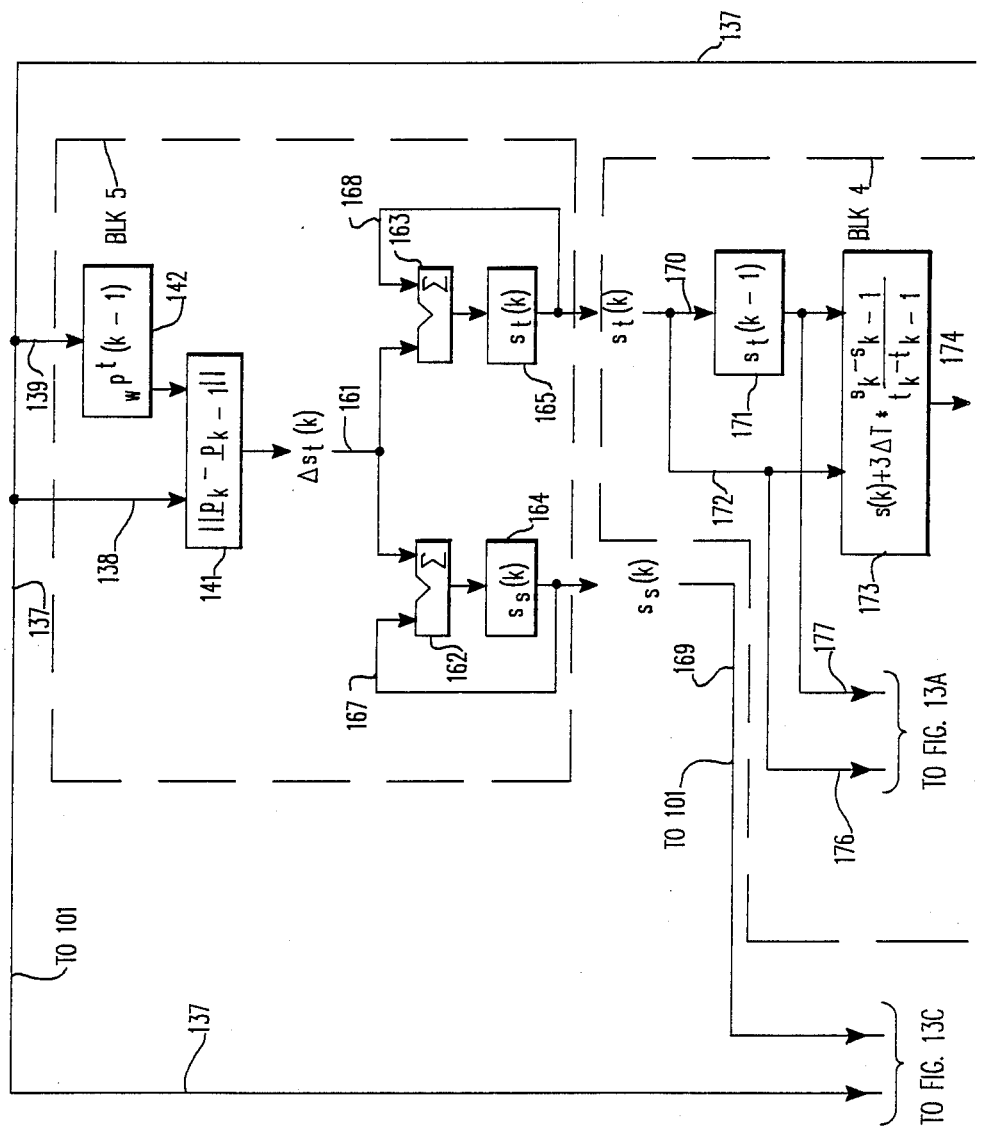
Figure 13C:
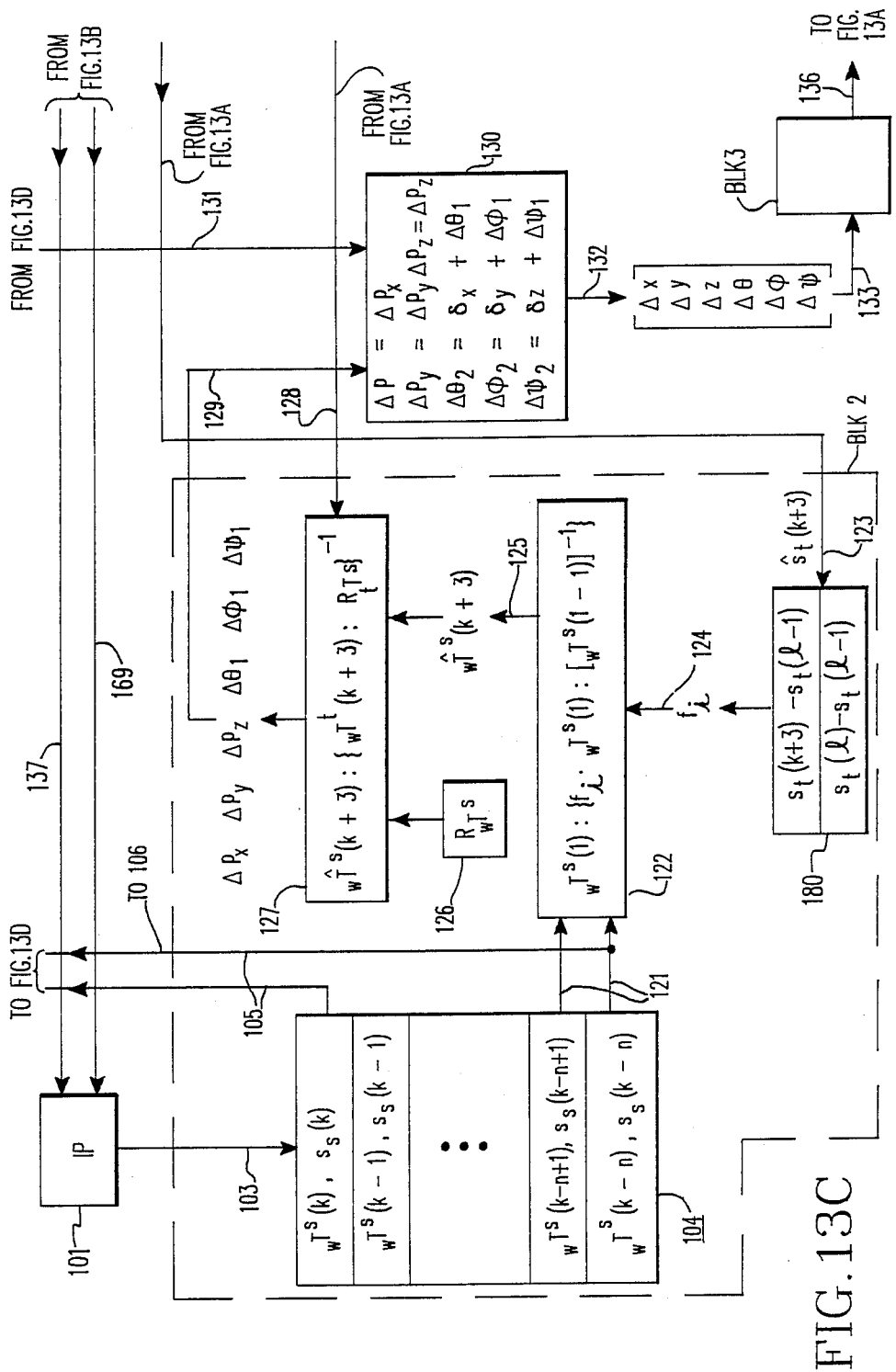
Figure 13D:
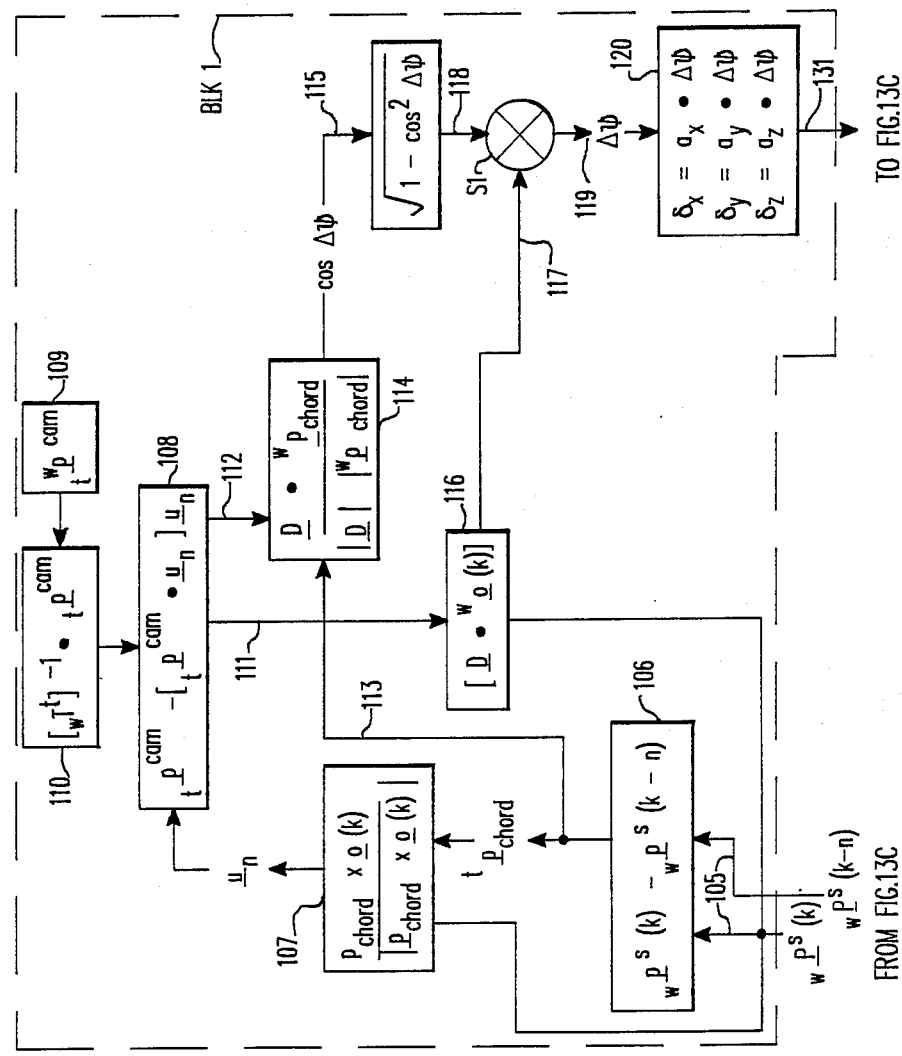

As earlier explained with respect to FIG. 13B, the value of $\Delta\psi$ obtained on line 131 is, within block 130, added to the values of line 129. The yaw is not affecting the coordinate errors $\Delta Px$, $\Delta Py$ or $\Delta Pz$. It affects, though, the orientation parameters of line 129, namely $\Delta\theta_1$, $\Delta\phi_1$, $\Delta\psi_1$, for the pitch, roll and yaw by the respective amounts $ax_1\Delta\psi$, $ay_1\Delta\psi$, and $az_1\Delta\psi$, as shown within blocks 120 and 130. The resulting errors which are to be compensated by a corresponding control signal are $\Delta x$, $\Delta y$, $\Delta z$, $\Delta\theta$, $\Delta\phi$, and $\Delta\psi$, appearing on line 133 and, after filtering through block BLK3 of FIG. 13C, become the effective control signals passed via line 136 through ALTER port 101 of the robot controller RB, or which are stored into queue 151 by line 150 for the three last ticks only.

The image processor invention will now be described by reference to FIGS. 19 to 34. As earlier explained by reference to FIG. 10, the optical system provides in the plane of the array IA a 2-D image of the stripe containing point m of coordinates i and j. If kj is the vertical interpixel distance and Jm the maximum vertical resolution of the sensor, and if ki is the horizontal interpixel distance, with Im the maximum horizontal resolution of the sensor, the light stripe image on the sensor from the center point C on the image (i,j,) is Kj (j−Jm/2) and ki (i−Im/2) away in the two orthogonal directions. This image is produced on a TV camera and it generates a standard RS-170 closed circuit video signal.

A digital pipeline is provided to effectuate low level image processing leading to a light stripe image reduced to a one pixel wide line characterizing one edge of the stripe. A digital pipeline for image processing is not new. See for instance "A Pipeline Fast Fourier Transform" by Herbert L. Groginsky and George A. Works in IEEE Transactions Trans. Comput. vol C-19, pp. 1015–1019, November 1970.

As explained hereinafter, the image processor according to the image processor invention involves two processing levels. First, there is a low level image processing with the video signal from the camera, digitally through a pipeline, leading to a pixel line representation of the stripe line image as one edge thereof. Then, high level light stripe representation is achieved with the processed pipeline output to lead to the coordinates of the seam path embraced by the light stripe of the seam sensor.

Figure 19:
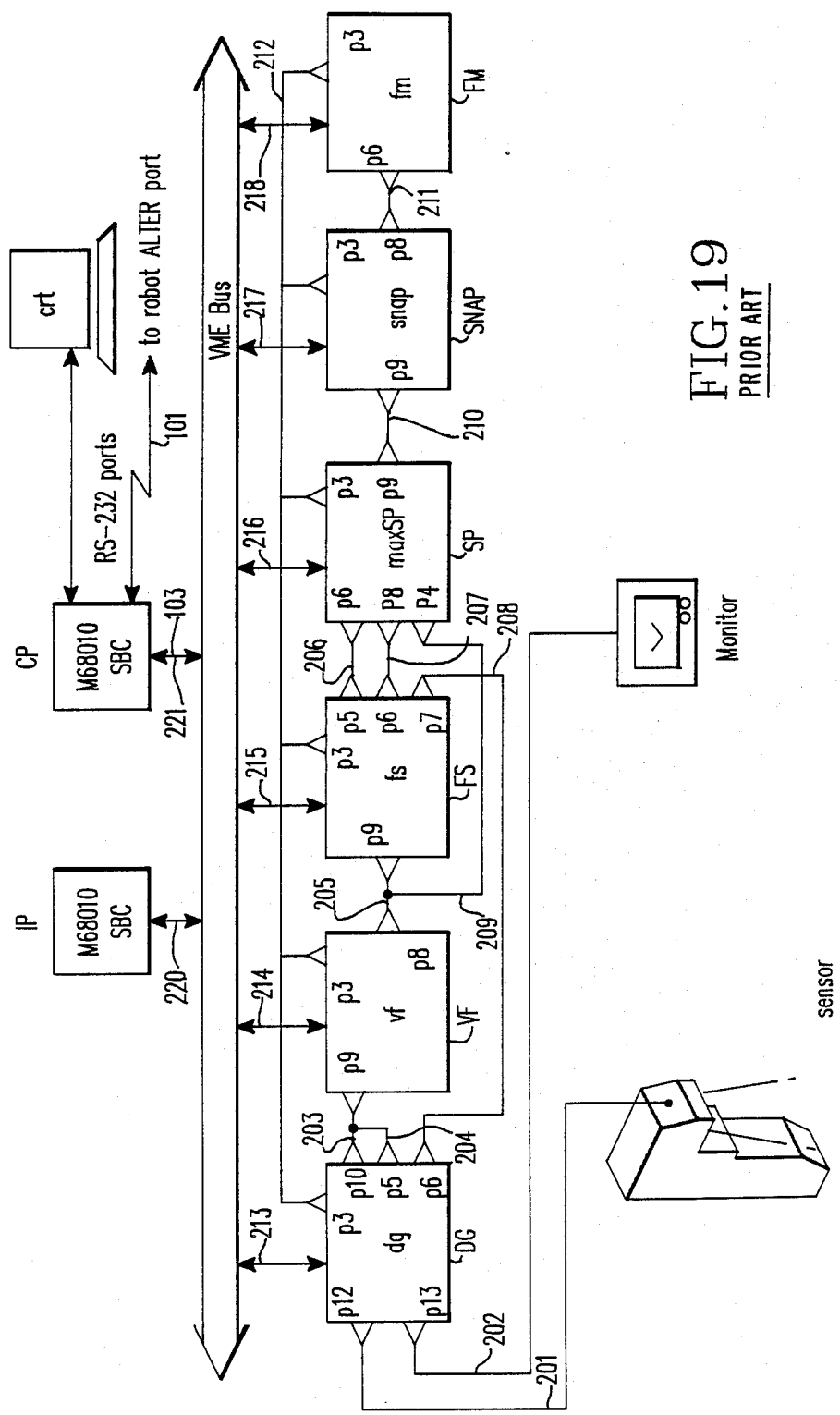
FIG. 19 shows in block diagram the overall image processor used as seam tracker with a digital pipeline and its solid state devices monitored and controlled by a microcomputer as used according to the image processor invention to generate a pixel line representation of one edge of the stripe image of the sensed seam and to derive seam path coordinates for the control processor (CP) to control the robot.

Considering pipeline processing first, the camera operates in the free-run mode and its syn signal drives the timing for the rest of the image processing pipeline. As shown in FIG. 19, a pipeline, consisting of a series of solid state circuits on boards DG, VF, FS, SP, SNAP and FM, is provided to handle a digitized version of the video signal. The latter is received on line 201 from the camera CAM, while an analog reconverted signal is passed on line 202 to a TV monitor. The image processor IP is centered about a microcomputer M68010 SBC, used to monitor and control, over line 220 and a data bus (VME), all the operations of the pipeline stages by bidirectional lines: 213 for board DG, 214 for board VF, 215 for board FS, 216 for board SP, 217 for board SNAP and 218 for board FM. All the boards communicate to each other for timing, synchronization by line 212. In addition, the image processor communicates by line 220, data bus VME and line 221 with the control processor CP of FIGS. 11 and 12. The control processor, typically, is centered on another microcomputer M68010 connected to the robot processor via RS-232 ports (port 102 of FIG. 13A).

Board DG phase locks by line 201 to the camera signal and generates all necessary timing signals for the rest of the boards in the pipeline. The signal is digitized at, typically, a resolution of 512×512×8 at 30 frames/second, each pixel being represented as a one byte quantity. The data stream is passed through one of 16 selectable and programmable input lookup tables, the one used being made transparent by initializing it with a unit ramp function. The purpose is to suppress background and to sequentially translate the pixels of the picture from lines and rows into a chain of bits to be grouped, analyzed, transformed, or converted digitally along the several stages of the pipeline, as explained hereinafter. The connection with the next stage is via a ribbon cable 203. A feedback loop is provided via line 204 to the digital input of board DG.

Next is a video 2-D linear filter VF. It carries out a finite impulse response (FIR) filter operation at TV frame rates with a 3×3 region of support defining the size of a mask, or neighboring region, attached to one pixel. Only one filter board VF is shown, although it is clear that several VF filter boards can be cascaded or filters with larger regions of support can be used. The linear filter serves two purposes: reduction of camera noise variance and smoothing of the speckle caused by the laser diode in the light stripe generator. The filter coefficients are selected to create a low pass filter, and an onboard barrel shifter is used to gice the filter unity gain at D.C. The result is to enhance the detectability of the light stripe by reducing the variance of the noise and the variance of stripe pulse noise without reducing the mean separation.

Figure 20:
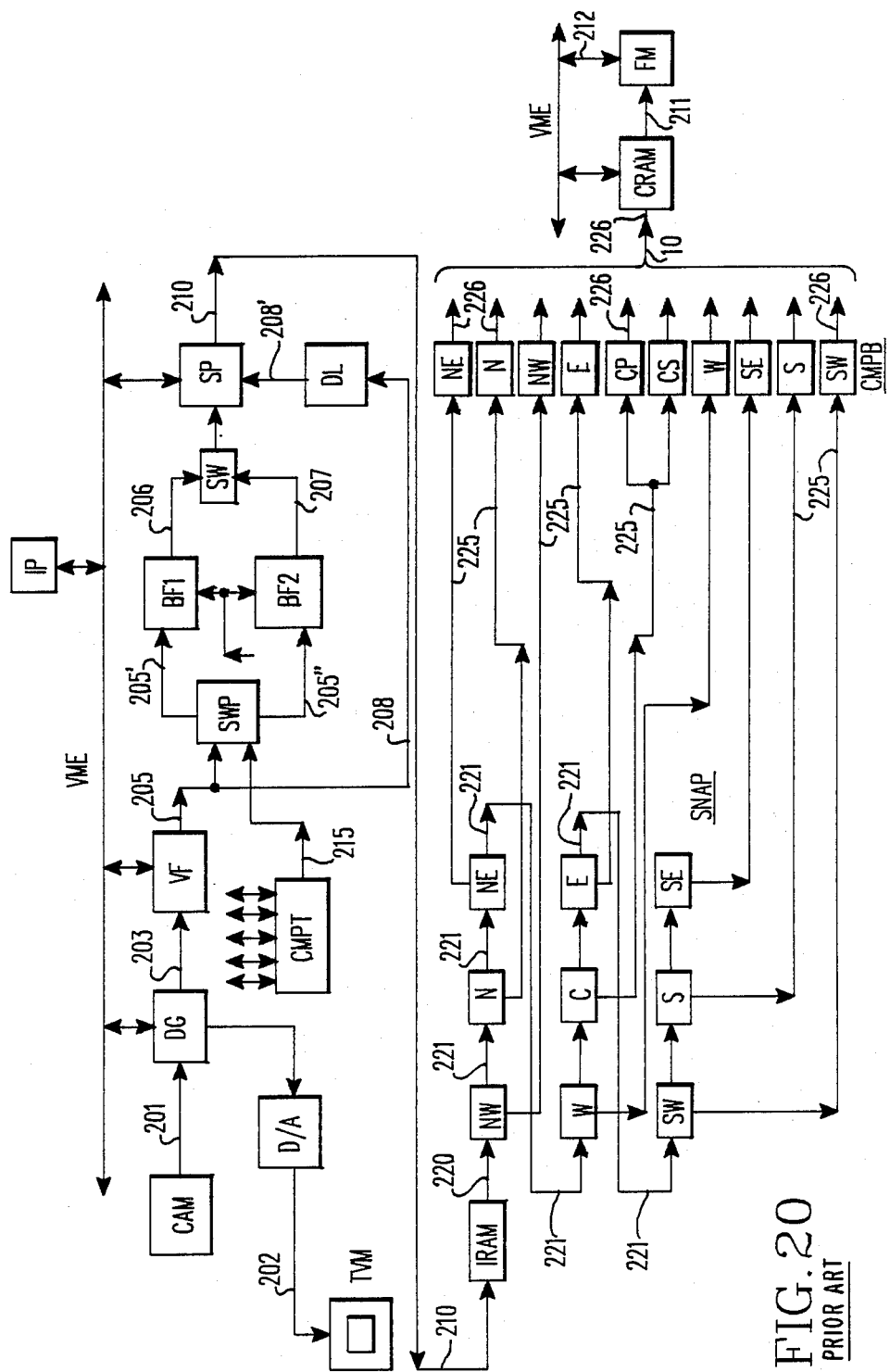
FIG. 20 is a more detailed view of the block diagram of FIG. 19.

By line 205 board VF connects with board FS and by line 209 to board SP. The object here is to eliminate streaks from spatter and sparks. Narrowband optical filtering does not eliminate the streaks caused by sparks. If spark trails occur only in one TV frame, camera lag would carry over the streak signal for many frames, unless a lag-free camera is used, such as the CCD camera. It appears that the stripes hwave significant autocorrelation lag values, whereas the spark trails do not. Accordingly, boards FS and SP effectuate a filter function based on temporal, as opposed to spatial, autocorrelation. To this effect, as shown in FIG. 20, broad FS is a frame-store board associated with a pixel processor SP. For the framestore board, in order to generate autocorrelation lags at TV frame rates (30 frames/second), two full frame buffers BF1 and BF2 are provided, like shown in U.S. Pat. No. 4,683,493. One holds data from the previous frame and reads it out to the SP board, while the second frame buffer acquires the present incoming video frame from line 205. The output of one frame buffer is multiplied by the current frame, while the second frame is used to store the current frame. Switch SW swaps the rolls of the two buffers at the end of the frame. Therefore, the FS board always outputs a video frame, delayed by one frame, to the SP board. The IP microprocessor by line 215 supervises the swapping of the buffers. It also monitors the multiplexer settings and provides for compensation for pipeline delay. The video stream is a 8-bit per pixel format. One output from the VF board goes directly by line 208 to the SP board, while the other by line 205', or 205", enters the FS board. In addition to the one frame delay, there is a 10 pixel line delay in the data path via line 205 which does not exist via line 208. The two images must be correctly registered for effective autocorrelation. Therefore, such 10 pixel time delay is compensated by setting a 10 pixel advance for the buffer being read out to the SP board. The other buffer at this time has its pan register set to 0, in order that the interrupt task from the monitoring IP write two pan registers upon every buffer swap. Accordingly, two video streams are concurrently entering the SP board, one from the VF board, the other from the FS board. A one-frame-time autocorrelation lag is established on an instantaneous basis by multiplying the current image by the previous one on a pixel-by-pixel basis. The SP board is a multiplier operating upon pairs of pixels from the two 8-bit format video data streams. The most significant byte of the 16-bit product is outputted on line 210. It represents the instantaneous temporal autocorrelation lag for the image. Besides eliminating spark trails, while not distorting the light stripe image, this technique has the advantage of enhancing the contrast in the image. This is due to the fact that the mean value of the signal is larger than the mean value of the background noise. In that case, the ratio of the squares of the means will always be larger than the ratio of the means themselves. Therefore, keeping only the most significant byte after multiplication will eliminate a substantial amount of background noise if the noise means are low.

A smooth, low-noise image, which is virtually free from spark trail effects is outputted on line 210. As shown hereinafter, such image will be segmented by amplitude thresholding (all values above 255 in pixel intensity being retained as a "white" and all values therebelow being taken as a "black") in order to produce a binary image resulting in a full scale white stripe line against a completely black background. Nevertheless, the stripe will be quite thick, due to the thickness of the original light stripe image and also due to the spatial blurring effect of the 2-D low pass filter at the VF stage of the pipeline.

For further treatment, especially in the context of coordinates extraction for seam tracking and robot control, it is desirable to have a stripe of narrow and precise width. To this effect, according to the image processor invention, the stripe image derived on line 210 is reduced to the width of one pixel, exactly and throughout, namely at all points. This technique will be now explained as part of the digital pipeline of FIGS. 19 and 20. FIG. 19 shows the succession of solid state circuits, in the form of printed circuit boards, which form the pipeline. FIG. 20 is a block diagram providing a schematic representation of the FS, the SP and the SNAP boards of FIG. 19.

Considering the SNAP board, the incoming digital video data of line 210 is first passed through an Input Look-Up Table circuit IRAM, then, it goes via line 220 to an input sequencing logic circuit PNG acting as a pixel neighborhood generator, and the kernel so derived (a 3×3 neighborhood in the example) is made available in a multiplex fashion, via ten parallel lines 225, to a comparator bank CMPB effecting the aforementioned thresholding function for the individual pixels and outputting the resulting pixels on parallel lines 226 (all white above 255 at the input, all black below 255). Lines 226 go to a look-up table circuit CRAM which, according to the image processor invention, retains as a white pixel only those pixels which appear on lines 225 as one of the ten possible situations of FIG. 22A for which the lower edge of the stripe appears to border the two light and black zones. All other neighborhood combinations (including those corresponding to the upper edge of the stripe) are translated as background i.e. as a black pixel. Typical of such other situations are the neighborhoods of masks 11, 12 and 13 of FIG. 22B, respectively. The results appear on lines 227 which are multiplexing the "pixel line" characterizing the lower edge of the light stripe image of the camera which will be used for high level processing, also according to the image processor invention.

The hardware circuit known as a SNAP, for systolic neighborhood area processor, was published by Datacube, Inc., Peabody, MA, 01960 (May, 1986). This circuit is managed and controlled by the IP microprocessor so that, after thresholding by the CMPB circuit, the CRAM circuit processes the pixels of the ten lines 226 so as, according to the video signal of line 210, detect and thin out the light stripe down to the dimension of a one pixel wide line representing the lower edge of the stripe image. In the SNAP, the IRAM circuit is composed of eight software selectable banks of 256k-byte by 8-bit look-up tables. The eight banks are typically loaded during initialization, and during operation the active bank is changed from one bank to another during a blanking interval without image perturbation. The input sequencing logic circuit PNG creates a 3×3 neighborhood, namely eight surrounding pixels about a central pixel which is the present pixel passed by line 210 and corresponding to one line and one row of the camera image being scanned from line 201 at the input of the pipeline. If the central pixel is C, the eight neighbors are shown in FIGS. 15 and 16 as NW, N, NE for the upper row, SW, S, SE for the lower row, and W, E for the closest pixels on the same line, according to the compass cardinal and secondary points. The pixels are connected in series by line 221 from left to right on a line and from one row to the next. The comparator bank CMPB includes ten comparator units, also marked like the pixels of a cluster, the center being divided into two units CP (Center Primary) and CS (Center Secondary) which are both fed by the center pixel C. All the others are fed by a corresponding one of the eight neighboring pixels. Lines 225 are the inputting lines to the ten comparator units of circuit CMPB. A reference threshold is established for each comparator so that any pixel below the threshold will be outputted as black, whereas any pixel above the threshold is outputted as white. The output lines 226 are multiplexed into the CRAM circuit receiving the single bit outputs from each of the ten CMPB comparators as the 10 address lines of the CRAM. The CRAM, typically, consists of two banks of 1024 by 8-bit look-up tables, thereby translating the 10-bits of comparison output data into 8-bit results, and allowing 1024 possible input code addresses to provide 256 possible output codes. The two banks are loaded initially and during operation they are used interchangeably at appropriate times, i.e. upon vertical blanking. The operation of the SNAP is effected as a 7.15 MHz process.

Considering the 3×3 kernel within the PGN block, along line 221 all the points are on the same line. The results of processing the center point (Primary and Secondary Center) are outputted nine pixels after the center point has been inputted. Delays are provided from all other points in the kernel by adding or subtracting the appropriate number of pixels counted toward or from the center point. Thus, the SNAP circuit introduces a process delay of V+6 pixels to the center point of the kernel, V being the length of a line on the image. The results of processing are outputted by the SNAP circuit V+6 after the center point (Center Primary and Center Secondary) has been inputted. The delay associated with the other points in the kernel are obtained by adding (or subtracting) a corresponding number of pixels to (or from) such delay of V+6.

The kernel appears as situated within a sliding window. As the center C moves from one pixel to the next along the line to the left, point E becomes the new center C, while N, C, S become NW, W, SW respectively, and the contiguous pixels to the left of NE, E and SE become the new NE, E, SE. A similar shifting of the combination of nine pixels to form a new neighborhood occurs from one line to the next line below, causing NW, N, NE to move out of the picture, while SW, S, SE are being replaced by the three neighbors just below. The SNAP, while following the moves of the center pixel along lines column by column, takes into account the whole picture of the kernel in terms of intensity of light as translated digitally by the pipeline. It is understood that the size of the window is a matter of choice and practicality. Illustratively, fa 3×3 kernel has been chosen.

Thresholding is effectuated on each of the ten elementary comparators (NE to SW) of comparator CMPB, the reference input corresponding for each to the level of intensity 255. All values of the pixel intensity thereabove will be translated on the corresponding line 226 as a white, all values therebelow will appear on line 226 as a black. The ten line 226 are addressing the CRAM circuit.

Figure 22A:
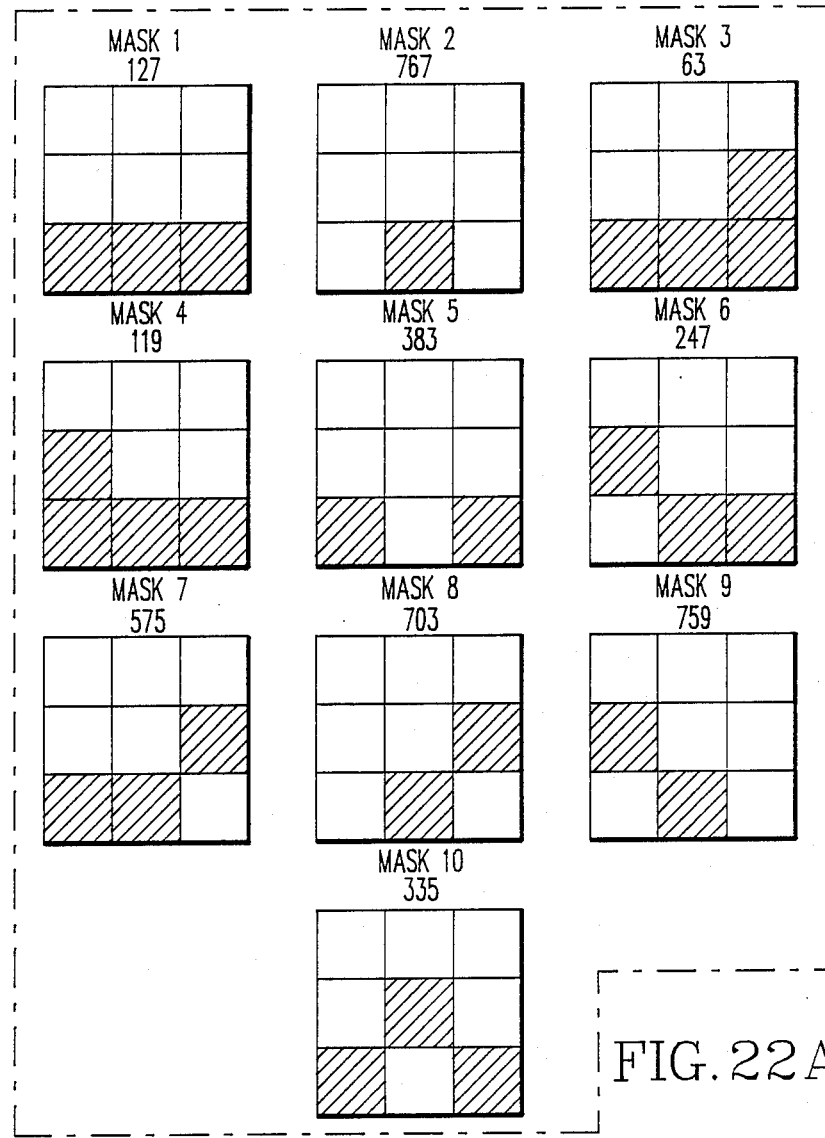
FIG. 22A shows the ten possible situations characterizing a mask, or kernel, situated on the chosen lower edge of the stripe.
Figure 22B:
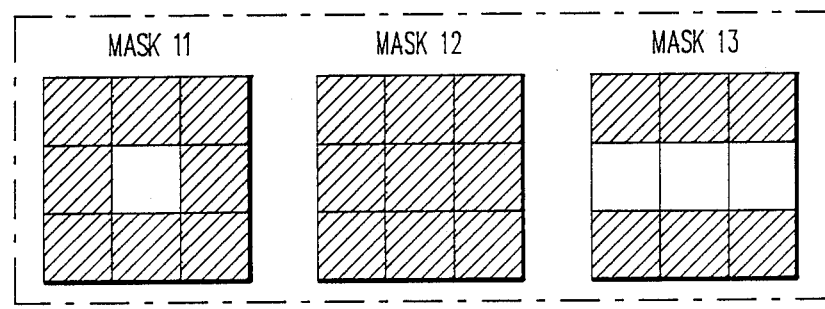
FIG. 22B shows illustratively three situations outside the ten situations of FIG. 22A.

Referring to FIG. 22A, ten situations identified as masks 1 to 13 are represented which represent all the possible combinations of black and white pixels when the window overlaps one edge of the stripe picture, here the edge below. FIG. 22B illustrates three among all the other situations, identified as masks 11 to 13. According to the present invention, in each of those ten former instances, the center pixel SNAP output signal will be caused to be a ONE (for WHITE), whereas for all other instances, like in the later situations of masks 11 to 13, i.e. the other combination of pixels in the kernel as seen through the window, the SNAP output code will be made a ZERO (meaning BLACK). FIG. 23 is a table showing the encoding of the ten lines 226 as addressing the look-up table CRAM for masks 1 to 10 of FIG. 22A and 11 to 13 for FIG. 22B. With this general rule of operation for circuit CRAM, not only the background of the stripe image which is not on an edge of the stripe as seen through the window will be black, but also the stripe image itself to the extent that the window shows all white pixels or, with the upper edge (in the example), the pixel combination is the complement of any of the situation shown in FIG. 16A. The stripe as digitally outputted by the SNAP will, then, appear like a one pixel wide line. As generally known for a look-up table, the reference values which correspond to the ten situations retained for the lower edge of the stripe are stored, and the inputted code from lines 226 will, as an address, recognize the location of the matching stored mask situation. With a 512×512×8 frames per second definition on the camera, there are in decimal equivalent 512×512 locations in the look-up table. The ten input lines 226 of FIG. 20 will form an address, as shown by FIG. 23, for the thirteen situations previously enumerated. For mask #1, for instance, the ten lines binary code is the decimal equivalent 127, for which location the selection in the table prescribes a white at the output, namely 255 under the output code. In contrast, any of the last three situations lead to zero at the output. The overall result is on line 211 a serially defined pixel line characterizing the lower edge (masks 1 to 10 of FIG. 22A). At this stage, the pipeline has completed the low level processing of the image. Before considering the high level image processing which will lead to the derivation of the coordinates for queue 104 of FIG. 13C of the control processor CP, it should be observed that, due to interlacing in the camera picture, thinning by the SNAP of the pipeline will totalize two pixels in width, rather than the expected one pixel width for a single combination of lines and columns. Therefore, an additional step has to be taken in order to reduce the edge representation to one pixel as intended.

Referring to FIG. 21, the overall block diagram of the image processor is shown to include a low level treatment section LLT (comprising the pipeline PP1 and the 2 to 1 pixel reduction operator) and a high level treatment section HLT (comprising the additional steps). High level processing consists in point sorting, stripe modeling via abstract representation, shape matching, target refinement and finally 3-D coordinate conversion. These steps have been considered by the prior art. However, in this respect a new approach is now taken, according to the present invention, due to the fact that, purposely, the stripe has been reduced to a pixel line, which allows a fast and direct treatment of the (i,j) coordinates of the points on the pixel line as received on the 2-D camera picture.

Figure 24A:
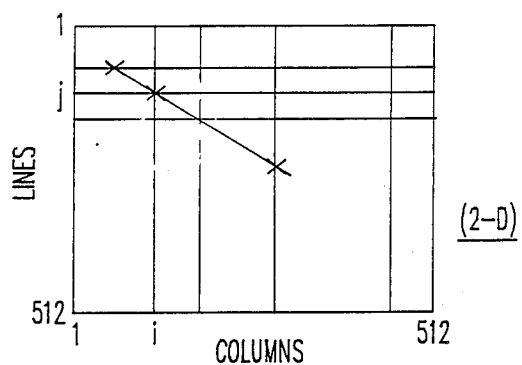
FIGS. 24A and 24B illustrates the steps of transforming the pipeline image from 2-D to 1-D while reducing the pixel line from 2 to 1 pixel width, according to the image processor invention.
Figure 24B:
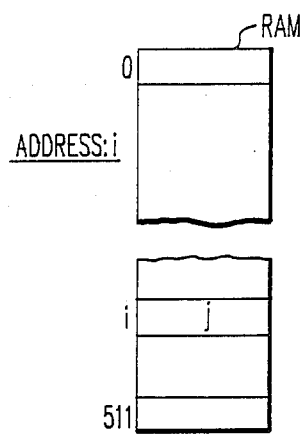
Figure 24C:
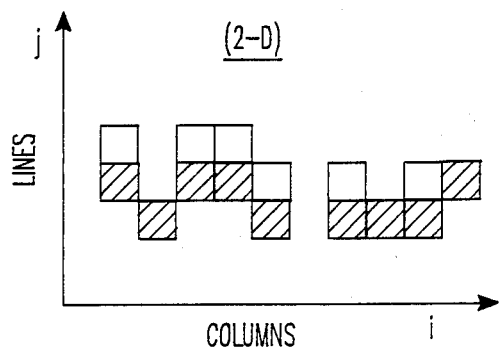
FIG. 24E illustrates the operation of a discrete second difference operator for corner detection according to FIG. 21.
Figure 24D:
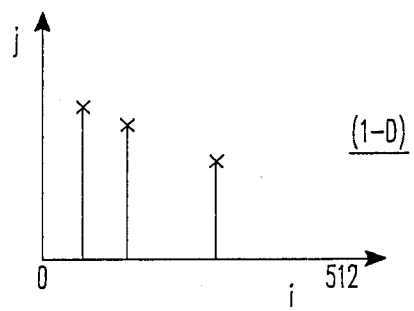

An important function not shown in FIG. 21 because, according to the preferred embodiment of the invention, it has been included within the 2 to 1 pixel reduction circuit PRD, consists in changing a 2-D representation of the pixel line derived from pipeline PPL into a 1-D representation thereof. This means that, from the 2-D grid of lines and columns (shown in FIG. 24A) which carries (as shown in FIG. 24B) the distributed pixels of the image, for each pixel is derived, by column i and line j, a 1-D representation by discrete ordinates of value j for each point a function $j=f(i)$ of the abscissa i (as shown in FIG. 24C). This is simply done by placing within a table (RAM of FIG. 24D) the list of the values of j for each address i. The result is the afore-mentioned discrete function of i which as such can be treated with advantage, due to speed and refinement, by the well known methods of numerical and algebraical calculation, as will be shown hereinafter. This is done by the microprocessor which is monitoring and controlling the operations of all the blocks of the high level treatment section HLT of FIG. 21.

Considering the 2 to 1 pixel reduction, this is done within block PRD concurrently with the 2-D to 1-D signal transformation. Due to interlacing, the signal derived on line 211 at the output of the CRAM circuit of FIG. 20, as shown illustratively on FIG. 24C represents white pixels which are mostly double. With the RAM of FIG. 24B each pixel of address i will be stored once with the first frame, then a second time with the second frame. However, each time the second storing process encountered a white pixel for the same address, the preceding one is erased, i.e. the second storing replaces the first. The remaining pixels are shown in FIG. 24C as shaded areas. As a result, it will appear that not only the "pixel line" has been reduced from a double to a single pixel line but also, within the RAM of FIG. 24B, the 1-D discrete function $j=f(i)$, shown in FIG. 24D, has been established. The microcomputer CMPT calls, per column and per line, for each j value of a white pixel of a column i, namely storing how high in the ordinate position is the particular white pixel of abscissa i, and places such value of j in the i location of the table listing within the RAM of FIG. 24B. While so doing, each time that another j value is encountered already stored in the table for the same i location, the second value is stored in the table at that location and the previous one is deleted. The result will be that wherever a white pixel has been recorded for a given line position, there will be only one pixel ordinate either recorded only once, or stored the second time. It appears that within block PRD this process will have led to a reduction to one pixel line and the 2-D representation will have been replaced by a function $j=f(i)$ in discrete form. This is what is outputted on line 250 at the output of the low level treatment section LLT.

Except for the portion of the control processor CP where the queue 104 receives on line 103 the samples defining the seam path locations as sensed, the rest of FIG. 21 relates to the image processor, operating under control of the microprocessor CMPT. It is observed that queue 104 is a RAM shared by both the control processor CP and the image processor IP. Nevertheless, arbitrarily, queue 104 has been shown, as in FIG. 13C, as pertaining to the control processor.

It is assumed that the seam tracker is proceeding with the laser beam to scanning across the seam, step by step along the seam path. Accordingly, from line 250, at the output of the digital pipeline, onto block GRF a series of successive stripes reduced to a pixel line are passed. Each stripe representation so derived is in the form of a discrete function $j=f(i)$. Block GRF is a function generator establishing under control of the microcomputer CMPT with data from line 250 a graph of the stripe, namely a 1-D graph which, according to the image processor invention and as explained hereinafter, is a symbolic representation of the stripe.

Figure 25:
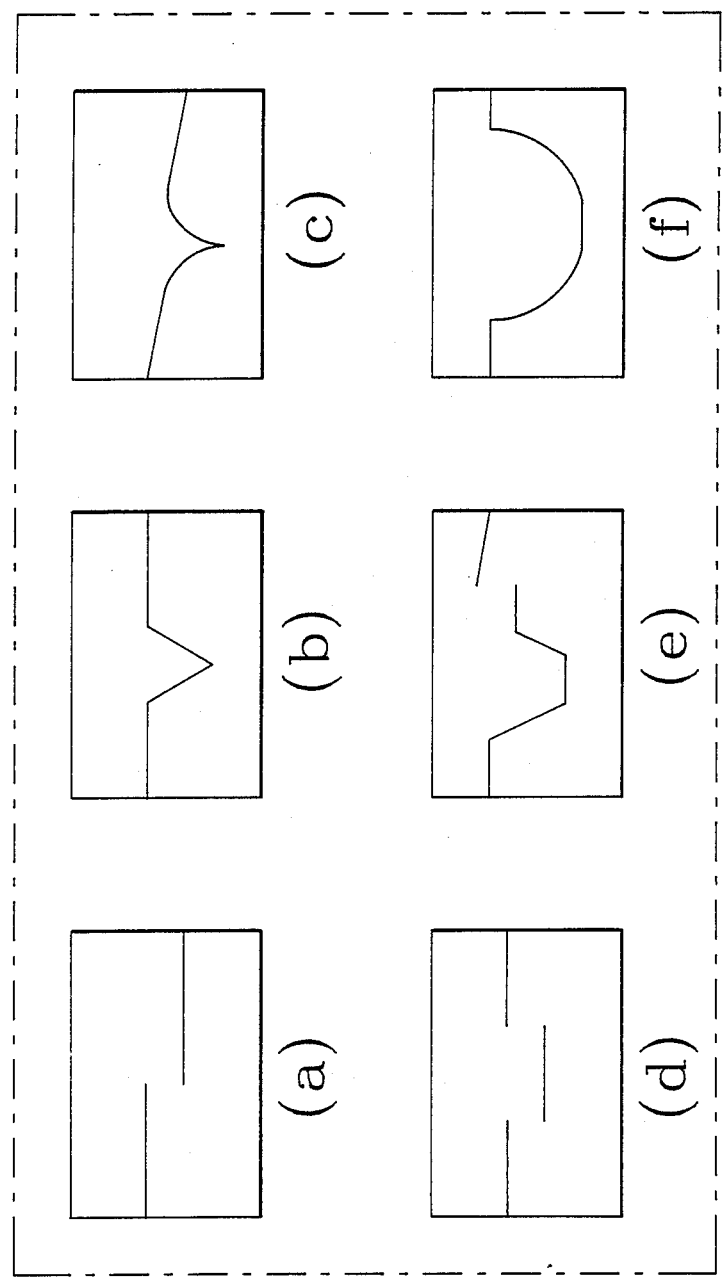
FIG. 25 shows six illustrative representations of the shape of the seam characterized by the pixel line according to the image processor invention.
Figure 26:
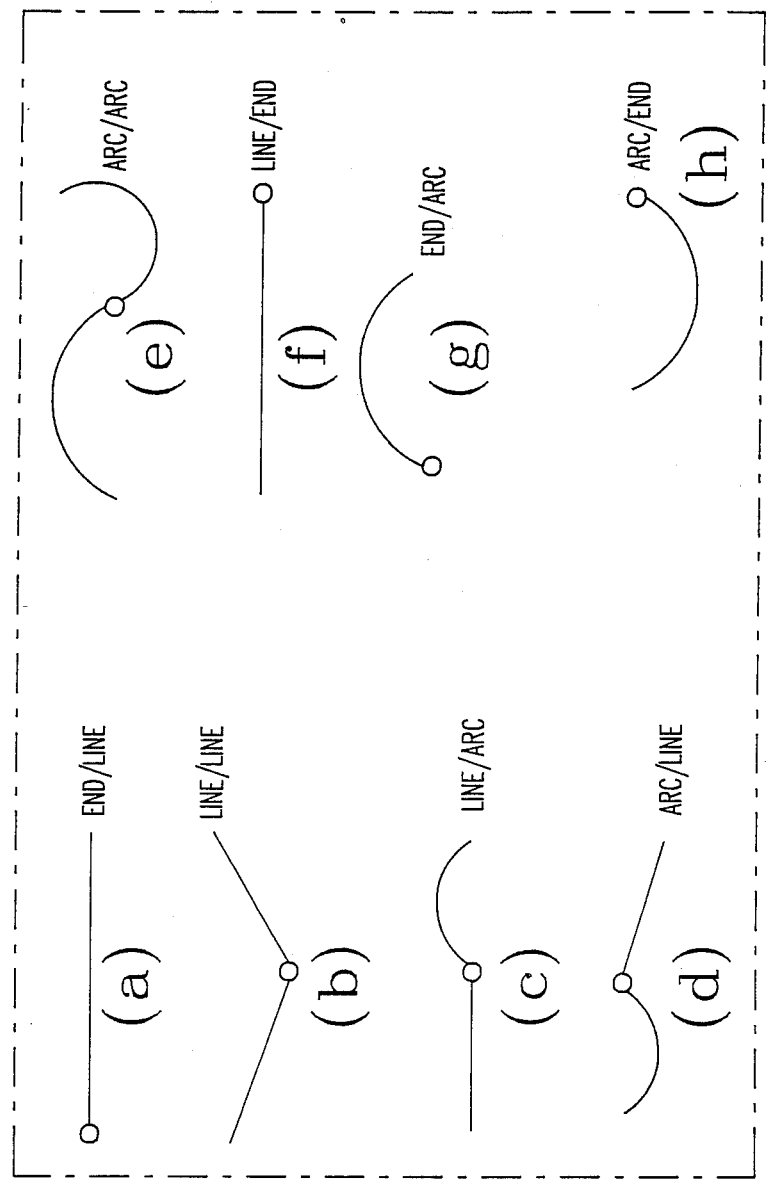
FIG. 26 shows illustratively eight possible geometric relationships of a corner to its adjoining link, or links, as they characterize the shape of the pixel line according to the image processor invention.

The operation of block GRF will now be explained by reference to the detection steps performed successively by detectors ED, CRD, CRL and LAD on the discrete function of line 250, upon each stripe step along the seam path being sensed. The purpose is to match the output of block GRF with the outputted signal of line 302 from a standard graph derived ahead of time for comparison within comparator CMP3. FIG. 25 shows illustratively six possible light stripe images. Typically, stripes a/, b/ and d/ are characterized by straight lines. The seam corresponding to stripe a/ has an upper node and a lower node situated on the same vertical line, namely on the same column of the video image represented by the pixel line of line 211 of the pipeline. According to the image processor invention, treatment of the image signal is done so that the second node will be automatically shifted forward by one column whenever it is detected by the microcomputer that there are two successive pixels on the same column. Therefore, treatment and interpretation at the 1-D level, beyond line 150, will be serial and unambiguous. The seam according to image b/ of FIG. 25 is a V-shaped seam. It is a U-shaped seam according to image d/. Images c/ and f/ are characterized by the presence of arcs, rather than lines, between nodes, although image f/ has both. Image e/ involves only lines but combines two seams each of a different type. The philosophy of the operation of block GRF will be understood by reference to FIG. 26 which shows graphs characterizing a stripe image such as shown in FIG. 25. Corners, or nodes, are represented by a small circle, and the possibilities encountered are covered by the eight situations of FIG. 26. First, there may be an END followed by a LINE (under a/) or by an ARC (under g/). This situation will be automatically detected at the beginning of the graph when followed by a LINE, or an ARC. The symbol is, thus, END/-LINE, or END/ARC. Similarly, under b/ is shown the symbol LINE/LINE meaning an END encountered between two straight lines, and under e/ the symbol ARC/ARC means an END between two arcs. FIG. 26 generalizes by showing eight situations which are succesivel: END/LINE; LINE/LINE; LINE/ARC; ARC/LINE; ARC/ARC; LINE/END/; END/ARC; and ARC/END. An END is detected when ending a LINE, or an ARC, with another detection following for a LINE, or an ARC, or where there is no image before or after the detection of a LINE or an ARC. Those symbols characterize the shape of the "corner", which itself characterizes the shape of the seam to be worked on by the effector end.

The output image from the pipeline on line 211 consists of a large number of black pixels and 400-600 white pixels, representing the two-pixel thinned light stripe image. The positions of these white points contain all of the surface reconstruction information. The object of the high level treatment (HLT section of FIG. 21) is to extract the coordinates of the white pixels from the image.

In previous systems, a general purpose processor would have been used to scan all of the pixels in the image, testing white and black, and saving the coordinates of the white ones. This necessitates a frame buffer to store the thinned line image, a very slow process, at 7 to 10 million bytes per second, to scan the data and save the coordinates. In contrast, the FM board (FIG. 20) scans the video data stream from the SNAP board and, on a per frame basis, extracts the coordinates of the white pixels. The extracted data appear in the form of a sequence of i and j coordinates, which are placed in a large table (RAM) accessible to the MCPT (M68010 general purpose processor) which carries out the intelligent analysis of the image data. Each of the boards of the pipeline plugs into the P1 connector of a VME bus. A Mizar 7100 board is used including a single board computer (CMPT) which operates with a 10 MHz clock (12.5 MHz), 512 bytes of random access memory, a real time clock and two serial ports. The M7100 board supervises the pipeline low level treatment (LLT) and the high level treatment (HLT) for the intelligent analysis of images. The M7100 processor is interfaced with the control processor (CP) and shares with it RAM 104. The DG board acts as the video bus master, providing SYNC and timing signals to the rest of the image processing boards. The FM board provides the termination for the video bus and acts as a slave on the video bus. All other image processing boards are configured as non-terminating slaves on the video bus.

Considering now the high level treatment section (HLT) of FIG. 21, it is observed that the surfaces which must be tracked by a practical robotic seam tracker are diverse and highly variable. Most prior art seam tracker designs have assumed explicitly, or at least implicitly, that only certain and few joint geometries are of importance. Furthermore only one geometry has been assumed to define the joint. This is contrary to reality. Too many shapes would have to be account for, and for a given shape, lengths, angles and radii are definitely not constant. Therefore, another approach than those specific attributes is required for a correct and consistent shape recognition procedure.

It is now proposed to base light stripe recognition on a feature-based description of the stripe images. To this effect, the description is based on capturing the invariant aspects of the light stripe images. As earlier mentioned, lengths, angles and radii are not invariant features for the description of a light stripe images. These are numerical attributes to be used in the final analysis, not to perform shape recognition. Due to geometric constraints with a light stripe sensor, it is not possible for the stripe to have more than one sample detected in any given image column after final thinning. This is the purpose of the PRD circuit of FIG. 21. As a result, the three-dimensional image transformed into a 2-D image by the camera has been transformed into a 1-D signal on line 250 which will be used to reconstruct the original 3-D surface shape.

The line stripe signal is modeled in terms of the following features: (1) line segments (LINE); (2) circular ars (ARC) and (3) corners, intersections of lines and/or arcs. Since arcs are difficult to extract, an option for the sake of simplicity is to assimilate an arc to a line.

Corners are the primary features to be extracted from the light stripes. They are classified into several types recognized while scanning from left to right in the image: (1) left end line; (2) line/line; (3) line/arc; (4) arc/-line; (5) arc/arc; (6) line/right end; (7) end/arc; and arc/end. When two segments intersect to form a corner, the angle of intersection is not invariant, due to natural variations in the surfaces to be tracked. The corner may be considered as "turning". However, doing this "up" or "down" is not a rotationally invariant description of what happens. In contrast, according to the present invention, the stripe will be described when it turns or bends at a corner, as doing a "left turn" or a "right turn", regardless of the orientation at the corner. Accordingly, each corner is classified with this second attribute.

The preceding are symbolic attributes. In addition numerical attributes are also extracted from the raw light stripe of line 250. These numerical attributes are used for two purposes. One is to facilitate the extraction of refined measurements which result in the generation of samples of surface position and orientation as well as gap size. The other purpose is to facilitate the joint recognition process by eliminating certain corners, as will be seen hereinafter with the parsing operator POP of FIG. 21. These numerical attributes are: (1) corner horizontal coordinate; (2) corner vertical coordinate; and (3) corner normal distance.

As will be shown hereinafter, the ultimate goal with the image processor invention is to determine by detecting LINE, ARC, or END, or other defined geometric characteristic, and combination thereof, what characteristic there is, how many of them there are, for instance how many corners between lines or arcs. From such data the shape can be identified. Where the purpose is to locate a point of reference on a joint or seam path, the important feature is the corner. From the identified shape, it is known where the preferred "corner" is, that is, the "target" for the effector end to work on and, therefore, where for one particular stripe image the seam location as sensed actually is. In other words, in the final analysis the coordinates of the target are determined which will be used in the context of the control processor invention.

Figure 24E:
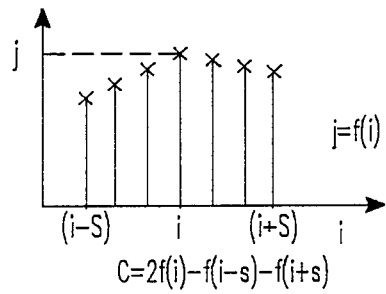

Referring again to FIG. 21, the signal of line 250 (see FIG. 24D) when received on line 251 provides at the start, by END detection within block ED, an indication thereof passed by line 251' onto block GRF. Thereafter, corner detection block CRD detects from line 252 the corners existing throughout the signal of line 250. To this effect, the function of block CRD is carried out by a discrete signal difference operator. Referring to FIG. 24E, this operation, which is conventional in numerical calculation, consists in ascertaining the difference between successive values of the discrete function $j=f(i)$ and in detecting when, between two successive such differences, the value jumps by a predetermined minimum amount $c$. In order to eliminate noise due to erratic distribution, instead of operating upon the values immediately preceding and immediately succeeding the maximum (in the illustration, since in another illustration it could be a minimum), i.e. the change of slope, values at a rank s on both sides, typically, are used. Therefore, the detected difference results from the computation:

$$c=f(i)-f(i-s)-[f(i+s)-f(i)]=2f(i)-f(i-s)-f(i+s)$$

Having identified, upon such successive detections of a maximum or a minimum, of the function f(i), how many corners there are as they are successively encountered, the next steps consist with operators such as CRL in FIG. 21, (lines 254, 254' and 256, 256') in establishing the relation of each such corner with the preceding, or succeeding, slope of the line segment connected to it. This is based on the same function $j=f(i)$. To this effect, it is established (thus, with a first derivative) whether, from such corner, the pixel line is turning RIGHT (negative slope), or LEFT (positive slope). Moreover, based on two successive corners, it is determined whether these are connected by a LINE, or by an ARC. This is done within operator LAD (lines 253, 253' and 255, 255'). Again, simple algebra in treating the discrete points of curve $j=f(i)$ will reveal a linear succession for LINE, or a curvature for ARC. The last step is, at the end of the pixel line, to detect an END (lines 257 and 257').

Segmenting point files into lines, arcs, ... is quite slow. For instance, the Hough transform approach requires the generation of a large number of points from edge point in the point file, according to a linear, or circular, equation. Recursive line splitting is another approach. The latter takes about 100 milliseconds to run, for typical shapes and lines only. In contrast the approach according to the present invention takes only 8 milliseconds to run.

Figure 27A:
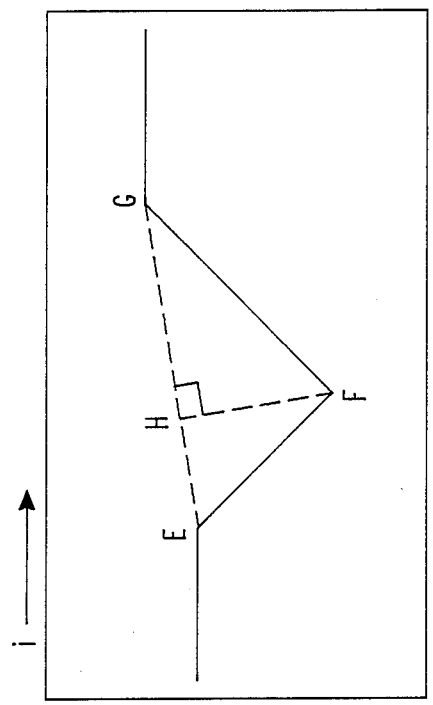
FIG. 27A shows a typical pixel line profile and FIG. 27B shows the corresponding stripe image encoding.
Figure 27B:
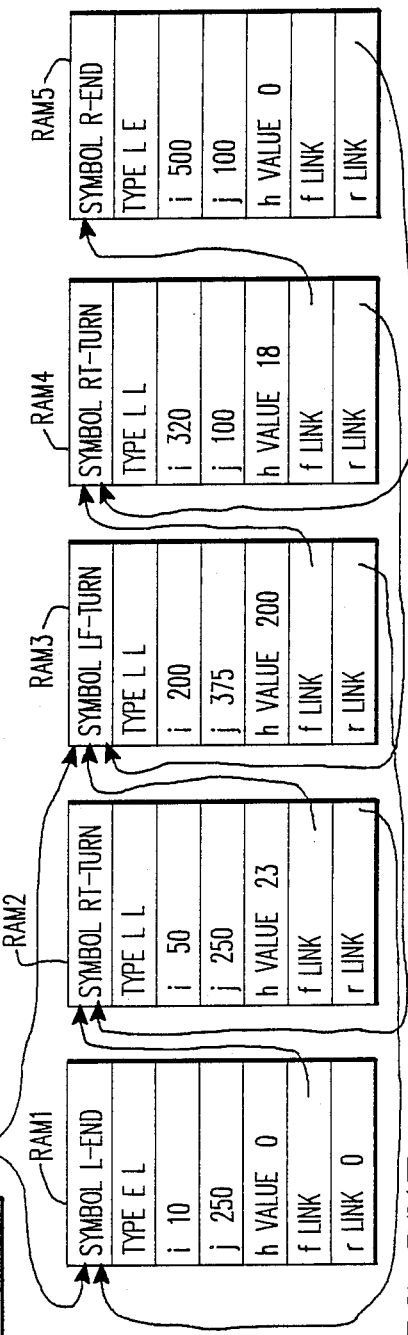
Figures 28A, 28B:
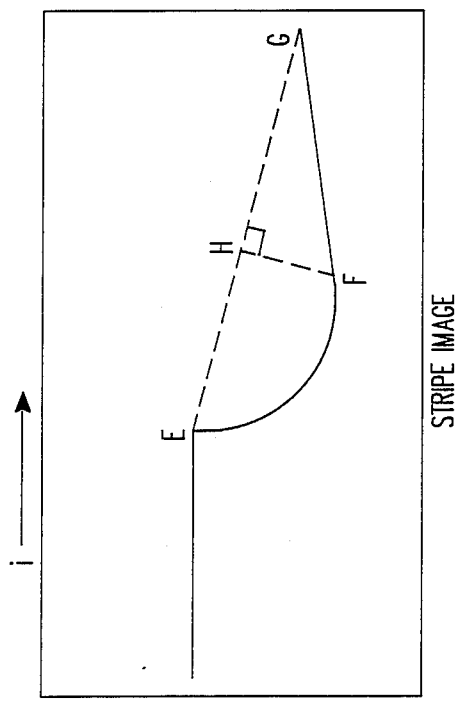
FIG. 28A shows another typical pixel line profile and FIG. 28B illustrates the corresponding stripe image encoding.

Referring to FIGS. 27A and 27B, a graph header GRH is provided for monitoring the buildup of the symbolic graph, typically, constituted by five RAM's associated with the respective "corners" (extreme ends to the left and to the right, and E, F and G, in the case of FIG. 27A, only four RAM's in the case of FIG. 28A). The RAM's are tail and end connected, and each has corner identifying features relative to adjacent segments of the stripe line. Thus, RAM1 contains the symbol (L-END for end/line, as under (a) in FIG. 26), the type E-L (for END/LINE, relative to the segment until point E in FIG. 27A which is the stripe image), the value of c (marking the acuteness of the change of slope), the coordinates of the corner, the turn on passing over the corner.

Figure 30:
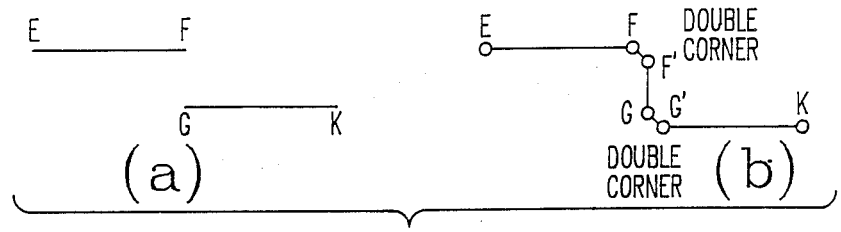
FIG. 30 gives the example of extra corners identified on a pixel line.

Having identified within block GRF a pixel line having so many corners and noted how these are connected, it remains to sort out the true corners from those which, as shown in FIG. 30, may be double corners. There, is shown under (a) a pixel line comprising two corners F and G placed on the same vertical line between an upper line EF and a lower line GK (as explained earlier, actually G is placed one column further than F in the process of deriving the pixel line). Under (b) in FIG. 30, because of double corners (F, F' and G, G'), it becomes necessary to ignore one in each pair and to use only one, thereby being in the same situation as in the true seam of curve (a) of FIG. 30. This is the function of the parsing operator POP of FIG. 21. Referring to FIG. 27A or to FIG. 28A, it is seen that between three corners E, F, G, two corners are aligned on a line such as EG for E and G, and the third corner, F in this instance, is on the normal FH to the opposite side of the triangle. Knowing E and G, line EG is calculated, and the distance FH to line EG is also calculated. If we compare FF', or GG', under (b) in FIG. 30, it appears that the same triangle approach will reveal double corners. Therefore, the parsing operator POP will cancel the indication of one of the two close-by corners, thereby restituting the general shape of the line as in FIG. 30 under (a).

How the operation of graph block GRF and operator POP of FIG. 21 presents itself will now be considered by reference to FIGS. 27A, 27B and 28A, 28B. The pixel line as received on line 250, in the form of the function $j=f(i)$, is read by the microcomputer from left to right in terms of the graph of FIG. 27A, or FIG. 28A. Considering for instance FIGS. 27A and 27B, the graph header GRH, which looks successively for each light stripe occurring while the sensor is following the seam (see block SLC of FIG. 11), opens a file for the particular pixel line (FIG. 27A) under investigation. The object is to recognize the key features (shown in FIG. 27A) and to store the relevant information in such file. The first operation is corner detection (block CRD of FIG. 21), accomplished by detecting c i.e. the rate of change in slope detected by the second difference operator already considered by reference to FIG. 24E. It tells how many corners there are. Accordingly files RAM1, RAM2, RAM3, RAM4 and RAM5 are opened, one for each corner. Then, these files are considered one after the other for more characteristics.

First, there is the first END to the left. In file RAM1 besides c=0 are noted the coordinates of the END, namely i=10 and j=250. Besides those values are stored, as shown in RAM1 of FIG. 27B, the symbol "left end" (L-END) and the type (E-L like under (a) in FIG. 26). Since the operation is progressing to the right from the start, there is no link to the rear, the system looking for another corner toward the right. Therefore, there is also a "link forward" from this first file to the beginning of the next file which is for the subsequent corner.

File RAM2 was opened during the corner detection operation (CRD of FIG. 21) upon the detection of a change in slope characterizing corner E. At the same time, it is noted in the file that for corner E: i=50 and j=250. Now, block CRL (FIG. 21) determines for corner E whether there is a turn to the right, or to the left. Slope detection indicates that the turn is to the right. The file is given this information. The same is done for corner F (RAM3), and for corner G (RAM4). It is possible to determine whether up to corner E, between E and F, between F and G, and from G to the extreme end to the right (RAM5) whether those corners are interconnected by lines (FIG. 27A) or by arcs (FIG. 27B). This is the function of blocks LAD of FIG. 21. A simple approach is to assume that there is a line in between. The symbols (FIG. 27B) are L-END (left end) for RAM1; RT-TURN (right turn) for RAM2; LF-TURN (left turn) for RAM3; RT-TURN (right turn) for RAM4 and R-END (right end) for RAM5. Forward link (f link) and rear link (r link) are also noted in the files, thereby to indicate the line of continuity between the successive files as one would read the graph of FIG. 27A, from left to right, or from right to left. The graph pointer (graph ptr) in the graph header GRH indicates which file to go as the sensor moves. The track pointer (track ptr), also in the graph head, indicates where the critical corner, or target, for the effector end is.

Before matching the graph so identified with a standard graph (a seam model of block SMD passed for testing to block SGF for matching by comparator CMP3 of FIG. 21), there is a need for a parsing process performed by the parsing operator of block POP in FIG. 21. This is due to the fact that the corner detection process generates more corners than is desirable. Typically, double corners (such as shown at F' and G' in FIG. 30 under (b)) are generated by the first corner detector whenever step continuities appear in the stripe image. The effect of the corner parsing process is to scan the corner structure array and delete the extraneous corners. The deleting process, referred to as parsing, namely to reduce the original corner string to a simple one for matching, may be performed according to a variety of parsing rules. According to the preferred embodiment, in the parsing process, a new corner attribute is computed which is the normal distance from the corner to the straight line between its two adjacent corners. The distance (such as FH in FIG. 27A) from the corner (F in this case) to the line joining the adjacent corners (EG in FIG. 27A) is established. Should there be a double corner, like in FIG. 30 the second corner is F' assumed to be very close to corner F, the same process will provide the distance FH' to line EF' (the two adjacent corners being now E and F', rather than E and G). As a result the distance FH' will be very small. The rule is to have a minimum distance below which the middle corner will be ignored for all future use. Therefore, corner F in this case will be cancelled. This leaves the next and close corner F'. Now, the distance is calculated from F' to E and G, since F has been cancelled. The process can be continued after such elimination of the double corners F and F', under the assumption made for illustration. More generally, the rule is to determine upon each corner whether there is a very short distance (in a case like FF', or GG,' in FIG. 30 this will appear from the very first corner of the pair) and to eliminate such corner immediately, thereby making the next corner of the pair a single corner for subsequent computation. FIG. 29 shows for the five corners 1 to 5 (RAM1 to RAM5 of FIG. 27B) how the symbols are progressively established on the basis of the corners starting from the extreme ones and narrowing with the intermediary ones from the left to the right of the overall graph. The normal distance is computed according to the following equation:

$$h = \frac{a(x - x1) - b(y - y1)}{\sqrt{a^2 + b^2}}$$

where $a=(y2-y1)$ and $b=(x2-x1)$ with $(x1,y1)$ and $(x2,y2)$ being the coordinates of the corners adjacent to the central corner $(x,y)$. The successive h values 0, 23, 200, 18 and 0 are stored in the respective RAM's.

Once the value of h has been computed and the conclusion and simplification done, the corner symbols may be assigned (RAM1, RAM2, RAM3, RAM4 and RAM5 in FIG. 27B). It is observed here that the sign of the distance h can be used, instead of the slope, in order to determine which direction is taken (going from left to right in the process of establishing the graph). Therefore, in such case, the turn direction (RT-TURN or LF-TURN) will be defined by the sign of h.

It appears that, once filled with the data so obtained for the particular light stripe, the RAM's (FIGS. 27B or 28B) will contain numerical attributes such as i, j and h, and symbolic attributes such as L-END, E-L LF-TURN, RT-TURN, f link, r link. The result on line 260 (FIG. 21) at the completion of the parsing routine is a simplified graph of the light stripe image complete with values for all numerical and symbolic attributes. The symbolic attributes will be used by the comparator CMP3 of FIG. 21 to establish matching with the symbolic attributes of the standard graph passed as reference on line 302 under testing.

In graph matching, joint geometries are recognized by matching reference graphs (SMD in FIG. 21) to the graph extracted (line 260) from each image (SLC in FIG. 11) in real time. Such process is complicated by the fact that one joint may have several representations due to changes in morphology along the path (what is quite common with metal sheets) and due to the fact that start, stop and branch points may have drastically different morphologies. The solution to this problem is to allow each joint to be described by an arbitrary number of corner graphs. Each corner graph contains the string of attributed corner structures in double linked list form. The set of all the corner graphs for a given joint is also linked together to form a tree. In the matching process, all corner graphs in a tree are compared to the sample until a match is found, or all the references have been used.

Single graph matching is performed by stepping through the corners in the reference graph (line 302) and the sample graph (line 260) together. In order for a graph to match a reference, the following conditions must be met: (1) the number of corners in the two graphs is the same; each corner in the sample has the same symbol (turn direction) as the corresponding corner in the reference; each corner is of the same type (line/line, arc/line, . . . ). While the tests for matching are being performed sequentially, the sample tracking feature pointer of the graphic header (GRH in FIG 27B) is set when the tracking feature corner (target) in the reference graph is encountered.

Tree matching is carried out by attempting to match on individual corner graphs of the tree in sequence until one matches or all choices have been exhausted. It is observed that, in practice, average matching time is under one millisecond.

Once there is matching, comparator CMP3 will gate GTE to pass the graph from line 261 onto line 262, and from there on the numerical attributes will be used. Knowing what type of graph corresponds to the seam under sensing, in accordance with the standard graph, by line 267, it is proceeded at TRS with the determination of the target, namely, the selection of the corner which is of interest both in working with the tool on the joint and in knowing where the seam path location is located (which means between the values of (i,j) in the RAM's which one will serve as the target coordinates, i.e. corner F in FIG. 27A).

Eight symbolic attributes are represented in FIG. 26, as can be stored in the RAM's (FIGS. 27B or 28B). To these are added the "left turn" or "right turn" attributes. The numerical attributes are (i,j), the corner horizontal and vertical coordinates, and h the corner normal distance.

Besides the RAM's, in the process information is also stored in the header GRH (FIG. 27B). It relates to three additional attributes bearing on the overall graph, rather than the corners. These are determined after matching.

One attribute is the tracking feature, specifying one of the corners in the graph as the corner which represents the target. The coordinates of the target are used to generate sequences of homogeneous coordinate transformations representing the seam path in 3-D, space coordinates. These transforms are used to generate control functions for the robot. As earlier mentioned, the header (GRH) for the corner graph (RAM1 to RAM5 in FIG. 27B) contains a pointer which indicates which corner is the tracking feature. In the reference graphs, this pointer is initialized by training. In the sample graphs, it is null until matching has been successful.

A second attribute of the whole graph is the target refinement code specifying which of several heuristic method should be applied when using raster data to refine the target corner coordinates. The code is initialized by training for each reference graph.

A third attribute is the action code specifying what the control processor CP should do whenever there is a match for the particular graph of line 260. Typically, these actions are: MOMATCH (error condition, do not generate a control vector from the current sample); MATCH (generate a tracking control sample for queue 104); START (execute the start-joint sequence); STOP (execute the end-of-joint sequence); BRANCH (execute the branch to new path sequence). Each joint may have a different control action. The values are initialized by training.

These three attributes are added to the graph header GRH (FIG. 27B).

Figure 31:
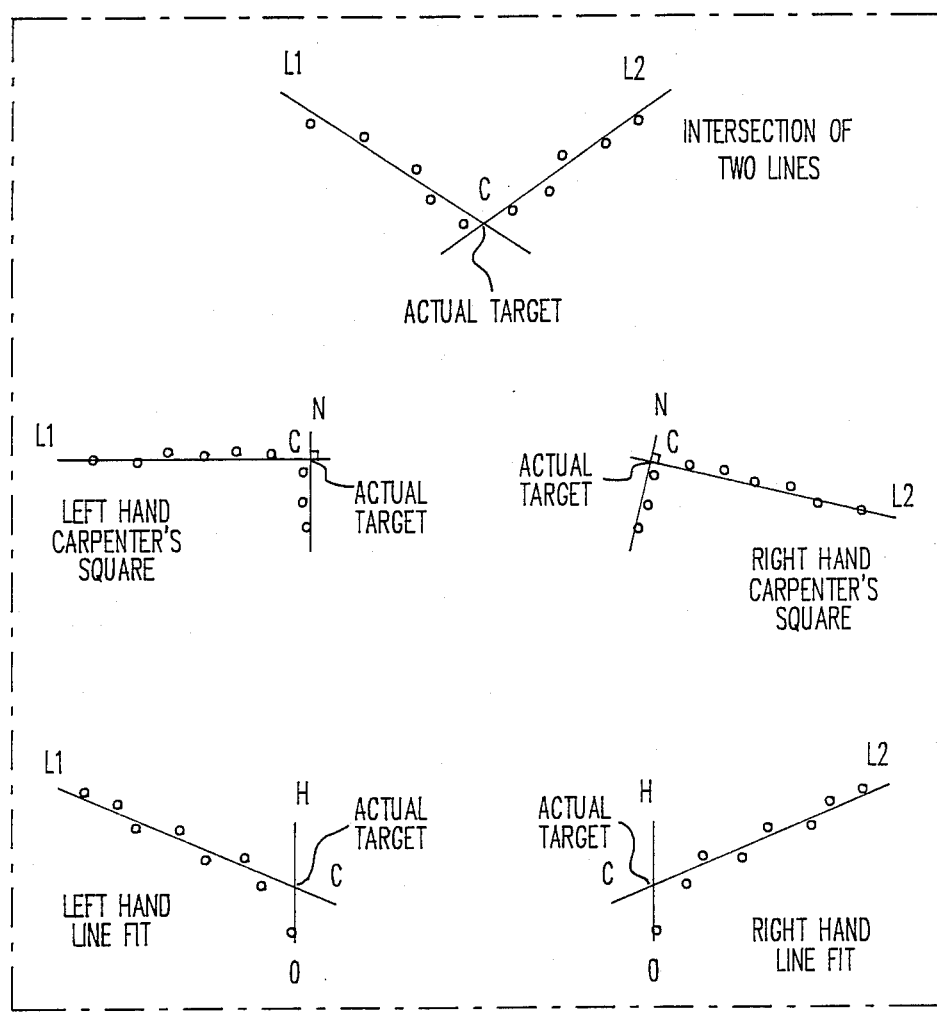
FIG. 31 shows in five situations target refinement as made possible by the image processor invention.
Figure 32:
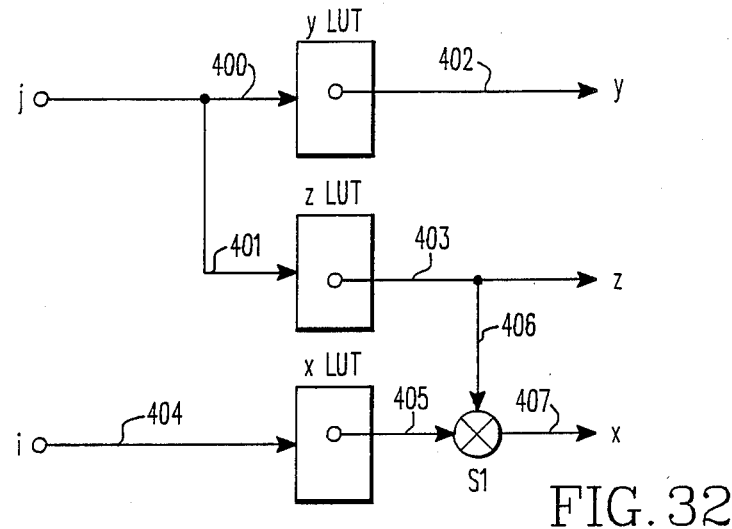
FIG. 32 is a diagram illustrating 1-D to 3-D image conversion.

Once a target corner has been selected by graph matching, the original raster data is re-analyzed in order to refine the coordinates of the target. This is the function of block CRF of FIG. 21 in response to line 263. This done by reference to data from the reference graph derived on line 268. The basic method consists in using linear regression to fit equations to raster data. This has a spatial averaging effect in the minimum mean squared error sense. The linear equation, or equations, which are generally known, are used to get refined target coordinates according to one of several rules: (1) intersection of two adjacent lines; (2) left hand or right hand "carpenter's square solution"; (3) best left hand or best right hand fit; and (4) original corner. FIG. 31 illustrates these four situations with lines such as L1 or L2, a normal line N, and a vertical line H, having an intersection on the target point C. Typically, the carpenter's square solution deals with rounded, worn or scaled corners on the beam edges, as shown in FIG. 31 for the particular example.

At this stage, the information derived on lines 264 and 264' of FIG. 21 is passed to block GDM where, based on information received on line 269 from the sample graph, the gap is measured. This is a distance fed to the robot (by line 265 and via the control processor CP) to automatically adjust the weld process to fill the gap with metal. This is known as "adaptive fill", although in the present description control of the robot is by feedforward, and not adaptive in a theoretical sense.

After the target point coordinates have been refined, according to another aspect of the image processor invention, they are directly converted to 3-D coordinates in the camera coordinate system (for later use by the control processor CP with the queue 104). The relevant equations have been mentioned earlier by reference to FIG. 10. In order to convert data points rapidly, advantage is taken of the decoupling of the horizontal and vertical coordinates and of the limited dynamic range of the image coordinates to generate lookup tables for the functions. The standard method would consist in going through the following transformations:

$$\begin{bmatrix} x \\ y \\ z \\ 1 \end{bmatrix} = \begin{bmatrix} 4 \times 3 \\ \text{collineation} \\ \text{matrix} \end{bmatrix} \begin{bmatrix} i \\ j \\ 1 \end{bmatrix}$$

which require twelve multiplications and eight additions, in order to carry out the matrix multiplication. The new method makes z and y (FIG. 10) functions of the image ordinate Jm and x a function of z and the image abscissa Im. As earlier stated and as shown in FIG. 10, the functions are as follows:

$$z = \frac{b}{\tan\phi - \frac{k}{f}\left(\frac{Jm}{2} - J\right)}$$

$$y = \frac{b\frac{k}{f}\left(\frac{Jm}{2} - J\right)}{\tan\phi - \frac{k}{f}\left(\frac{Jm}{2} - J\right)}$$

$$x = z \cdot \frac{k}{f}\left(\frac{Im}{2} - I\right)$$

This is based on x being the unit vector in the space x-direction as shown in FIG. 10, and n a unit vector normal to the light stripe plane. Therefore, the constraint is (x·n)−0, where the sign (·) represents the vector dot product. Then, y and z are functions of the image ordinate Jm with constants, whereas x is given by z times a function of the image abscissa Im, also with constants.

Figure 33:
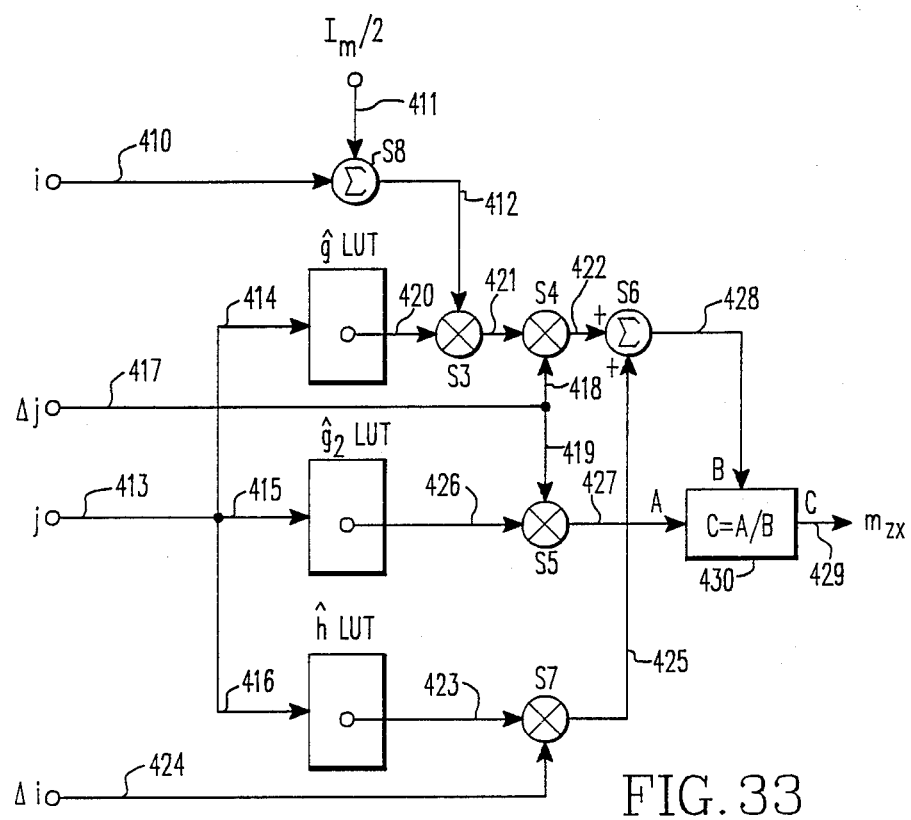
FIG. 33 is a diagram illustrating image to slope conversion.

This method can be implemented in dedicated hardware, in embedded firmware, or in general purpose software. It involves three table lookup tables, xLUT, yLUT and zLUT (FIG. 32), and one multiplication, at S1 in FIG. 32. The address j is passed by line 400 to the yLUT lookup table and by line 401 to the zLUT lookup table, the output coordinates y and z being on lines 402 and 403, respectively. The i address is passed to the xLUT lookup table and its output on line 405 is multiplied by z as derived from lines 403 and 406. Coordinate x appears on line 407. The x calculation is slightly more complex, since integer arithmetic is used for speed of operation. Therefore, the xLUT lookup table requires a scale factor in order to expand the dynamic range of the normalized (z=1) x function. This scale factor must, then, be divided out at conversion time, although it can be a power of two for efficient implementation. As to the $m_{zx}$ component of surface orientation, it may be somewhat more complex. As shown in FIG. 33, three lookup tables gLUT, g2LUT and hLUT are used, with two additions at S6 and S8, with four multiplications at S3, S4, S5, S7, and with one division at 430. S8 involves the product of i, derived from line 410 by Im/2 derived from line 411. The output goes by line 412 to multiplier S3. The three lookup tables receive the address j from line 413 and respective lines 414, 415, 416. They output on respective multipliers S3, S5, S7 by lines 420, 426, and 423, respectively. Line 420 like line 412, goes to multiplier S3 and the output is on line 421. Multiplier S4 responds to line 421, S5 to line 426 and S7 to line 423. In addition, Δj by lines 417 and 418 brings the second input to S4 while by lines 417 and 419 it goes as the second input to S5. Similarly, Δi by line 424 becomes the second input to multiplier S7. Summer S6 combines line 422 from S4 and line 425 from S7 to form the divisor B, whereas line 427 from S7 inputs the dividend for divider 430. The latter outputs the result $m_{zx}$ on line 429. The approach allows a 46% improvement in throughput after redundancies in the equation have been considered. A plain calculation would require 28.5 equivalent additions, whereas the lookup table method requires only 19.5 equivalent additions.

As a result, on line 266 are derived the position and orientation of points on the seam: x, y, z, $\theta$, $\phi$, $\psi$. Considering block SCC, the homogeneous coordinate transform is a matrix composed of four vectors, one indicating the position, the remaining three being orthogonal unit vectors indicating the orientation. As earlier stated, the hctm is denoted by the symbol T with sub and superscripts to indicate relative coordinate frames. Thus, the transformation from robot world coordinates to a seam sample is denoted: $_wT^s$, the variations in the present use being s for seam; w for world; t to tool; and c for camera.

Figure 34:
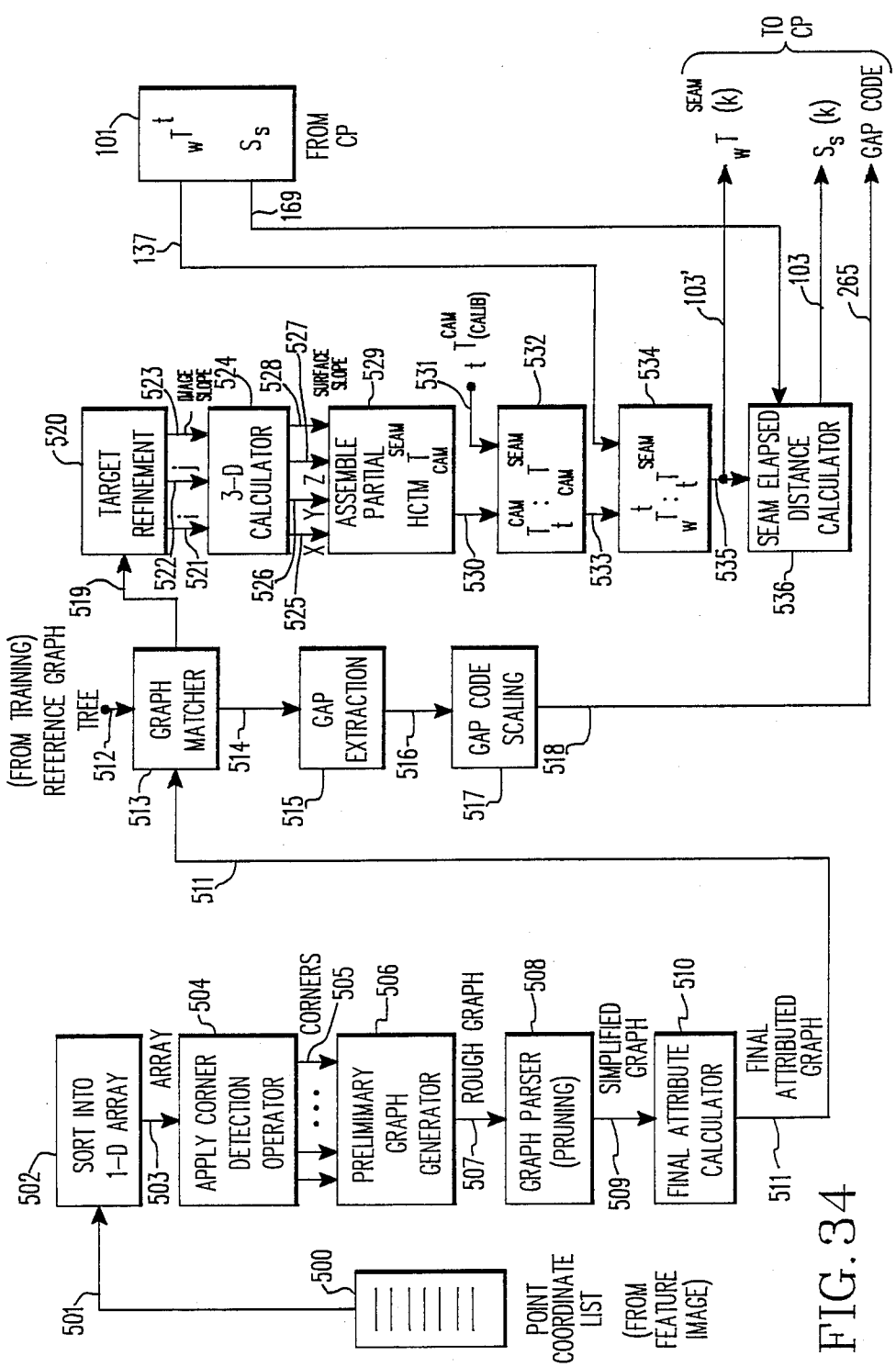
FIG. 34 is a flow chart illustrating the operation of the image processor for pattern recognition, center point extraction and coordinate determination for providing seam path location sample data for the control processor of FIGS. 11, 12 and 13A to 13D.

The image processor measures the positional offset component of seam position directly in camera coordinates. These values go directly into the camera-to seam transform. The image processor measures $m_{zx}$ (derived on line 528 in FIG. 34, which is the surface slope component defined by $$m_{zx} = \frac{dz}{dx} \approx \frac{\Delta z}{\Delta x},$$

which is related to the image slope Δj/Δi of line 523 in FIG. 34, when the strip projector is aligned to place lines parallel to the i-axis when a flat surface is normal to the lens principal axis as seen in FIGS. 9 and 10) directly from a single frame. After collecting several samples of seam sample position while in motion, it also computes mxy and mzy directly. These values are used to compute the nomral (n) and orientation (o) vectors of the orientation submatrix of the hctm as follows:

$$o_x = \frac{m_{xy}}{\sqrt{m_{xy}^2 + 1 + m_{zy}^2}}$$

$$o_y = \frac{1}{\sqrt{m_{xy}^2 + 1 + m_{zy}^2}}$$

$$o_z = \frac{m_{zy}}{\sqrt{m_{xy}^2 + 1 + m_{zy}^2}}$$

$$n_x = \frac{1}{\sqrt{1 + m_{xy}^2 + m_{zx}^2}}$$

$$n_y = \frac{-m_{xy}}{\sqrt{1 + m_{xy}^2 + m_{zx}^2}}$$

$$n_z = \frac{-m_{zx}}{\sqrt{1 + m_{xy}^2 + m_{zx}^2}}$$

The approach (a) vector is computed as the vector cross product of n and o.

As an illustration, in Appendix is given a fortran program for light stripe design relative to light stripe geometrical analysis.

Referring to FIG. 34, a flow chart illustrates the overall operation of the image processor of FIG. 21. Block 500 typifies the RAM of FIG. 24B which lists the values of j for every column i in the data raster of the pixel line outputted by the pipeline and, in the case of interlacing, block 502 responds to line 501 to provide the one-pixel line of line 250. Thereafter, by line 503 the system goes to 504 where, as in CRD of FIG. 21, corner detection is performed. Preliminary graph generation, as with blocks ED, LAD, and CRL of FIG. 21 leading to the RAM information contained in block GRF, is performed at 506. The rough graph, outputted on line 258 which in FIG. 21 goes to the parsing operator, is worked out by pruning in the graph parser at 508. From there, by line 509, the simplified graph is operated on by the final attribute calculator at 510. From there, by line 511 the final attributed graph goes to matching at 513 (in response to the tree of reference graphs derived from line 512). It is understood that the reference graphs derived for testing with the actual graph of the light stripe image as sensed have the same general attributes of a possible actual graph derivation. They have been prepared in advance on the basis of seam models chosen as standards. After matching at 513, gap extraction follows by line 514 at 515, and gap code scaling occurs at 517 to yield the gap code on line 265 for the control processor CP. On the other hand, the graph matcher of 513 leads to target refinement performed at 520 (like at CRF in FIG. 21) providing the target coordinates i on line 521 and j on line 522. The image slope is also derived on line 523.

Then, at 524 (like at CRV in FIG. 21) conversion from 1-D to 3-D is effected, thereby providing the three coordinates x, y, z on lines 525, 526 and 527, respectively. The image slope is also converted into surface slope $m_{xz}$, as inclined on the y axis. The three coordinates x, y, z are obtained as earlier stated from the following:

$$Z = \frac{b}{\tan\phi - \frac{k_j}{f}\left(j - \frac{J_m}{2}\right)}$$

$$Y = \frac{\frac{k_j}{f}\left(j - \frac{J_m}{2}\right)b}{\tan\phi - \frac{k_j}{f}\left(j - \frac{J_m}{2}\right)}$$

$$X = \frac{\frac{k_i}{f}\left(i - \frac{I_m}{2}\right)b}{\tan\phi - \frac{k_j}{f}\left(j - \frac{I_m}{2}\right)}$$

while the surface slope $m_{zx}$ is carried out with total differentials dz and dx, as generally known. The surface slope is derived on line 528.

The information so derived is thereafter assembled into hctm's, in order to provide seam samples. The basic matrix for the seam transform is:

$$_{CAM}T^S = \begin{bmatrix} n_x & o_x & a_x & p_x \\ n_y & o_y & a_y & p_y \\ n_z & o_z & a_z & p_z \\ o & o & o & 1 \end{bmatrix}$$

where o is the orientation vector, a the approach vector and n the normal vector, p being the position vector between camera and seam, as earlier stated with reference to FIG. 18. Using the data of lines 525 to 528, the matrix is:

$$_{CAM}T^S = \begin{bmatrix} 1 - m_{zx}^2 & o & -m_{zx} & x \\ o & 1 & o & y \\ m_{zx} & o & 1 - m_{zx}^2 & z \end{bmatrix}$$

This is the output of line 530 from block 529. It remains now to convert from seam coordinate into world coordinate before instructing the control processor to control the robot processor. The relation is:

$$_wT^s = {_wT^t} \cdot {_tT^{cam}} \cdot {_{cam}T^s}$$

wherein the transform $_wT^t$, namely the tool coordinates, is given on line 137 from the robot processor via the control processor. As to transform $_{cam}T^s$ it is inputted by line 530 into block 532, and $_tT^{cam}$ is a given from the sensor to tool fixed relationship. The result on line 533 is $_wT^s$.

Since:

$$_wT^s = {_wT^t} \cdot {_tT^s}$$

this is effected, with line 533 and with line 534 (derived from line 137 of the control processor), within block 534, thereby providing $_wT^s(k)$ for instant k on line 535.

The seam path coordinates are outputted on line 103' for the queue 104. The elapsed distance relationship thereto, is established for all the samples at 536 and the sampled locations by line 103 are stored in the queue 104.

It is to be understood that several original features have been described in the context of the image processor invention as constituting the preferred embodiment of the invention. Alternative solutions are not excluded which concur to the same goals and unexpected results.

To summarize, the original features of the image processor invention may be listed as follows:

A sensor of geometric form taken into account in ascertaining the seam sample coordinates;

An assembly of interconnected electronic boards for processing light stripe images and converting the video signal into one-pixel wide images;

A method of generically representing light stripe image structure in terms of abstract data structures;

A method of matching data structures against reference structures so that a match can be found in spite of distortions in the numerical attributes such as lengths and angles;

The ability to match against any of several reference models so that essential morphology changes can be handled dynamically and asynchronously;

The ability to refine data interpretation in the context of a match so as to extract refined numerical attributes such as target position and gap magnitude;

As to the control processor invention, the following original features may be summarized as follows:

The ability to have a robot move the sensor anywhere in the work volume of the robot, searching for the start of a seam, and to halt the robot once the start point has been found;

The ability of the teacher to cause the robot to "center up" the effector end with respect to the seam start point in all six degrees of freedom before initiating tracking and taking into account desired effector end reference offsets;

Feedforward-based six degree of freedom tracking in real time with dynamically update of the robot path, dynamic recovery, and extrapolation of the robot path by vision system;

And, indeed, the integration into a single robotic system of the control processor invention and the image processor invention described hereabove is a major feature of the robotic system here proposed.

It is to be understood, that the invention has been described in the context of the preferred embodiments. This does not exclude, however, other embodiments using the essential features of the present invention under one, or other aspects thereof. For instance, the recovery of the taught path from an industrial robot has been described as an important feature. Nevertheless, feedforward control according to the control processor invention may also be performed with a robot wherein the taught path is available. Also, the seam tracker has been described using an optical sensor. It is also possible to use other forms of sensing system providing data regarding a discrete series of locations on the seam sensed ahead of the tool, for use by the control processor according to the present invention. It is also not necessary that the sensor be mounted on the tool at a definite distance therefrom. Correlation by elapsed distances between the sensed locations and the tool position and orientation can be established otherwise taking into account the particular relationship therebetween.

APPENDIX I

Fortran Program for Light Stripe Design

```
      DIMENSION SENSE(9,3)
      INTEGER COORDS(2,9)
      TAN(X)=SIN(X)/COS(X)

C  get design parameters
      type *,'Enter TV sensor horizontal resolution'
      ACCEPT *,HORRES
      type *,'Enter TV sensor vertical resolution'
      ACCEPT *,VERRES
      TYPE *,'Enter TV sensor horizontal dimension(mm):'
      ACCEPT *,DIAH
      TYPE *,'Enter TV sensor vertical dimension(mm):'
      ACCEPT *,DIAV
      XKJ=DIAH/HORRES
      XKI=DIAV/VERRES c  assign sample coordinates
      coords(1,1) = horres/2.
      coords(2,1) = verres/2.
      coords(1,2) = 1
      coords(2,2) = 1
      coords(1,3) = horres/2.
      coords(2,3) = 1
      coords(1,4) = horres
      coords(2,4) = 1
      coords(1,5) = 1
      coords(2,5) = verres/2.
      coords(1,6) = horres
      coords(2,6) = verres/2.
      coords(1,7) = 1
      coords(2,7) = verres
      coords(1,8) = horres/2.
      coords(2,8) = verres
      coords(1,9) = horres
      coords(2,9) = verres 1     TYPE *,'Enter midrange in mm.:'
      ACCEPT *,XMID
      TYPE *,'Enter stripe angle(phi) in degrees:'
      ACCEPT *,PHI
      PHI=PHI*3.14159/180.
      TANPHI=TAN(PHI)
      BASE = XMID*TANPHI
      TYPE *,'Enter size of field of view in x direction(mm):'
      TYPE *,'when stripe is in center of image.'
      ACCEPT*,FOV
      FOCAL = (DIAH/FOV) * (BASE/TANPHI)

C  compute extent of the light stripe based on camera field of view limits
      RMIN=BASE/(TANPHI+VERRES/2.*XKJ/FOCAL)
      RMAX=BASE/(TANPHI-VERRES/2.*XKJ/FOCAL)
      DEPTH=RMAX-RMIN
      WMIN=RMIN*(HORRES*XKI/FOCAL)
      WMAX=RMAX*(HORRES*XKI/FOCAL)
      EMIN=-BASE*VERRES/2.*XKJ/FOCAL/(TANPHI-VERRES/2.*XKJ/FOCAL)
      EMAX=BASE*VERRES/2.*XKJ/FOCAL/(TANPHI+VERRES/2.*XKJ/FOCAL)
```

```
C  compute 3-d measurement resolutions
       CALL ACCUR(BASE,PHI,SENSE,COORDS,XKJ,XKI,FOCAL,VERRES)

c output results to crt
       TYPE *,' '
       TYPE *,' '
       TYPE *,'LIGHT STRIPE DESIGN PARAMETERS'
       TYPE *,'    BASE(MM.)         PHI(DEG)        FOCAL DIST(MM)
      &  SENSOR DIA(MM)'
       TYPE *,' ',BASE,' ',PHI*180./3.14159,' ',FOCAL,' ',DIAH
       TYPE *,'DEPTH OF FIELD,MM.             MID-RANGE,MM.'
       TYPE *,DEPTH,'                ',XMID
       TYPE *,'EXTENT OF THE LIGHT PLANE(ALL DIMENS IN MM.)'
       TYPE *,'    WMIN          WMAX              RMIN          RMAX'
       TYPE *,WMIN,WMAX,RMIN,RMAX
       TYPE *,'    EMIN          EMAX'
       TYPE *,EMIN,EMAX
       TYPE *,'IMAGE COORDINATES         SENSITIVITIES(MM/PIXEL)'
       TYPE *,'      I        J        DX/DI         DY/DJ
      &   DZ/DJ'
       DO 2 K=1,9
       TYPE *,COORDS(1,K),COORDS(2,K),SENSE(K,1),SENSE(K,2),SENSE(K,3)
  2    CONTINUE
       TYPE *,'ENTER 0 TO GENERATE A REPORT FILE OR 1 TO CONTINUE:'
       ACCEPT *,IFLAG
       IF(IFLAG.EQ.1) GO TO 3
C      ELSE PRINT REPORT
       WRITE(4,100)
 100   FORMAT(1X,'LIGHT STRIPE DESIGN PARAMETERS')
       WRITE(4,101)
 101   FORMAT(1X,'BASE(MM)           PHI(DEG)          FOCAL DIST(MM)
      &  SENSOR DIA(MM)')
       PHI=PHI*180./3.14159
       WRITE(4,102)BASE,PHI,FOCAL,DIAH
c      type *,diah
 102   FORMAT(1X,F8.3,13X,F8.4,12X,F8.4,12X,F8.4)
       WRITE(4,103)
 103   FORMAT(1X,'DEPTH OF FIELD(MM)       MID-RANGE(MM)')
       WRITE(4,104)DEPTH,XMID
 104   FORMAT(1X,F10.4,15X,F10.4)
       WRITE(4,105)
 105   FORMAT(1X,'EXTENT OF THE LIGHT PLANE(ALL DIMENS IN MM)')
       WRITE(4,106)
 106   FORMAT(1X,'   WMIN        WMAX        RMIN        RMAX')
       WRITE(4,107)WMIN,WMAX,RMIN,RMAX
 107   FORMAT(1X,F10.4,5X,F10.4,5X,F10.4,5X,F10.4)
       WRITE(4,108)
 108   FORMAT(1X,'   EMIN         EMAX')
       WRITE(4,109)EMIN,EMAX
 109   FORMAT(1X,F10.4,6X,F10.4)
       WRITE(4,110)
 110   FORMAT(1X,'  IMAGE COORDS         SENSITIVITIES(MM/PIXEL)')
       WRITE(4,113)
 113   FORMAT(1X,'   I        J         DX/DI         DY/DJ         DZ/DJ')
       DO 111 K=1,9
       WRITE(4,112)COORDS(1,K),COORDS(2,K),SENSE(K,1),SENSE(K,2)
      &             SENSE(K,3)
 112   FORMAT(2X,I3,5X,I3,5X,F8.4,5X,F8.4,5X,F8.4)
 111   CONTINUE
       GO TO 4
C      THEN CONTINUE
 3     CONTINUE
 4     CONTINUE
       TYPE *,'ENTER 0 TO QUIT OR 1 TO DO ANOTHER ANALYSIS:'
       ACCEPT *,IFLAG
       IF(IFLAG.EQ.0) CALL EXIT
       GO TO 1
       END
```

```
c ccccccccccccccccccccccccccccccccccccccccccccccccccccccccccccccc
c
c      routine to compute sensitivities
c
ccccccccccccccccccccccccccccccccccccccccccccccccccccccccccccccc
       SUBROUTINE ACCUR(BASE,PHI,SENSE,COORDS,XKJ,XKI,FOCAL,VERRES)
       DIMENSION SENSE(9,3)
       INTEGER COORDS(2,9)
       TAN(X)=SIN(X)/COS(X)

DO 1 K=1,9
         J=COORDS(2,K)
         I=COORDS(1,K)
         TANPHI=TAN(PHI)
         FACTJ=XKJ*(VERRES/2.-J)/FOCAL
         SENSE(K,1)=BASE*XKI/FOCAL/(TANPHI+FACTJ)
         SENSE(K,2)=-BASE*XKJ/FOCAL*TANPHI/(TANPHI+FACTJ)**2
         SENSE(K,3)=BASE*XKJ/FOCAL/(TANPHI+FACTJ)**2
1      CONTINUE
       RETURN
       END
```

I claim:

1. In a robotic system controlling about position coordinate and orientation axes an effector end;
said orientation axes including a yaw axis;
the robotic system including:
a look-ahead seam sensor mounted on said effector end a distance therefrom;
said effector end being movable into position about said coordinate axes and orientable in relation to said orientation axes;
said look-ahead sensor being movable with said effector end at said distance about said yaw axis;
said look-ahead seam sensor being adapted, when tracking a seam path for said effector end, to sense seam path locations at said distance away from the effector end; and
the coordinates characterizing each sensed seam path location being stored successively to provide seam path location indicative samples;
the combination of:
means for controlling the effector end from a present operative position to a new operative position corresponding to one of said sensed seam path locations and to one of said seam path stored location indicative samples;
said look-ahead seam sensor and effector end having for said present operative position a common orientation about said yaw axis in accordance with a previous controlling operation of said robotic system upon said effector end;
means responsive to the location of said effector end in terms of said coordinate axes for said present operative position and to the contemporaneously sensed and stored seam path location sample for determining the chord across the seam path between said present operative position and said contemporaneously sensed sample;
means for determining in relation to said chord and said common orientation the yaw angle therebetween; and
means operative upon said effector end concurrently with said controlling means for minimizing said yaw angle, whereby the look-ahead sensor is contrived to follow the seam path at said distance ahead of the effector end.

2. The robotic system of claim 1 with said controlling means including:
means for iteratively calculating and storing in response to said controlling means the elapsed distance of the effector end from a first position thereof to the present position;
means associated with said look-ahead seam sensor for iteratively calculating and storing the elapsed distances from a first sensed seam location to said contemporaneously sensed location;
means operative from said present effector end and from a last effector end position for extrapolating to an anticipated position as said new position, and for deriving an anticipated elapsed distance;
means for correlating said anticipated elapsed distance with said corresponding stored location to derive corresponding position coordinates and orientation axes for the effector end at said new position;
said effector end being controlled about its orientation axes in accordance with said coordinate axes, and concurrently about its yaw axis in accordance with said yaw angle.

* * * * *